United States Patent
O'Hagan et al.

(10) Patent No.: US 9,759,803 B2
(45) Date of Patent: Sep. 12, 2017

(54) METHOD, APPARATUS, AND COMPUTER PROGRAM PRODUCT FOR EMPLOYING A SPATIAL ASSOCIATION MODEL IN A REAL TIME LOCATION SYSTEM

(71) Applicant: ZIH Corp., Lincolnshire, IL (US)

(72) Inventors: James J. O'Hagan, McHenry, IL (US); Rodrigo Alonso, Gilroy, CA (US); Michael A. Wohl, Talbott, TN (US)

(73) Assignee: ZIH Corp., Lincolnshire, IL (US)

( * ) Notice: Subject to any disclaimer, the term of this patent is extended or adjusted under 35 U.S.C. 154(b) by 0 days.

(21) Appl. No.: 14/732,623

(22) Filed: Jun. 5, 2015

(65) Prior Publication Data

US 2015/0355311 A1 Dec. 10, 2015

Related U.S. Application Data

(60) Provisional application No. 62/009,152, filed on Jun. 6, 2014.

(51) Int. Cl.
   *G08B 1/08* (2006.01)
   *G01S 5/02* (2010.01)
   *H04W 4/02* (2009.01)

(52) U.S. Cl.
   CPC ............ *G01S 5/021* (2013.01); *G01S 5/0205* (2013.01); *H04W 4/02* (2013.01); *H04W 4/023* (2013.01)

(58) Field of Classification Search
   CPC ...... G01S 5/021; G01S 5/0247; G01S 13/765; G01S 2013/466; H04W 4/02;
   (Continued)

(56) References Cited

U.S. PATENT DOCUMENTS

| 3,732,500 A | 5/1973 | Dishal et al. |
| 4,270,145 A | 5/1981 | Farina |

(Continued)

FOREIGN PATENT DOCUMENTS

| EP | 1235077 A2 | 8/2002 |
| EP | 1241616 A2 | 9/2002 |

(Continued)

OTHER PUBLICATIONS

Invention to Pay Additional Fees/Partial International Search Report for PCT/IB2015/054099 dated Oct. 6, 2015.

(Continued)

*Primary Examiner* — Kerri McNally
*Assistant Examiner* — Renee Dorsey

(57) ABSTRACT

Systems, methods, apparatuses, and computer readable media are disclosed for over-determining location estimations for an asset based on location estimates from a plurality of tags. Examples employ a spatial association model in a location system. Examples include a method for processing location information received from a radio frequency (RF) location tag. The method includes determining a first location of a first RF location tag associated with an asset, determining at least one second location of at least one second RF location tag associated with the asset, determining, using a processor, that the first location is not a valid location based at least in part on a comparison of the first location with the at least one second location using a spatial association model associated with the asset, and identifying the first location as erroneous in response to determining that the first location is not a valid location.

17 Claims, 20 Drawing Sheets

(58) Field of Classification Search
CPC .............. H04W 4/023; G06K 7/10366; A63B 2024/0025; A63B 24/0062; A63B 2220/836; A63B 2220/13; A63B 2225/54; G06F 3/014; G06F 3/0346; G06F 2203/0331
See application file for complete search history.

(56) References Cited

U.S. PATENT DOCUMENTS

| | | | |
|---|---|---|---|
| 5,046,133 A | 9/1991 | Watanabe et al. | |
| 5,119,104 A | 6/1992 | Heller | |
| 5,469,409 A | 11/1995 | Anderson et al. | |
| 5,513,854 A | 5/1996 | Daver | |
| 5,645,077 A | 7/1997 | Foxlin | |
| 5,699,244 A | 12/1997 | Clark et al. | |
| 5,901,172 A | 5/1999 | Fontana et al. | |
| 5,920,287 A | 7/1999 | Belcher et al. | |
| 5,930,741 A | 7/1999 | Kramer | |
| 5,995,046 A | 11/1999 | Belcher et al. | |
| 6,028,626 A | 2/2000 | Aviv | |
| 6,121,926 A | 9/2000 | Belcher et al. | |
| 6,176,837 B1 | 1/2001 | Foxlin | |
| 6,204,813 B1 | 3/2001 | Wadell et al. | |
| 6,366,242 B1 | 4/2002 | Boyd et al. | |
| 6,380,894 B1 | 4/2002 | Boyd et al. | |
| 6,593,885 B2 | 7/2003 | Wisherd et al. | |
| 6,655,582 B2 | 12/2003 | Wohl et al. | |
| 6,710,713 B1 | 3/2004 | Russo | |
| 6,812,884 B2 | 11/2004 | Richley et al. | |
| 6,836,744 B1 | 12/2004 | Asphahani et al. | |
| 6,882,315 B2 | 4/2005 | Richley et al. | |
| 7,009,638 B2 | 3/2006 | Gruber et al. | |
| 7,190,271 B2 | 3/2007 | Boyd et al | |
| 7,263,133 B1 | 8/2007 | Miao | |
| 7,667,604 B2 | 2/2010 | Ebert et al. | |
| 7,671,802 B2 | 3/2010 | Walsh et al. | |
| 7,710,322 B1 | 5/2010 | Ameti et al. | |
| 7,739,076 B1 | 6/2010 | Vock et al. | |
| 7,755,541 B2 | 7/2010 | Wisherd et al. | |
| 7,899,006 B2 | 3/2011 | Boyd | |
| 7,969,348 B2 | 6/2011 | Baker et al. | |
| 8,009,727 B2 | 8/2011 | Hui et al. | |
| 8,023,917 B2 | 9/2011 | Popescu | |
| 8,077,981 B2 | 12/2011 | Elangovan et al. | |
| 8,269,835 B2 | 9/2012 | Grigsby | |
| 8,279,051 B2 | 10/2012 | Khan | |
| 8,289,185 B2 | 10/2012 | Alonso | |
| 8,457,392 B2 | 6/2013 | Cavallaro et al. | |
| 8,477,046 B2 | 7/2013 | Alonso | |
| 8,568,278 B2 | 10/2013 | Riley et al. | |
| 8,665,152 B1 | 3/2014 | Kling et al. | |
| 8,696,458 B2 | 4/2014 | Foxlin et al. | |
| 8,705,671 B2 | 4/2014 | Ameti et al. | |
| 8,775,916 B2 | 7/2014 | Pulsipher et al. | |
| 8,780,204 B2 | 7/2014 | DeAngelis et al. | |
| 8,795,045 B2 | 8/2014 | Sorrells et al. | |
| 8,842,002 B2 | 9/2014 | Rado | |
| 8,989,880 B2 | 3/2015 | Wohl et al. | |
| 9,014,830 B2 | 4/2015 | Wohl et al. | |
| 9,081,076 B2 | 7/2015 | DeAngelis et al. | |
| 9,381,645 B1* | 7/2016 | Yarlagadda | B25J 9/1697 |
| 9,531,415 B2 | 12/2016 | Stelfox et al. | |
| 2001/0010541 A1 | 8/2001 | Fernandez et al. | |
| 2001/0030625 A1 | 10/2001 | Doles et al. | |
| 2002/0004398 A1 | 1/2002 | Ogino et al. | |
| 2002/0041284 A1 | 4/2002 | Konishi et al. | |
| 2002/0114493 A1 | 8/2002 | McNitt et al. | |
| 2002/0116147 A1 | 8/2002 | Vock et al. | |
| 2002/0130835 A1 | 9/2002 | Brosnan | |
| 2002/0135479 A1 | 9/2002 | Belcher et al. | |
| 2003/0090387 A1 | 5/2003 | Lestienne et al. | |
| 2003/0095186 A1 | 5/2003 | Aman et al. | |
| 2003/0128100 A1 | 7/2003 | Burkhardt et al. | |
| 2003/0163287 A1 | 8/2003 | Vock et al. | |
| 2003/0227453 A1 | 12/2003 | Beier et al. | |
| 2004/0022227 A1 | 2/2004 | Lynch et al. | |
| 2004/0062216 A1 | 4/2004 | Nicholls et al. | |
| 2004/0108954 A1 | 6/2004 | Richley et al. | |
| 2004/0178960 A1 | 9/2004 | Sun | |
| 2004/0249969 A1 | 12/2004 | Price | |
| 2004/0260470 A1 | 12/2004 | Rast | |
| 2004/0260828 A1 | 12/2004 | Price | |
| 2005/0026563 A1 | 2/2005 | Leeper et al. | |
| 2005/0031043 A1 | 2/2005 | Paquelet | |
| 2005/0059998 A1 | 3/2005 | Norte et al. | |
| 2005/0075079 A1 | 4/2005 | Jei et al. | |
| 2005/0093976 A1 | 5/2005 | Valleriano | |
| 2005/0148281 A1* | 7/2005 | Sanchez-Castro | A63H 17/14 446/444 |
| 2005/0207617 A1 | 9/2005 | Sarnoff | |
| 2006/0067324 A1 | 3/2006 | Kim | |
| 2006/0139167 A1 | 6/2006 | Davie et al. | |
| 2006/0164213 A1 | 7/2006 | Burghard et al. | |
| 2006/0252476 A1 | 11/2006 | Bahou | |
| 2006/0264730 A1 | 11/2006 | Stivoric et al. | |
| 2006/0271912 A1 | 11/2006 | Mickle et al. | |
| 2006/0281061 A1 | 12/2006 | Hightower et al. | |
| 2007/0091292 A1 | 4/2007 | Cho et al. | |
| 2007/0176749 A1 | 8/2007 | Boyd et al. | |
| 2007/0296723 A1 | 12/2007 | Williams | |
| 2008/0065684 A1 | 3/2008 | Zilberman | |
| 2008/0106381 A1 | 5/2008 | Adamec et al. | |
| 2008/0113787 A1 | 5/2008 | Alderucci | |
| 2008/0129825 A1 | 6/2008 | DeAngelis et al. | |
| 2008/0140233 A1 | 6/2008 | Seacat | |
| 2008/0182724 A1 | 7/2008 | Guthrie et al. | |
| 2008/0186231 A1 | 8/2008 | Aljadeff et al. | |
| 2008/0204248 A1 | 8/2008 | Winget et al. | |
| 2008/0262885 A1 | 10/2008 | Jain et al. | |
| 2008/0266131 A1 | 10/2008 | Richardson et al. | |
| 2008/0269016 A1 | 10/2008 | Ungari et al. | |
| 2008/0281443 A1 | 11/2008 | Rodgers | |
| 2008/0285805 A1 | 11/2008 | Luinge et al. | |
| 2008/0291024 A1 | 11/2008 | Zhang et al. | |
| 2009/0048044 A1 | 2/2009 | Oleson et al. | |
| 2009/0231198 A1 | 9/2009 | Walsh et al. | |
| 2010/0026809 A1 | 2/2010 | Curry | |
| 2010/0045508 A1 | 2/2010 | Ekbal et al. | |
| 2010/0054304 A1 | 3/2010 | Barnes et al. | |
| 2010/0060452 A1 | 3/2010 | Schuster et al. | |
| 2010/0150117 A1 | 6/2010 | Aweya et al. | |
| 2010/0174506 A1 | 7/2010 | Joseph et al. | |
| 2010/0250305 A1 | 9/2010 | Lee et al. | |
| 2010/0278386 A1 | 11/2010 | Hoeflinger | |
| 2010/0283630 A1 | 11/2010 | Alonso | |
| 2010/0328073 A1* | 12/2010 | Nikitin | G01S 5/0247 340/572.1 |
| 2011/0025847 A1 | 2/2011 | Park et al. | |
| 2011/0054782 A1 | 3/2011 | Kaahui et al. | |
| 2011/0063114 A1* | 3/2011 | Ikoyan | A63B 23/0244 340/573.7 |
| 2011/0064023 A1 | 3/2011 | Yamamoto et al. | |
| 2011/0084806 A1 | 4/2011 | Perkins et al. | |
| 2011/0134240 A1 | 6/2011 | Anderson et al. | |
| 2011/0140970 A1* | 6/2011 | Fukagawa | G01S 13/765 342/458 |
| 2011/0159939 A1* | 6/2011 | Lin | A63B 69/004 463/8 |
| 2011/0169959 A1 | 7/2011 | DeAngelis et al. | |
| 2011/0195701 A1 | 8/2011 | Cook et al. | |
| 2011/0261195 A1 | 10/2011 | Martin et al. | |
| 2011/0300905 A1 | 12/2011 | Levi | |
| 2011/0320322 A1 | 12/2011 | Roslak et al. | |
| 2012/0014278 A1 | 1/2012 | Ameti et al. | |
| 2012/0015665 A1 | 1/2012 | Farley et al. | |
| 2012/0024516 A1 | 2/2012 | Bhaduri et al. | |
| 2012/0057634 A1 | 3/2012 | Shi et al. | |
| 2012/0057640 A1 | 3/2012 | Shi et al. | |
| 2012/0065483 A1 | 3/2012 | Chung et al. | |
| 2012/0081531 A1 | 4/2012 | DeAngelis et al. | |
| 2012/0112904 A1 | 5/2012 | Nagy et al. | |
| 2012/0126973 A1 | 5/2012 | DeAngelis et al. | |
| 2012/0139708 A1* | 6/2012 | Paradiso | G06F 3/014 340/10.1 |

(56) References Cited

U.S. PATENT DOCUMENTS

| | | | |
|---|---|---|---|
| 2012/0184878 A1* | 7/2012 | Najafi | A61B 5/4833 600/592 |
| 2012/0212505 A1 | 8/2012 | Burroughs et al. | |
| 2012/0218301 A1 | 8/2012 | Miller | |
| 2012/0225676 A1 | 9/2012 | Boyd et al. | |
| 2012/0231739 A1 | 9/2012 | Chen et al. | |
| 2012/0246795 A1 | 10/2012 | Scheffler et al. | |
| 2012/0256745 A1 | 10/2012 | Plett et al. | |
| 2012/0268239 A1* | 10/2012 | Ljung | H04W 4/028 340/5.8 |
| 2013/0003860 A1 | 1/2013 | Sasai et al. | |
| 2013/0021142 A1 | 1/2013 | Matsui et al. | |
| 2013/0021206 A1 | 1/2013 | Hach et al. | |
| 2013/0041590 A1 | 2/2013 | Burich et al. | |
| 2013/0066448 A1 | 3/2013 | Alonso | |
| 2013/0076645 A1 | 3/2013 | Anantha | |
| 2013/0096704 A1 | 4/2013 | Case | |
| 2013/0115904 A1 | 5/2013 | Kapoor et al. | |
| 2013/0138386 A1 | 5/2013 | Jain et al. | |
| 2013/0142384 A1 | 6/2013 | Ofek | |
| 2013/0202062 A1 | 8/2013 | Sadr et al. | |
| 2013/0257598 A1 | 10/2013 | Kawaguchi et al. | |
| 2013/0339156 A1 | 12/2013 | Sanjay et al. | |
| 2014/0038544 A1 | 2/2014 | Jones et al. | |
| 2014/0055588 A1* | 2/2014 | Bangera | A61J 7/0481 348/77 |
| 2014/0089243 A1 | 3/2014 | Oppenheimer | |
| 2014/0145828 A1 | 5/2014 | Bassan-Eskenazi | |
| 2014/0156036 A1 | 6/2014 | Huang | |
| 2014/0170607 A1 | 6/2014 | Hsiao et al. | |
| 2014/0221137 A1 | 8/2014 | Krysiak et al. | |
| 2014/0301427 A1 | 10/2014 | Khalaf-Allah | |
| 2014/0320660 A1 | 10/2014 | DeAngelis et al. | |
| 2014/0361875 A1 | 12/2014 | O'Hagan et al. | |
| 2014/0361906 A1 | 12/2014 | Hughes et al. | |
| 2014/0364141 A1 | 12/2014 | O'Hagan et al. | |
| 2014/0365415 A1 | 12/2014 | Stelfox et al. | |
| 2015/0002272 A1 | 1/2015 | Alonso et al. | |
| 2015/0057981 A1 | 2/2015 | Gross | |
| 2015/0085111 A1 | 3/2015 | Lavery | |
| 2015/0097653 A1 | 4/2015 | Gibbs et al. | |
| 2015/0358852 A1 | 12/2015 | Richley et al. | |
| 2015/0360133 A1 | 12/2015 | MacCallum et al. | |
| 2015/0375041 A1 | 12/2015 | Richley et al. | |
| 2015/0375083 A1 | 12/2015 | Stelfox et al. | |
| 2015/0378002 A1 | 12/2015 | Hughes et al. | |
| 2015/0379387 A1 | 12/2015 | Richley | |
| 2016/0097837 A1 | 4/2016 | Richley et al. | |
| 2016/0361595 A1 | 12/2016 | O'Hagan | |

FOREIGN PATENT DOCUMENTS

| | | |
|---|---|---|
| EP | 1253438 A2 | 10/2002 |
| EP | 1503513 A1 | 2/2005 |
| EP | 2474939 A1 | 11/2012 |
| WO | WO-9805977 A1 | 2/1998 |
| WO | WO 99/61936 A1 | 12/1999 |
| WO | WO 0108417 | 2/2001 |
| WO | WO 2006/022548 | 3/2006 |
| WO | WO-2010/083943 A1 | 7/2010 |
| WO | WO 2015/051813 A1 | 4/2014 |
| WO | WO 2014197600 | 12/2014 |

OTHER PUBLICATIONS

International Search Report and Written Opinion for International Application No. PCT/IB2015/054099 dated Dec. 9, 2015.
U.S. Appl. No. 14/296,703, filed Jun. 5, 2014; In re: Alonso et al., entitle Method and Apparatus for Associating Radio Frequency Identification Tags with Participants.
International Search Report and Written Opinion for International Application No. PCT/IB2015/059264 dated Feb. 10, 2016.
Jiyun Zhang et al., "UWB Systems for Wireless Sensor Networks", Proceedings of the IEEE, IEEE. New York, US, vol. 97, No. 2, Feb. 1, 2009 (Feb. 1, 2009), pp. 313-331.
International Search Report and Written Opinion for International Application No. PCT/US2015/034267 dated Sep. 25, 2015.
International Search Report and Written Opinion for International Application No. PCT/IB2015/054103 dated Aug. 14, 2015.
Cheong, P. et al., "Synchronization, TOA and Position Estimation for Low-Complexity LDR UWB Devices", Ultra-Wideband, 2005 IEEE International Conference, Zurich, Switzerland Sep. 5-8, 2005, Piscataway, NJ, USA, IEEE, Sep. 5, 2005.
International Search Report and Written Opinion for International Application No. PCT/IB2015/054213 dated Aug. 6, 2015.
Wang, Y. et al., "An Algorithmic and Systematic Approach from Improving Robustness of TOA-Based Localization", 2013 IEEE 10th International Conference on High Performance Computing and Communications & 2013 IEEE, Nov. 13, 2013, pp. 2066-2073.
Guvenc, I. et al., "A Survey on TOA Based Wireless Localization and NLOA Mitigation Techniques", IEEE Communications Surveys, IEEE, New York, NY US, vol. 11, No. 3, Oct. 1, 2009, pp. 107-124.
International Search Report and Written Opinion for International Application PCT/IB2015/054102 dated Nov. 4, 2015.
"Seattleite wins top prize in Microsoft's Super Bowl tech Contest", San Francisco AP, Komonews.com, Feb. 6, 2016. <http://komonews.com/news/local/seattleite-wins-top-prize-in-microsofts-super-bowl-tech-contest>.
Bahle et al., "I See You: How to Improve Wearable Activity Recognition by Leveraging Information from Environmental Cameras," Pervasive Computing and Communications Workshops, IEEE International Conference, (Mar. 18-22, 2013).
Teixeira et al., "Tasking Networked CCTV Cameras and Mobile Phones to identify and Localize Multiple People," Ubicomp '10 Proceedings of the 12th ACM International Conference on Ubiquitous Computing, pp. 213-222 (Sep. 26-29, 2010).
Complaint before the United States District Court of Massachusetts, Civil Action No. 1:15-cv-12297, *Lynx System Developers, Inc. et al. v. Zebra Enterprise Solutions Corporation et al.*, filed Mar. 23, 2016.
Complaint before the United States District Court of Massachusetts, Civil Action No. 1:15-cv-12297, *Lynx System Developers, Inc. et al. v. Zebra Enterprise Solutions Corporation et al.*, filed Jun. 10, 2015.
U.S. Appl. No. 61/895,548, filed Oct. 26, 2013; In re: Alonso et al., entitled *Method, Apparatus, and Computer Program Product for Collecting Sporting Event Data Based on Real Time Data for Proximity and Movement of Objects.*
Swedberg, Claire, "USDA Researchers Develop System to Track Livestock Feeding Behavior Unobtrusively", RFID Journal, Jul. 18, 2013.
International Search Report and Written Opinion from International Application No. PCT/US2014/041062 dated Oct. 1, 2014.
International Search Report and Written Opinion from International Application No. PCT/US2014/040947 dated Oct. 9, 2014.
Fontana, R.J., Richley, E., Barney, J., "Commercialization of an Ultra Wideband Precision Asset Location System," *2003 IEEE Conference on Ultra Wideband Systems and Technologies*, Nov. 16-19, 2003.
Gueziec, A., "Tracking Pitches for Broadcast Television," *Computer*, Aug. 7, 2002.
CattleLog Pro, *eMerge Interactive, Inc.*, Sebastian, FL, 2004.
Marchant, J., Secure Animal Identification and Source Verification, *JM Communications*, UK, 2002.
"A Guide to Using NLIS Approved Ear Tags and Rumen Boluses," National Livestock Identification Scheme, *Meat & Livestock Australia Limited*, North Sydney, Australia, May 2003.
King, L., "NAIS Cattle ID Pilot Projects Not Needed, Since Proven Advanced Technology Already Exists," *ScoringSystem, Inc.*, Sarasota, FL, Dec. 27, 2005. (www.prweb.com/releases/2005/12prweb325888.htm).
"RFID in the Australian Meat and Livestock Industry," Allflex Australia Pty Ltd,Capalaba, QLD (AU), *Data Capture Suppliers Guide*, 2003-2004.
International Search Report and Written Opinion from International Application No. PCT/US2014/040881 dated Nov. 4, 2014.

(56) References Cited

OTHER PUBLICATIONS

Swedberg, C., "N.J. Company Seeks to Market Passive Sensor RFID Tags," *RFID Journal*, Jun. 20, 2013.
International Search Report and Written Opinion from International Application No. PCT/US2014/040940 dated Dec. 17, 2014.
Defendant's Answer to Complaint before the United States District Court of Massachusetts, Civil Action No. 1:15-cv-12297, *Lynx System Developers, Inc. et al.* v. *Zebra Enterprise Solutions Corporation et al.*, filed Apr. 6, 2016.
International Search Report and Written Opinion for International Application No. PCT/US2016/035614 dated Sep. 15, 2016.
Zhu et al., "A Real-Time Articultural Human Motion Tracking Using Tri-Axis Inertial/Magnetic Sensors Package," IEEE Transactions on Neural Systems and Rehabilitation Engineering, vol. 12, No. 2, Jun. 2004, pp. 295-302.
International Search Report for International Application No. PCT/US2014/053647 dated Dec. 19, 2014.

\* cited by examiner

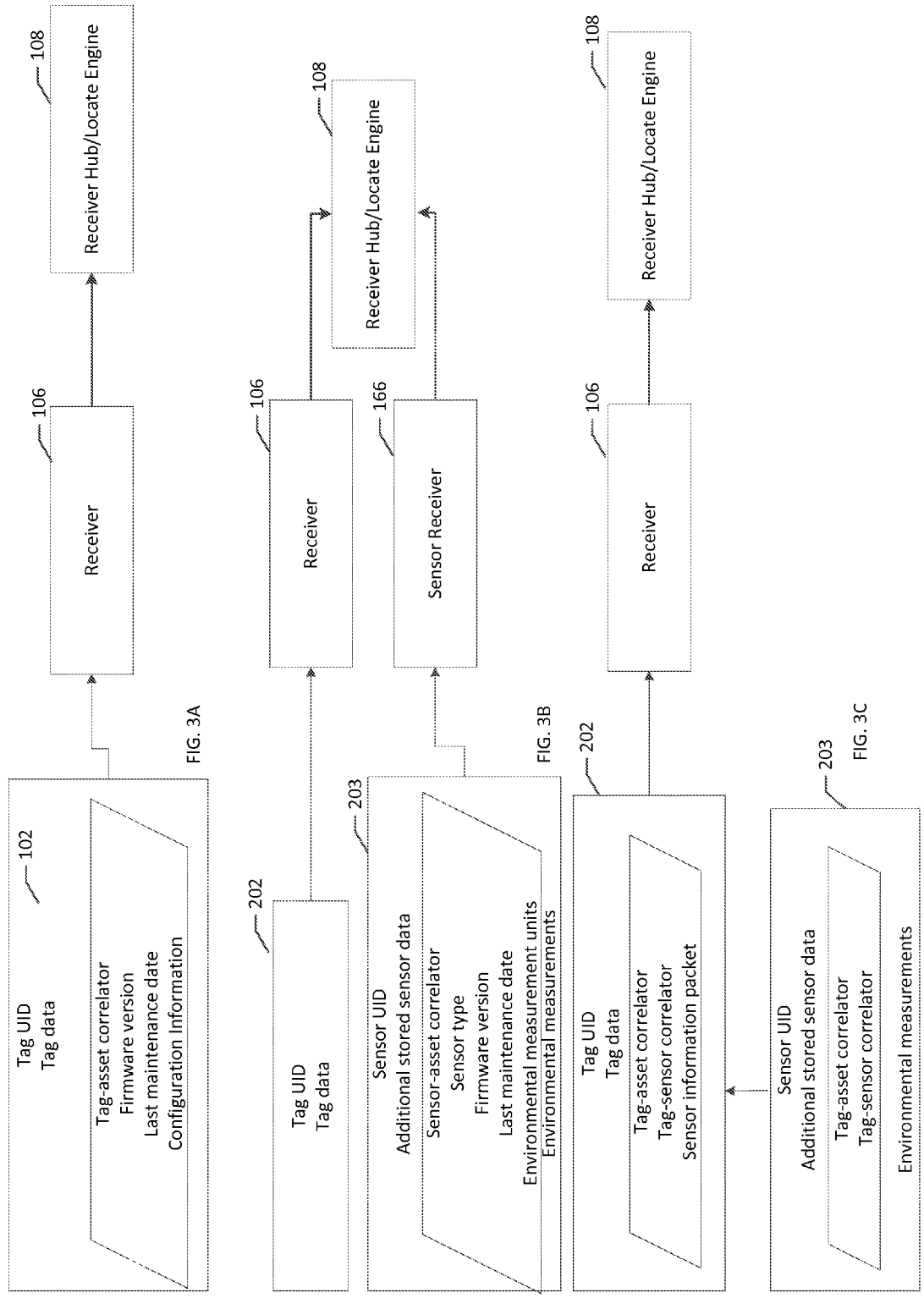

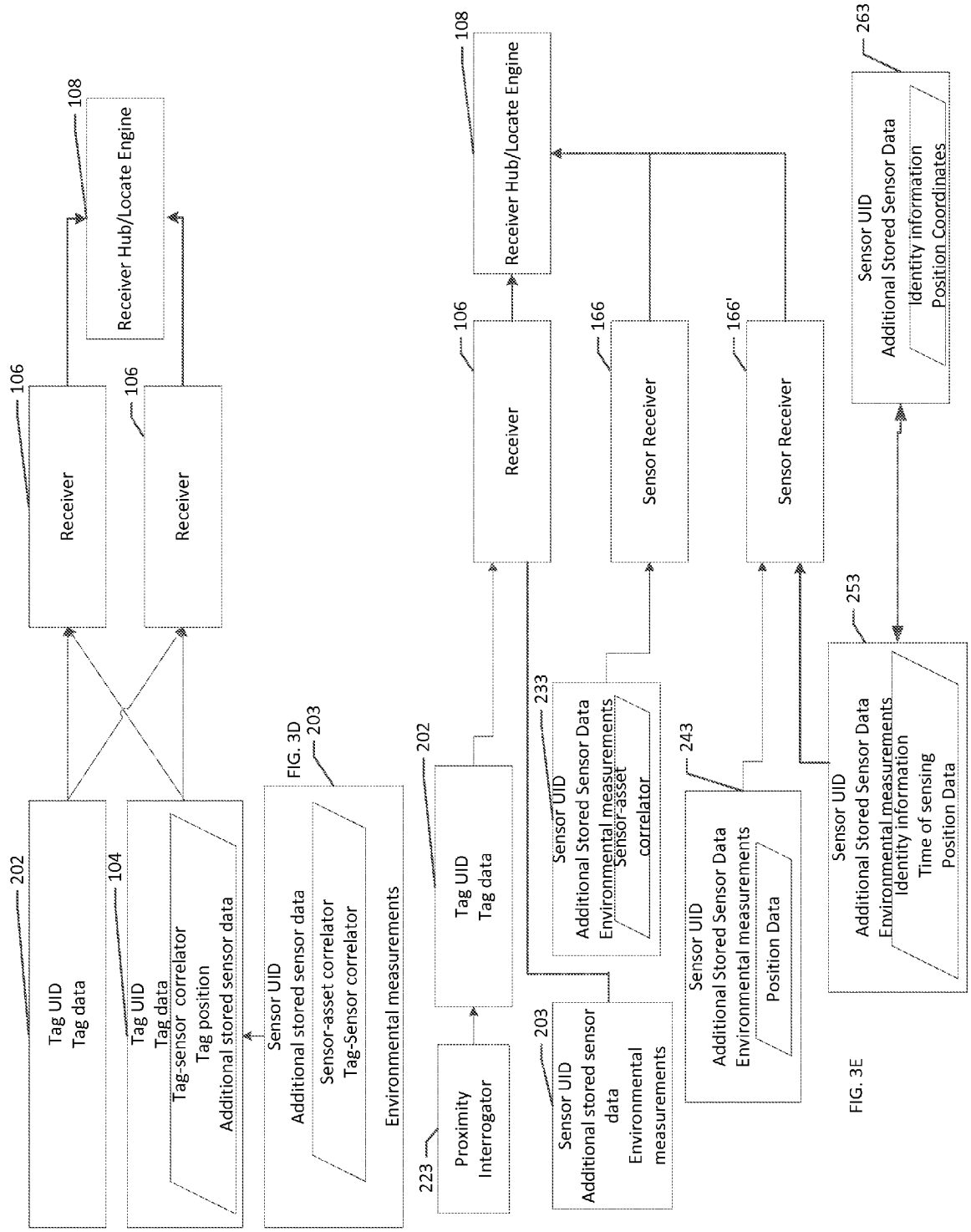

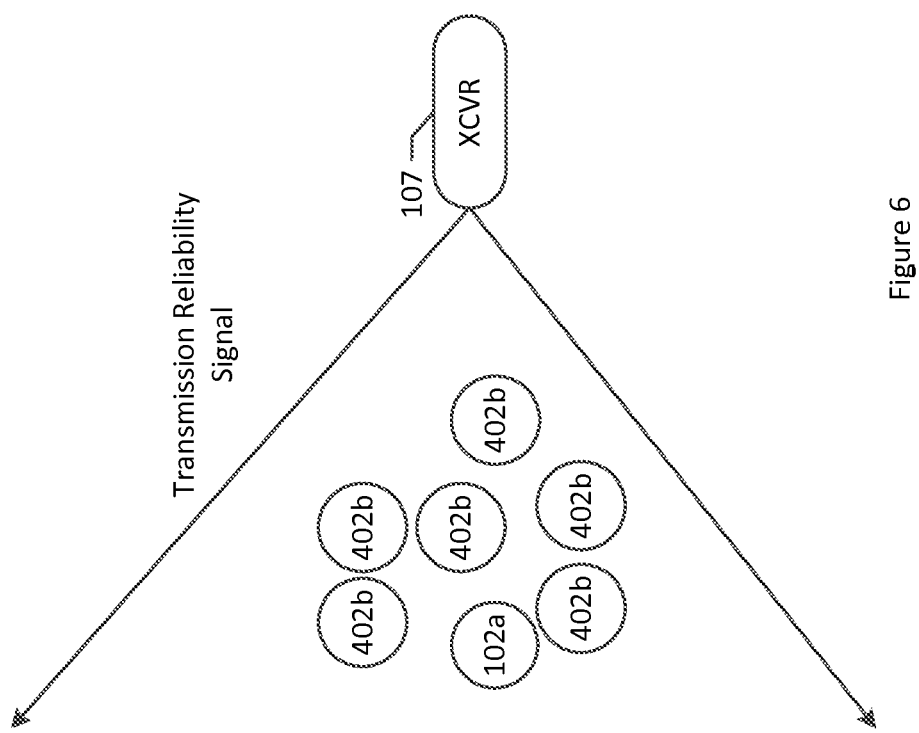

METHOD, APPARATUS, AND COMPUTER PROGRAM PRODUCT FOR EMPLOYING A SPATIAL ASSOCIATION MODEL IN A REAL TIME LOCATION SYSTEM

CROSS REFERENCE TO RELATED APPLICATION

This application claims the benefit of U.S. Provisional Application No. 62/009,152, filed Jun. 6, 2014, which is herein incorporated by reference in its entirety.

FIELD

Embodiments discussed herein are related to radio frequency locating and, more particularly, to systems, methods, apparatus, computer readable media for improving error detection for location tags within a real time location system (RTLS).

BACKGROUND

A number of deficiencies and problems associated with RTLS locating are identified herein. Through applied effort, ingenuity, and innovation, exemplary solutions to many of these identified problems are embodied by the present invention, which is described in detail below.

BRIEF SUMMARY

Systems, methods, apparatus, and computer readable media are disclosed for improving error detection for real time location systems (RTLS). In some embodiments a method is provided for processing location information received from a radio frequency (RF) location tag. The method includes determining a first location of a first RF location tag associated with an asset, determining at least one second location of at least one second RF location tag associated with the asset, determining, using a processor, that the first location is not a valid location based at least in part on a comparison of the first location with the at least one second location using a spatial association model associated with the asset, and identifying the first location as erroneous in response to determining that the first location is not a valid location. The spatial association model may include a maximum distance between one or more RF location tags associated with the asset. The spatial association model may include a number of RF location tags associated with the asset. The spatial association model may include a distance relationship between two or more RF location tags associated with the spatial association model. The distance relationship may include a maximum distance between the two or more RF location tags. The distance relationship may include a range of acceptable distances between the two or more RF location tags. Determining that the first location is not a valid location further may include determining that the first location is erroneous based on the first location of the first RF location tag being in a location determined to be invalid based on the distance relationship. The distance relationship may include a physical distance between points on the asset associated with at least one RF location tag. The asset may be a human being, and the distance relationship may be determined based at least in part on biometric measurements of the human being.

Embodiments may also include an apparatus for processing location information received from a radio frequency (RF) location tag. The apparatus includes a processor coupled to a memory. The memory includes instructions that, when executed by the apparatus, configure the apparatus to determine a first location of a first RF location tag associated with an asset, to determine at least one second location of at least one second RF location tag associated with the asset, to determine, using a processor, that the first location is not a valid location based at least in part on a comparison of the first location with the at least one second location using a spatial association model associated with the asset, and to identify the first location as erroneous in response to determining that the first location is not a valid location. The spatial association model may include a maximum distance between one or more RF location tags associated with the asset. The spatial association model may include a number of RF location tags associated with the asset. The spatial association model may include a distance relationship between two or more RF location tags associated with the spatial association model. The distance relationship may include a maximum distance between the two or more RF location tags. The distance relationship may include a range of acceptable distances between the two or more RF location tags. The apparatus may be further configured to determine that the first location is not a valid location by at least determining that the first location is erroneous based on the first location of the first RF location tag being in a location determined to be invalid based on the distance relationship. The distance relationship may include a physical distance between points on the asset associated with at least one RF location tag. The asset may be a human being, and the distance relationship may be determined based at least in part on biometric measurements of the human being.

Embodiments may also provide computer program product. The computer program product includes a non-transitory computer readable storage medium. The non-transitory computer readable storage medium includes instructions that, when executed by a processor, configure an apparatus to determine a first location of a first RF location tag associated with an asset, to determine at least one second location of at least one second RF location tag associated with the asset, to determine, using a processor, that the first location is not a valid location based at least in part on a comparison of the first location with the at least one second location using a spatial association model associated with the asset, and to identify the first location as erroneous in response to determining that the first location is not a valid location. The spatial association model may include a maximum distance between one or more RF location tags associated with the asset. The spatial association model may include a number of RF location tags associated with the asset. The spatial association model may include a distance relationship between two or more RF location tags associated with the spatial association model. The distance relationship may include a maximum distance between the two or more RF location tags. The distance relationship may include a range of acceptable distances between the two or more RF location tags. The apparatus may be further configured to determine that the first location is not a valid location by at least determining that the first location is erroneous based on the first location of the first RF location tag being in a location determined to be invalid based on the distance relationship. The distance relationship may include a physical distance between points on the asset associated with at least one RF location tag. The asset may be a human being, and the distance relationship may be determined based at least in part on biometric measurements of the human being.

Yet further embodiments include a method of registering an asset. The method includes defining an asset reference point for the asset, attaching to the asset, at a first attachment point, a first RF location tag, the first RF location tag configured to provide a first tag identifier, attaching to the asset, at a second attachment point, a second RF location tag, configured to provide a second tag identifier, defining an asset reference triangle comprising the asset reference point, the first attachment point, and the second attachment point, determining a length of each side of the asset reference triangle, and storing, in a memory, an identity of the asset, the length of each side of the reference triangle, the first tag identifier, and the second tag identifier.

Further embodiments may provide a method of registering an asset. The method includes attaching, to the asset at a first attachment point, a first RF location tag configured to provide a first tag identifier, attaching, to the asset at a second attachment point, a second RF location tag configured to provide a second tag identifier, defining an asset reference distance between the first attachment point and the second attachment point, and storing, in a memory, an identity of the asset, the asset reference distance, the first tag identifier, and the second tag identifier.

Yet further embodiments may include a method of locating an asset. The method includes determining a first location of a first RF location tag associated with the asset, determining a second location of a second RF location tag associated with the asset, and determining an asset location of the asset based on the first location and the second location. The method may also include determining an asset reference distance associated with the asset, wherein determining an asset location of the asset is based on the asset reference distance. The method may further include determining an asset reference triangle associated with the asset. Determining an asset location of the asset may be based on the asset reference triangle.

Additional embodiments may include a method to estimate the location of an asset. The method includes determining a first location of a first RF location tag associated with the asset, determining a first asset location of the asset based on the first location of a first RF location tag, assigning a first numerical weight to the first asset location, determining a second location of a second RF location tag associated with the asset, determining an asset location estimate of the asset based on the second location of the second RF location tag, assigning a second numerical weight to the asset location estimate, and determining a second asset location of the asset based on the first asset location, the first numerical weight, the asset location estimate, and the second numerical weight.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 illustrates an exemplary environment equipped with a radio frequency locating system and sensors for determining an asset location in accordance with some embodiments of the present invention;

FIGS. 2A-E illustrate some exemplary tags and sensor configurations that may provide information for asset location or position determination in accordance with some embodiments of the present invention;

FIGS. 3A-3F are block diagrams showing the input and output of receivers and sensor receivers in accordance with some embodiments of the present invention;

FIG. 6 illustrates an exemplary receiver and transmission reliability signal path in accordance with some example embodiments of the present invention;

DETAILED DESCRIPTION

Figure 1:
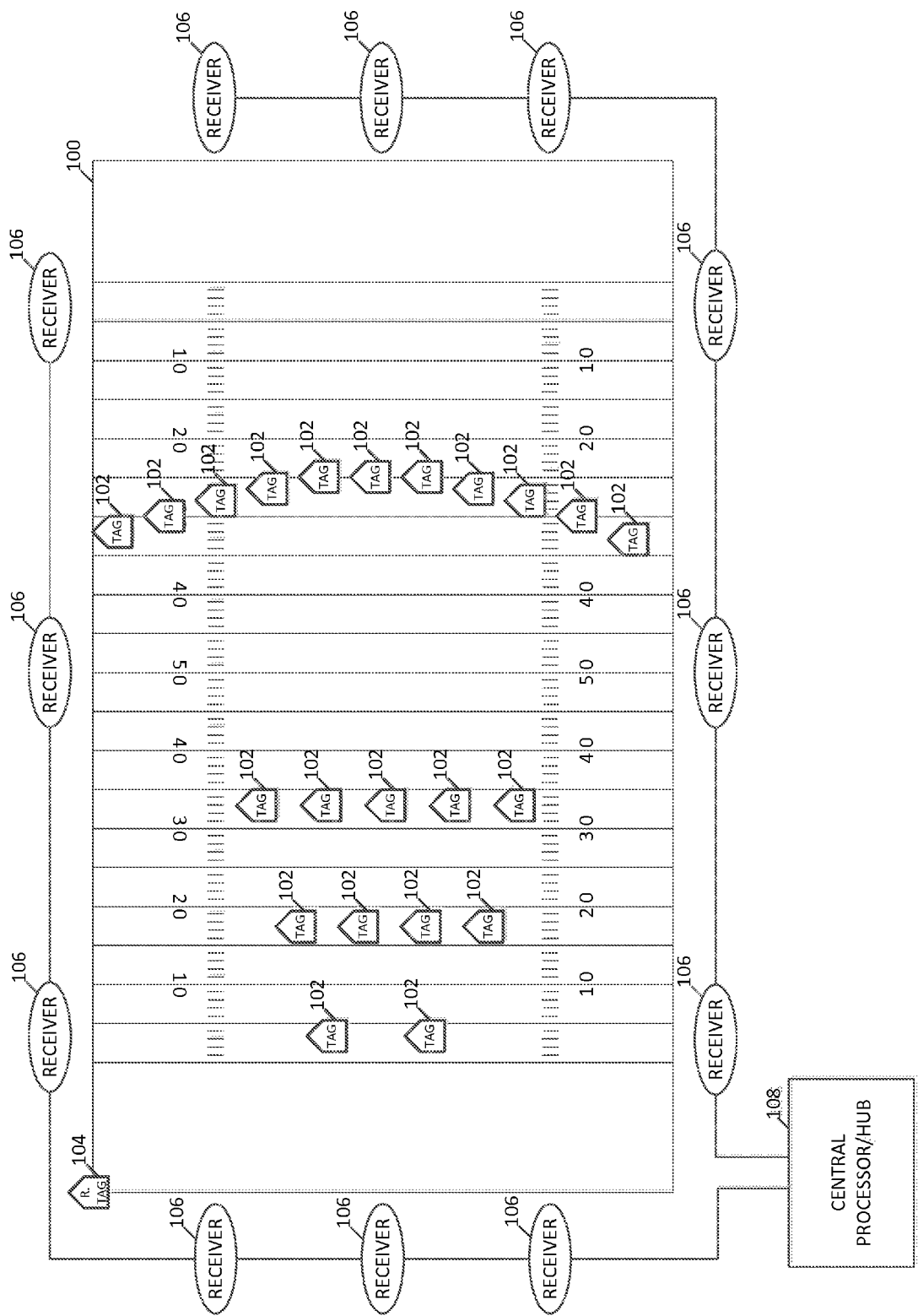

The present invention now will be described more fully hereinafter with reference to the accompanying drawings, in which some, but not all embodiments of the inventions are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

PRELIMINARY DEFINITIONS

A "tag", "location tag", "RF location tag" or "locate tag" refers to an ultra-wide band (UWB) transmitter that transmits a signal comprising a burst (e.g., 72 pulses at a burst rate of 1 Mb/s), and optionally, a burst having a tag data packet that may include tag data elements that may include, but are not limited to, a tag unique identification number (tag UID), other identification information, a sequential burst count, stored tag data, or other desired information for object or personnel identification, inventory control, etc. Transmitted tag signals are referred to herein as "blink data".

A "sensor" refers to any device that may collect and/or transmit data. Such devices may include, without limitation, position triangulation devices such as global positioning systems (GPS), proximity detectors, accelerometers, magnetometers, time-of-flight sensors, health monitoring sensors (e.g., blood pressure sensors, heart monitors, respiration sensors, moisture sensors, temperature sensors), light sensors, microphones, or the like.

Tags and sensors may be separate units or may be housed in a single monitoring unit. In some instances, the tag is configured to be in data communication with a sensor. Further, a tag may be configured to be in communication with a short range low frequency receiver. Tags and sensors may be associated with each other based on proximate mounting position on an asset or by a tag-sensor correlator, which is discussed in detail below. Additionally or alternatively, tags and sensors may be associated in a database, perhaps during a registration step, by a receiver hub or receiving processing and distribution system.

The terms "registered," and "registration" refers to the process by which a tag is associated with a particular asset, such as in a database. Tags that are not associated with a particular asset may be considered "unregistered". Tags that are associated with a particular asset may be considered "registered". The term "activation" refers to the process by which a tag is configured to provide blink data. For example, activation of a tag may include sending a signal to the tag that causes the tag to periodically "blink" to indicate its location to a receiver. Tags may initially be "deactivated" or "unactivated" until receipt of an activation signal. Similarly, tags may be "activated" until receiving a deactivation signal or until a power source of the tag depletes to the point where the tag can no longer provide data to a location system. In some embodiments, a tag may be deactivated until receiving an activation signal, then become activated, then return to deactivation when the activation signal stops. In some embodiments, a tag may be deactivated until receiving an activation signal, then become activated, then return to deactivation after a time period has elapsed.

The term "location data" or "locate data" refers to a location determined by the location system based on blink data transmissions received from a location tag by receivers.

The term "position data" refers to data received from sensors that may be used to determine a position calculation data or position of a sensor, which is not based on location tag blink data transmissions. Examples may include triangulation positioning data, such as global positioning, telemetry data, or the like.

The term "asset data" may include, without limitation, team name, team code, player name, player number, tag identification (e.g., tag UID) assigned to left shoulder, tag identification assigned to right shoulder, or the like. Asset data may be searched or filtered by team name, team identification, player number, player name, player role (e.g., the player's assigned field role, such as wide receiver, quarterback, offensive tackle, linebacker, defensive end, cornerback, or the like) or the like. Asset data entries may be edited by adding players/assets, updating an existing player, deleting a player, associating a tag, disassociating a tag, or the like. If asset data is associated with a tag 102, a deletion may be allowed, but a prompt may be included indicating an existing tag association. In some examples, if the user selects "yes" the asset and tag data are deleted, if the user selects "no" the data may not be allowed to be deleted.

The terms "asset profile" and "role data" may refer to pre-defined data stored in association with the unique tag or sensor identifiers. In other embodiments, the asset profile or role data may also be "learned" by the system as a result of received tag or sensor data, formation data, play data, event data, and/or the like. For example, in some embodiments the system may determine that a tag or sensor is not correlated to an asset profile and may analyze data received from the tag and/or sensor to determine possible asset roles, etc., which may be ranked and then selected/confirmed by the system or by a user after being displayed by the system. In some embodiments, the system may determine possible asset roles (i.e., asset role data) based on determined asset location data (e.g., movement patterns, alignment position, etc.).

The term "spatial association model" may refer to data associated with a particular asset that defines the expected relationship between tags or sensors associated with that asset. A spatial association model may define a distance relationship between particular tags such that certain tags are expected to be located within a particular distance of one another, to a fixed point, to a central location (e.g., a "center of gravity" of tag locations defined in the spatial association model, or the like). This distance relationship may be a particular distance (e.g., tag A and tag B should be located within 12 inches of one another), a range of distances (e.g., tag A and tag B should be located at least 6 inches apart and no further than 12 inches apart), or any other method of defining a relationship between the relative positioning of two or more objects. The spatial association model may further include identifiers for particular tags. For example, a spatial association model corresponding to a player in a football game may include an identifier for a tag in the left side of the player's shoulder pads, a tag in the right side of the player's shoulder pads, and an expected distance relationship between the two. Alternatively, a spatial association model corresponding to a pallet of goods may include identifiers for tags associated with each asset good stacked on the pallet, corresponding to the relative size of the good compared to the size of the pallet.

Additionally or alternatively, the spatial association model may define certain tolerances or parameters for comparing information received from different sources. For example, the spatial association model may define an expected size or range of sizes for a particular asset. These size values may be used to reconcile data received from different sources (e.g., GPS position data vs. blink data location data) to determine if any of the data is erroneous.

For example, different data sources may have different resolutions, and as such may identify the location or position of a given asset at different coordinates. However, if one of the sources is malfunctioning, it may be difficult to determine which source is correct, or whether the source is merely operating within normal resolution tolerances. By comparing the data received from each source with a spatial association model for the asset, embodiments may determine which source, if any, is malfunctioning, and whether to disregard data from that source.

Overview

Systems that identify the location of entities using Radio Frequency Identification (RFID) tags may include the use of multiple tags per asset to establish an accurate location of the asset. However, circumstances may occasionally result in erroneous data being received from one or more of the tags associated with the asset. For example, wireless signals may be reflected, giving the impression that a tag is in a location corresponding to the surface that caused the reflection rather than its actual location. Damaged tags may malfunction, providing incorrect information, or not providing any information at all. Tags may be lost or otherwise physically removed from assets. As such, there is a need for improved systems for detecting errors in tag location information.

To this end, example embodiments provide for a spatial association model which corresponds to the particular asset with which the tags are associated. The spatial association model defines particular attributes of the asset which may be utilized to determine the validity of location information derived from the associated tags. For example, the physical dimensions of the asset may be used to determine a distance relationship between tags associated with the asset, a maximum range of motion for movable elements of the asset may be used to determine valid relative positions for tags affixed to those movable elements, or the like. In the case of a player in a football game, the width of the player's shoulders may be used to determine a valid range of distances between a tag affixed to the player's left shoulder pad and a tag affixed to the player's right shoulder pad. In the case of a pallet of goods, the length, width, and/or height of the pallet may define acceptable positions for tags associated with goods stored on the pallet. In this manner, if a tag or tags associated with the asset are located in a position that is inconsistent with the spatial association model for the asset, data from one or more of the tags may be identified as erroneous. Furthermore, by storing known measurements between particular tags or other points on the asset, a spatial association model may be employed to improve location and/or position measurements associated with the asset. Additionally, spatial association models may be leveraged for other uses, such as detection of security breaches or theft, identification of lost or damaged tags, or the like.

Furthermore, the use of spatial association models may further be used to process and analyze information received from different sources of location data.

Example Real Time Locating System

FIG. 1 illustrates an exemplary locating system 100 useful for calculating a location by an accumulation of position data or time of arrivals (TOAs) at a central processor/Hub 108, whereby the TOAs represent a relative time of flight (TOF) from RTLS tags 102 as recorded at each receiver 106 (e.g., UWB reader, etc.). A timing reference clock is used, in some examples, such that at least a subset of the receivers 106 may be synchronized in frequency, whereby the relative TOA data associated with each of the RTLS tags 102 may be registered by a counter associated with at least a subset of the receivers 106. In some examples, a reference tag 104, preferably a UWB transmitter, positioned at known coordinates, is used to determine a phase offset between the counters associated with at least a subset of the of the receivers 106. The RTLS tags 102 and the reference tags 104 reside in an active RTLS field. The systems described herein may be referred to as either "multilateration" or "geolocation" systems, terms that refer to the process of locating a signal source by solving an error minimization function of a location estimate determined by the difference in time of arrival (DTOA) between TOA signals received at multiple receivers 106.

In some examples, the system comprising at least the tags 102 and the receivers 106 is configured to provide two dimensional and/or three dimensional precision localization (e.g., subfoot resolutions), even in the presence of multipath interference, due in part to the use of short nanosecond duration pulses whose TOF can be accurately determined using detection circuitry, such as in the receivers 106, which can trigger on the leading edge of a received waveform. In some examples, this short pulse characteristic allows necessary data to be conveyed by the system at a higher peak power, but lower average power levels, than a wireless system configured for high data rate communications, yet still operate within local regulatory requirements.

In some examples, to provide a preferred performance level while complying with the overlap of regulatory restrictions (e.g. FCC and ETSI regulations), the tags 102 may operate with an instantaneous −3 dB bandwidth of approximately 400 MHz and an average transmission below 187 pulses in a 1 msec interval, provided that the packet rate is sufficiently low. In such examples, the predicted maximum range of the system, operating with a center frequency of 6.55 GHz, is roughly 200 meters in instances in which a 12 dBi directional antenna is used at the receiver, but the projected range will depend, in other examples, upon receiver antenna gain. Alternatively or additionally, the range of the system allows for one or more tags 102 to be detected with one or more receivers positioned throughout a football stadium used in a professional football context. Such a configuration advantageously satisfies constraints applied by regulatory bodies related to peak and average power densities (e.g., effective isotropic radiated power density ("EIRP")), while still optimizing system performance related to range and interference. In further examples, tag transmissions with a −3 dB bandwidth of approximately 400 MHz yields, in some examples, an instantaneous pulse width of roughly 2 nanoseconds that enables a location resolution to better than 30 centimeters.

Referring again to FIG. 1, the object to be located has an attached tag 102, preferably a tag having a UWB transmitter, that transmits a burst (e.g., multiple pulses at a 1 Mb/s burst rate, such as 112 bits of On-Off keying (OOK) at a rate of 1 Mb/s), and optionally, a burst comprising an information packet utilizing OOK that may include, but is not limited to, ID information, a sequential burst count or other desired information for object or personnel identification, inventory control, etc. In some examples, the sequential burst count (e.g., a packet sequence number) from each tag 102 may be advantageously provided in order to permit, at a Central Processor/Hub 108, correlation of TOA measurement data from various receivers 106.

In some examples, the tag 102 may employ UWB waveforms (e.g., low data rate waveforms) to achieve extremely fine resolution because of their extremely short pulse (i.e., sub-nanosecond to nanosecond, such as a 2 nsec (1 nsec up and 1 nsec down)) durations. As such, the information packet may be of a short length (e.g. 112 bits of OOK at a rate of 1 Mb/sec, in some example embodiments), that advantageously enables a higher packet rate. If each information packet is unique, a higher packet rate results in a higher data rate; if each information packet is transmitted repeatedly, the higher packet rate results in a higher packet repetition rate. In some examples, higher packet repetition rate (e.g., 12 Hz) and/or higher data rates (e.g., 1 Mb/sec, 2 Mb/sec or the like) for each tag may result in larger datasets for filtering to achieve a more accurate location estimate. Alternatively or additionally, in some examples, the shorter length of the information packets, in conjunction with other packet rate, data rates and other system requirements, may also result in a longer battery life (e.g., 7 years battery life at a transmission rate of 1 Hz with a 300 mAh cell, in some present embodiments).

Tag signals may be received at a receiver directly from RTLS tags, or may be received after being reflected en route. Reflected signals travel a longer path from the RTLS tag to the receiver than would a direct signal, and are thus received later than the corresponding direct signal. This delay is known as an echo delay or multipath delay. If reflected signals are sufficiently strong enough to be detected by the receiver, they can corrupt a data transmission through inter-symbol interference. In some examples, the tag 102 may employ UWB waveforms to achieve extremely fine resolution because of their extremely short pulse (e.g., 2 nsec) durations. Furthermore, signals may comprise short information packets (e.g., 112 bits of OOK) at a somewhat high burst data rate (1 Mb/sec, in some example embodiments), that advantageously enable packet durations to be brief (e.g. 112 microsec) while allowing inter-pulse times (e.g., 998 nsec) sufficiently longer than expected echo delays, avoiding data corruption.

Reflected signals can be expected to become weaker as delay increases due to more reflections and the longer distances traveled. Thus, beyond some value of inter-pulse time (e.g., 998 nsec), corresponding to some path length difference (e.g., 299.4 m.), there will be no advantage to further increases in inter-pulse time (and, hence lowering of burst data rate) for any given level of transmit power. In this manner, minimization of packet duration allows the battery life of a tag to be maximized, since its digital circuitry need only be active for a brief time. It will be understood that different environments can have different expected echo delays, so that different burst data rates and, hence, packet durations, may be appropriate in different situations depending on the environment.

Minimization of the packet duration also allows a tag to transmit more packets in a given time period, although in practice, regulatory average EIRP limits may often provide an overriding constraint. However, brief packet duration also reduces the likelihood of packets from multiple tags overlapping in time, causing a data collision. Thus, minimal packet duration allows multiple tags to transmit a higher aggregate number of packets per second, allowing for the largest number of tags to be tracked, or a given number of tags to be tracked at the highest rate.

In one non-limiting example, a data packet length of 112 bits (e.g., OOK encoded), transmitted at a data rate of 1 Mb/sec (1 MHz), may be implemented with a transmit tag repetition rate of 1 transmission per second (1 TX/sec). Such an implementation may accommodate a battery life of up to seven years, wherein the battery itself may be, for example, a compact, 3-volt coin cell of the series no. BR2335 (Rayovac), with a battery charge rating of 300 mAhr. An alternate implementation may be a generic compact, 3-volt coin cell, series no. CR2032, with a battery charge rating of 220 mAhr, whereby the latter generic coin cell, as can be appreciated, may provide for a shorter battery life.

Alternatively or additionally, some applications may require higher transmit tag repetition rates to track a dynamic environment. In some examples, the transmit tag repetition rate may be 12 transmissions per second (12 TX/sec). In such applications, it can be further appreciated that the battery life may be shorter.

The high burst data transmission rate (e.g., 1 MHz), coupled with the short data packet length (e.g., 112 bits) and the relatively low repetition rates (e.g., 1 TX/sec), provide for two distinct advantages in some examples: (1) a greater number of tags may transmit independently from the field of tags with a lower collision probability, and/or (2) each independent tag transmit power may be increased, with proper consideration given to a battery life constraint, such that a total energy for a single data packet is less than a regulated average power for a given time interval (e.g., a 1 msec time interval for an FCC regulated transmission).

Alternatively or additionally, additional sensor or telemetry data may be transmitted from the tag to provide the receivers 106 with information about the environment and/or operating conditions of the tag. For example, the tag may transmit a temperature to the receivers 106. Such information may be valuable, for example, in a system involving perishable goods or other refrigerant requirements. In this example embodiment, the temperature may be transmitted by the tag at a lower repetition rate than that of the rest of the data packet. For example, the temperature may be transmitted from the tag to the receivers at a rate of one time per minute (e.g., 1 TX/min.), or in some examples, once every 720 times the data packet is transmitted, whereby the data packet in this example is transmitted at an example rate of 12 TX/sec.

Alternatively or additionally, the tag 102 may be programmed to intermittently transmit data to the receivers 106 in response to a signal from a magnetic command transmitter (not shown). The magnetic command transmitter may be a portable device, functioning to transmit a 125 kHz signal, in some example embodiments, with a range of approximately 15 feet or less, to one or more of the tags 102. In some examples, the tags 102 may be equipped with at least a receiver tuned to the magnetic command transmitter transmit frequency (e.g., 125 kHz) and functional antenna to facilitate reception and decoding of the signal transmitted by the magnetic command transmitter.

In some examples, one or more other tags, such as a reference tag 104, may be positioned within and/or about a monitored region. In some examples, the reference tag 104 may be configured to transmit a signal that is used to measure the relative phase (e.g., the count of free-running counters) of non-resettable counters within the receivers 106.

One or more (e.g., preferably four or more) receivers 106 are also positioned at predetermined coordinates within and/or around the monitored region. In some examples, the receivers 106 may be connected in a "daisy chain" fashion to advantageously allow for a large number of receivers 106 to be interconnected over a significant monitored region in order to reduce and simplify cabling, provide power, and/or the like. Each of the receivers 106 includes a receiver for receiving transmissions, such as UWB transmissions, and preferably, a packet decoding circuit that extracts a time of arrival (TOA) timing pulse train, transmitter ID, packet number, and/or other information that may have been encoded in the tag transmission signal (e.g., material description, personnel information, etc.) and is configured to sense signals transmitted by the tags 102 and one or more reference tags 104.

Each receiver 106 includes a time measuring circuit that measures times of arrival (TOA) of tag bursts, with respect to its internal counter. The time measuring circuit is phase-locked (e.g., phase differences do not change and therefore respective frequencies are identical) with a common digital reference clock signal distributed via cable connection from a Central Processor/Hub 108 having a central timing reference clock generator. The reference clock signal establishes a common timing reference for the receivers 106. Thus, multiple time measuring circuits of the respective receivers 106 are synchronized in frequency, but not necessarily in phase. While there typically may be a phase offset between any given pair of receivers in the receivers 106, the phase offset is readily determined through use of a reference tag 104. Alternatively or additionally, each receiver may be synchronized wirelessly via virtual synchronization without a dedicated physical timing channel.

In some example embodiments, the receivers 106 are configured to determine various attributes of the received signal. Since measurements are determined at each receiver 106, in a digital format, rather than analog in some examples, signals are transmittable to the Central Processor/Hub 108. Advantageously, because packet data and measurement results can be transferred at high speeds to a receiver memory, the receivers 106 can receive and process tag (and corresponding object) locating signals on a nearly continuous basis. As such, in some examples, the receiver memory allows for a high burst rate of tag events (i.e., information packets) to be captured.

Data cables or wireless transmissions may convey measurement data from the receivers 106 to the Central Processor/Hub 108 (e.g., the data cables may enable a transfer speed of 2 Mbps). In some examples, measurement data is transferred to the Central Processor/Hub at regular polling intervals.

As such, the Central Processor/Hub 108 determines or otherwise computes tag location (i.e., object position) by processing TOA measurements relative to multiple data packets detected by the receivers 106. In some example embodiments, the Central Processor/Hub 108 may be configured to resolve the coordinates of a tag using nonlinear optimization techniques.

In some examples, TOA measurements from multiple receivers 106 are processed by the Central Processor/Hub 108 to determine a position of the transmit tag 102 by a differential time-of-arrival (DTOA) analysis of the multiple TOAs. The DTOA analysis includes a determination of tag transmit time $t_0$, whereby a time-of-flight (TOF), measured as the time elapsed from the estimated tag transmit time $t_0$ to the respective TOA, represents graphically the radii of spheres centered at respective receivers 106. The distance between the surfaces of the respective spheres to the estimated position coordinates $(x_0, y_0, z_0)$ of the transmit tag 102 represents the measurement error for each respective TOA, and the minimization of the sum of the squares of the TOA measurement errors from each receiver participating in the DTOA position estimate provides for both the position coordinates $(x_0, y_0, z_0)$ of the transmit tag and of that tag's transmit time $t_0$.

In some examples, the system described herein may be referred to as an "over-specified" or "over-determined" system. As such, the Central Processor/Hub 108 may calculate one or more valid (i.e., most correct) positions based on a set of measurements and/or one or more incorrect (i.e., less correct) positions. For example, a position may be calculated that is impossible due the laws of physics or may be an outlier when compared to other calculated positions. As such one or more algorithms or heuristics may be applied to minimize such error.

The starting point for the minimization may be obtained by first doing an area search on a coarse grid of x, y and z over an area defined by the user and followed by a localized steepest descent search. The starting position for this algorithm is fixed, in some examples, at the mean position of all active receivers. No initial area search is needed, and optimization proceeds through the use of a Davidon-Fletcher-Powell (DFP) quasi-Newton algorithm in some examples. In other examples, a steepest descent algorithm may be used.

One such algorithm for error minimization, which may be referred to as a time error minimization algorithm, may be described in Equation 1:

$$\epsilon = \Sigma_{j=1}^{N}[[(x-x_j)^2+(y-y_j)^2+(z-z_j)^2]^{1/2}-c(t_j-t_0)]^2 \quad (1)$$

Where N is the number of receivers, c is the speed of light, $(x_j, y_j, z_j)$ are the coordinates of the $j^{th}$ receiver, $t_j$ is the arrival time at the $j^{th}$ receiver, and $t_0$ is the tag transmit time. The variable $t_0$ represents the time of transmission. Since $t_0$ is not initially known, the arrival times, $t_j$, as well as $t_0$, are related to a common time base, which in some examples, is derived from the arrival times. As a result, differences between the various arrival times have significance for determining position as well as $t_0$.

The optimization algorithm to minimize the error $\epsilon$ in Equation 1 may be the Davidon-Fletcher-Powell (DFP) quasi-Newton algorithm, for example. In some examples, the optimization algorithm to minimize the error $\epsilon$ in Equation 1 may be a steepest descent algorithm. In each case, the algorithms may be seeded with an initial position estimate (x, y, z) that represents the two-dimensional (2D) or three-dimensional (3D) mean of the positions of the receivers 106 that participate in the tag position determination.

In some examples, the RTLS system comprises a receiver grid, whereby each of the receivers 106 in the receiver grid keeps a receiver clock that is synchronized, with an initially unknown phase offset, to the other receiver clocks. The phase offset between any receivers may be determined by use of a reference tag that is positioned at a known coordinate position $(x_T, y_T, z_T)$. The phase offset serves to resolve the constant offset between counters within the various receivers 106, as described below.

In further example embodiments, a number N of receivers 106 $\{R_j: j=1, \ldots, N\}$ are positioned at known coordinates $(x_{R_j}, y_{R_j}, z_{R_j})$, which are respectively located at distances $d_{R_j}$ from a reference tag 104, such as given in Equation 2:

$$d_{R_j} = \sqrt{(x_{R_j}-x_T)^2+(y_{R_j}-y_T)^2+(z_{R_j}-z_T)^2} \quad (2)$$

Each receiver $R_j$ utilizes, for example, a synchronous clock signal derived from a common frequency time base, such as a clock generator. Because the receivers are not synchronously reset, an unknown, but constant offset $O_j$ exists for each receiver's internal free running counter. The value of the constant offset $O_j$ is measured in terms of the number of fine resolution count increments (e.g., a number of nanoseconds for a one nanosecond resolution system).

The reference tag is used, in some examples, to calibrate the radio frequency locating system as follows: The reference tag emits a signal burst at an unknown time $\tau_R$. Upon receiving the signal burst from the reference tag, a count $N_{R_j}$ as measured at receiver $R_j$ is given in Equation 3 by:

$$N_{R_j} = \beta \tau_R + O_j + \beta d_{R_j}/c \quad (3)$$

Where c is the speed of light and β is the number of fine resolution count increments per unit time (e.g., one per nanosecond). Similarly, each object tag $T_i$ of each object to be located transmits a signal at an unknown time $\tau_i$ to produce a count $N_{ij}$, as given in Equation 4:

$$N_{ij} = \beta \tau_i + O_j + \beta d_{ij}/c \quad (4)$$

at receiver $R_j$ where $d_{ij}$ the distance between the object tag $T_i$ and the receiver 106 $R_j$. Note that $\tau_i$ is unknown, but has the same constant value for all receivers. Based on the equalities expressed above for receivers $R_j$ and $R_k$ and given the reference tag 104 information, phase offsets expressed as differential count values are determined as given in Equations 5a-b:

$$N_{R_j} - N_{R_k} = (O_j - O_k) + \beta\left(\frac{d_{R_j}}{c} - \frac{d_{R_k}}{c}\right) \quad (5a)$$

Or, $$(O_j - O_k) = (N_{R_j} - N_{R_k}) - \beta\left(\frac{d_{R_j}}{c} - \frac{d_{R_k}}{c}\right) = \Delta_{jk} \quad (5b)$$

Where $\Delta_{jk}$ is constant as long as $d_{R_j} - d_{R_k}$ remains constant, (which means the receivers and reference tag are fixed and there is no multipath situation) and β is the same for each receiver. Note that $\Delta_{jk}$ is a known quantity, since $N_{R_j}$, $N_{R_k}$, β, $d_{R_j}/c$, and $d_{R_k}/c$ are known. That is, the phase offsets between receivers $R_j$ and $R_k$ may be readily determined based on the reference tag 104 transmissions. Thus, again from the above equations, for a tag 102 ($T_i$) transmission arriving at receivers $R_j$ and $R_k$, one may deduce the following Equations 6a-b:

$$N_{i_j} - N_{i_k} = (O_j - O_k) + \beta\left(\frac{d_{i_j}}{c} - \frac{d_{i_k}}{c}\right) = \Delta_{jk} + \beta\left(\frac{d_{i_j}}{c} - \frac{d_{i_k}}{c}\right) \quad (6a)$$

Or, $$d_{i_j} - d_{i_k} = (c/\beta)[N_{i_j} - N_{i_k} - \Delta_{jk}] \quad (6b)$$

Each arrival time, $t_j$, can be referenced to a particular receiver (receiver "1") as given in Equation 7:

$$t_j = \frac{1}{\beta}(N_j - \Delta_{j1}) \quad (7)$$

The minimization, described in Equation 1, may then be performed over variables (x, y, z, $t_0$) to reach a solution (x', y', z', $t_0$').

Example Tag/Sensor Location Determination and Asset Correlation

Figures 2A, 2B, 2C, 2D, 2E:
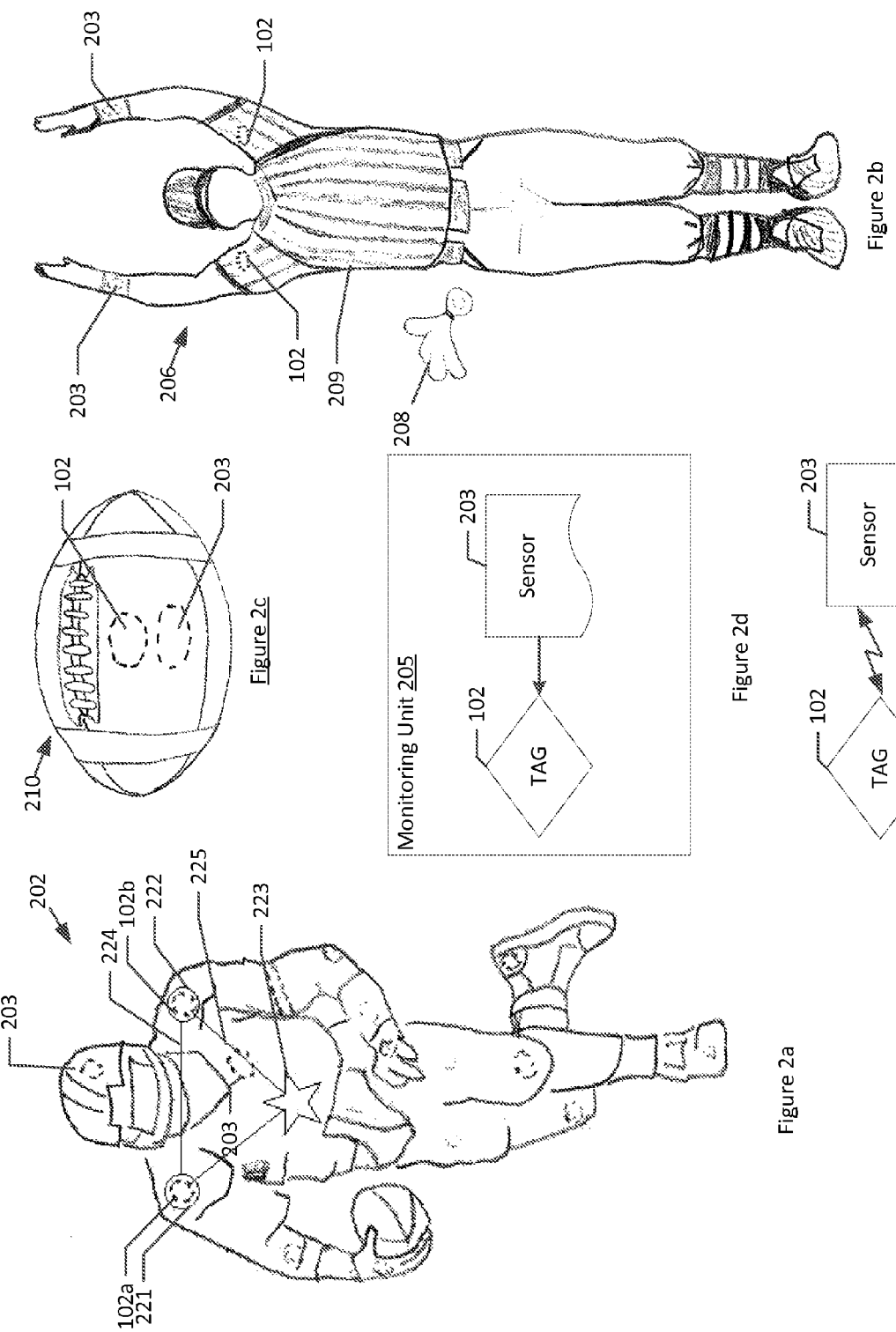

FIGS. 2a-e illustrate some exemplary tag and sensor configurations that may provide information to a location system or over-determined location system in accordance with some embodiments of the present invention. An asset is any person, location or object to which a tag and/or sensor has been attached. FIG. 2a illustrates an asset 202, which is a football player wearing equipment having attached tags 102 in accordance with some embodiments. In particular, the depicted asset 202 is wearing shoulder pads having tags 102 affixed to opposite sides thereof. This positioning advantageously provides an elevated broadcast location for each tag 102 thereby increasing its communication effectiveness.

In some embodiments, location tags may be affixed to an asset in such a manner as to facilitate the use of location tags to construct a spatial association model for the asset. Assets may have tags affixed at particular attachment points (e.g., sockets, clips, fasteners, or the like). These attachment points may be located or spaced at particular physical locations on the asset (e.g., one attachment point on each side of an asset's shoulder pads, or the like). Different attachment points may correspond to particular data structures or identifiers for a given spatial association model, such that each tag associated with a given spatial association model for a given asset corresponds to a particular attachment point of the given asset. For example, as depicted in FIG. 2a, a first location tag 102a may be attached to the asset at a first attachment point 221 and a second location tag 102b may be attached to the asset at a second attachment point, 222.

For certain assets and/or certain types of assets, the relative position of attachment points may be consistent within a predictable tolerance. For example, the width of a player's shoulder pads may be known to within certain tolerances, based on the particular player's equipment (e.g., foreknowledge of the size of the player's shoulder pads based on association with a particular asset profile), for a particular position of player (e.g., based on knowledge of the size range for shoulder pads used by a particular position), or based on a model associated with a particular type of asset (e.g., all players have shoulder pads within a certain range of sizes). These distances may be associated with spatial association models associated with particular assets. As such, the location of the attachment points may be employed to define one or more asset reference distances between attachment points, such as depicted by the asset reference distance 224 between attachment point 221 and attachment point 222 as illustrated in FIG. 2a. For many assets, and thus many spatial association models associated with said assets, the relative positioning of associated attachment points may also be consistent with respect to one or more third positions, on, in or near the asset. This third position may be known as an asset reference location 223. Thus, an asset reference triangle 225 can be defined as the triangle constructed through these two points, with a vertex at the asset reference location 223 opposite the asset reference distance 224. It should be appreciated that, in some embodiments, the asset reference triangle may be defined at a particular point in time based on known or measured values, and then changes in that reference triangle may be used to determine changes to the asset, such as the stance of the asset. For example, the asset reference triangle may be calculated at the time of registration, when the asset is in a known location or at a known position, or at another predefined time. Detected changes in the asset reference triangle may, in some embodiments, be employed to identify changes in the posture or stance of the asset at later times.

It should be appreciated that two attachment points 221 and 222 are disclosed in the instant exemplary FIG. 2a, and thus multiple points may be equidistant from the two attachment points, defining a line. The asset reference point 223 may be selected along this line according to various criteria. For example, the asset reference point 223 may be defined by selecting a coordinate point, group of points, or a range of coordinates (e.g., a range of points defining a three dimensional area such as a sphere) along the line defined by the asset reference distance 224 with a z-component of an (x, y, z) coordinate set 12 inches lower than the asset reference distance 224. It should be appreciated that various other factors and considerations could be included for selecting an asset reference point 223, including but not limited to the number of attachment points, the size of the asset, the size of the monitored area, the number of assets in the monitored area, or the like. Any or all of these factors may thus be employed to assist with selection of the asset reference point 223. In some embodiments, a sufficient number of attachment points may exist to select a point that is equidistant to each of the attachment points. It should also be appreciated that although the instant example is described with respect to attachment points, additional or alternative embodiments may define the asset reference point 223 based on the presence of actual locator tags. For example, if a given asset does not have locator tags associated with each attachment point, only locations or attachment points that actually have active and/or registered locator tags may be employed to determine the asset reference point 223.

Additional sensors 203 may be attached to equipment worn by asset 202, such as accelerometers, magnetometers, compasses, gyroscopes, time-of-flight sensors, health monitoring sensors (e.g., blood pressure sensors, heart monitors, respiration sensors, moisture sensors, temperature sensors), light sensors, or the like. The additional sensors 203 may be affixed to shoulder pads, the helmet, the shoes, rib pads, elbow pads, the jersey, the pants, a bodysuit undergarment, gloves, arm bands, wristbands, and the like. In some cases, additional sensors may be fastened to or implanted under the player's skin, swallowed, or otherwise be carried internally in the player's body. Sensors 203 may be configured to communicate with receivers (e.g., receivers 106 of FIG. 1) directly or indirectly through tags 102 or other transmitters. For example, in one embodiment, a sensor 203 may be connected, wired (e.g., perhaps through wires sewn into a jersey or bodysuit undergarment) or wirelessly, to tags 102 to provide sensor data to tags 102, which is then transmitted to the receivers 106. In another embodiment, a plurality of sensors (not shown) may be connected to a dedicated antenna or transmitter, perhaps located in the helmet, which may transmit sensor data to one or more receivers. Such a transmitter could be attached at or near the asset reference point 223.

FIG. 2b illustrates an asset 206 depicted as a game official wearing equipment having attached tags 102 and sensors 203 in accordance with some embodiments. In the depicted embodiment, tags 102 are attached to the asset's jersey proximate opposite shoulders. Sensors 203 are provided in wristbands worn on the official's wrists as shown. Sensors 203 may be configured to communicate with receivers (e.g., receivers 106 of FIG. 1) directly or indirectly through tags 102 or other transmitters as discussed above in connection with FIG. 2a.

As discussed in greater detail below, the positioning of sensors 203 (here, accelerometers) proximate the wrists of the asset may allow the central processor/hub 108 to determine particular motions, movements, or activities of the official 206 for use in determining events (e.g., winding of the game clock, first down, touchdown, or the like). The asset 206 may also carry other equipment, such as penalty flag 208, which may also have a tag 102 (and optionally one or more sensors) attached to provide additional data to the central processor/hub 108. For example, central processor/hub 108 may use tag location data from the penalty flag 208 to determine when the official is merely carrying the penalty flag 208 versus when the official is using the penalty flag 208 to indicate an event, such as a penalty (e.g., by throwing the penalty flag 208).

FIG. 2c illustrates an example of an asset 210 depicted as a game ball having tags 102 attached or embedded in accordance with some embodiments. Additionally, sensors 203 may be attached to or embedded in the ball 210, such as accelerometers, time-of-flight sensors, or the like. In some embodiments, the sensor 203 may be connected, wired or wirelessly, to tag 102 to provide sensor data to tag 102 which is then transmitted to the receivers 106. In some embodiments, the sensor 203 may transmit sensor data to receivers separately from the tag 102, such as described above in connection with FIG. 2a.

FIG. 2d illustrates a monitoring unit 205 including a tag 102 and a sensor 203. The tag and sensor may be embodied in a single housing or monitoring unit 205. The tag and sensor may operate independently or may be in wired or wireless communication. The sensor 203 may be configured to transmit signals to the tag 102 to commence, terminate, or change the rate of blink data transmissions. The sensor 203 may send signals configured to control the tag blink data transmission by using a low frequency transceiver with a range based on the size of the monitoring unit 205.

FIG. 2e illustrates a tag 102 and sensor 203 configuration in which the tag and sensor are separate units. The tag 102 may be associated but operate independently of the sensor 203, or may be in wired or wireless communication. In an instance in which the tag 102 is in wireless communication with the sensor 203, the sensor may send control signals to control the tag blink data transmissions as discussed above in FIG. 3d. The effective range of the sensor low frequency transmission may be 12 inches, 18 inches, 24 inches, 36 inches or any other distance value. The effective range of the low frequency transmission is based on the proximate mounting locations of the tag 102 and sensor 203. In an instance in which the tag 102 and the sensor 203 are mounted in close proximity the low frequency transmission may be of a lower range and power. For example, in an instance in which the tag 102 and sensor 203 are mounted 2 inches away from each other on the back of a helmet. Similarly, the range and power of the low frequency transmission may be increased if the tag 102 and sensor are located further away from each other. For example, in an instance in which the sensor is mounted to the asset's belt at waist level, and the tag is mounted in a shoulder pad.

As will be apparent to one of ordinary skill in the art in view of this disclosure, once the tags 102 and sensors 203 of FIGS. 2a-e are located on assets, they may be correlated to such assets and/or to each other. For example, in some embodiments, unique tag or sensor identifiers ("unique IDs") may be correlated to an asset profile (e.g., John Smith—running back, Fred Johnson—line judge official, or ID 027—one of several game balls, etc.) and stored to a remote database accessible to the performance analytics system as discussed in greater detail below. Each asset profile may further include or be correlated with a variety of data including, but not limited to, biometric data (e.g., height, weight, health data, etc.), role data, team ID, performance statistics, and other data that may be apparent to one of skill in the art in view of the foregoing description.

In some embodiments, such asset profile or role data may be pre-defined and stored in association with the unique tag or sensor identifiers. In other embodiments, the asset profile or role data may also be "learned" by the system as a result of received tag or sensor data, formation data, play data, event data, and/or the like. For example, in some embodiments the system may determine that a tag or sensor is not correlated to an asset profile and may analyze data received from the tag and/or sensor to determine possible asset roles, etc., which may be ranked and then selected/confirmed by the system or by a user after being displayed by the system. In some embodiments, the system may determine possible asset roles (i.e., asset role data) based on determined asset location or position data (e.g., movement patterns, alignment position, etc.).

In some embodiments, as described in greater detail below, the asset profile or role data may also be updated by the system (i.e., to produce a data set for the asset that is far more robust than that established at initial registration) as a result of received tag or sensor data, formation data, play data, event data, and/or the like. In some embodiments, the asset profile and/or role data may be used in a performance analytics system to weight the actions of the assets during analysis to assist in qualifying what is occurring, such as in determining formations, plays, events, etc.

Tag ID and Sensor Data Transmission Architecture

FIGS. 3A, 3B, 3C, 3D, 3E, and 3F show block diagrams of various different architectures that may be utilized in transmitting signals from one or more tags and sensors to one or more receivers of a receiver processing and analytics system in accordance with embodiments of the invention. In some embodiments, the depicted architectures may be used in connection with the central processor/hub 108 of FIG. 1. More than one of these architectures may be used together in a single system.

FIG. 3A shows a RF location tag 102, such as that shown in FIG. 1, which may be configured to transmit a tag signal to one or more receivers 106. The one or more receivers 106 may transmit a receiver signal to the receiver hub/locate engine 108.

The depicted RF location tag 102 may generate or store a tag unique identifier ("tag UID") and/or tag data as shown. The tag data may include useful information such as the installed firmware version, last tag maintenance date, configuration information, and/or a tag-asset correlator. The tag-asset correlator may comprise data that indicates that a monitored asset is associated with the RF location tag 102 (e.g., name, uniform number and team, biometric data, tag assignment on asset, i.e., right wrist). As will be apparent to one of skill in the art in view of this disclosure, the tag-asset correlator may be stored to the RF location tag 102 when the tag is registered or otherwise associated with an asset. While shown as a separate field for illustration purposes, one of ordinary skill in the art may readily appreciate that the tag-asset correlator may be part of any tag data or even omitted from the tag.

The tag signal transmitted from RF location tag 102 to receiver 106 may include "blink data" as it is transmitted at selected intervals. This "blink rate" may be set by the tag designer or the system designer to meet application requirements. In some embodiments it is consistent for one or all tags; in some embodiments it may be data dependent. Blink data includes characteristics of the tag signal that allow the tag signal to be recognized by the receiver 106 so the location of the RF location tag 102 may be determined by the locating system. Blink data may also comprise one or more tag data packets. Such tag data packets may include any data from the tag 102 that is intended for transmission such as, for example in the depicted embodiment, a tag UID, tag data, and a tag-asset correlator. In the case of TDOA systems, the blink data may be or include a specific pattern, code, or trigger that the receiver 106 (or downstream receiver processing and analytics system) detects to identify that the transmission is from a RF location tag 102 (e.g., a UWB tag).

The depicted receiver 106 receives the tag signal, which includes blink data and tag data packets as discussed above. In one embodiment, the receiver 106 may pass the received tag signal directly to the receive hub/locate engine 108 as part of its receiver signal. In another embodiment, the receiver 106 could perform some basic processing on the received tag signal. For instance, the receiver could extract blink data from the tag signal and transmit the blink data to the receive hub/locate engine 108. The receiver could transmit a time measurement to the receive hub/locate engine 108 such as a TOA measurement and/or a TDOA measurement. The time measurement could be based on a clock time generated or calculated in the receiver, it could be based on a receiver offset value as explained above, it could be based on a system time, and/or it could be based on the time difference of arrival between the tag signal of the RF location tag 102 and the tag signal of a RF reference tag (e.g., tag 104 of FIG. 1). The receiver 106 could additionally or alternatively determine a signal measurement from the tag signal (such as a received signal strength indication (RSSI), a direction of signal, signal polarity, or signal phase) and transmit the signal measurement to the receive hub/locate engine 108.

FIG. 3B shows a RF location tag 202 and sensor 203, such as those worn on an asset's person as shown in FIG. 2, which may be configured to transmit tag signals and sensor signals, respectively, to one or more receivers 106, 166. The one or more receivers 106, 166 may then transmit receiver signals to the receiver hub/locate engine 108. One or more receivers 106, 166 may share physical components, such as a housing or antenna.

The depicted RF location tag 202 may comprise a tag UID and tag data (such as a tag-asset correlator) and transmit a tag signal comprising blink data as discussed in connection with FIG. 3A above. The depicted sensor 203 may generate and/or store a sensor UID, additional stored sensor data (e.g. a sensor-asset correlator, sensor type, sensor firmware version, last maintenance date, the units in which environmental measurements are transmitted, etc.), and environmental measurements. The "additional stored sensor data" of the sensor 203 may include any data that is intended for transmission, including but not limited to a RF location tag 202, a reference tag (e.g., 104 of FIG. 1), a sensor receiver, a receiver 106, and/or the receiver/hub locate engine 108.

The sensor-asset correlator may comprise data that indicates that a monitored asset is associated with the sensor 203 (e.g., name, uniform number and team, biometric data, sensor position on an asset, i.e., right wrist). As will be apparent to one of skill in the art in view of this disclosure, the sensor-asset correlator may be stored to the sensor 203 when the sensor is registered or otherwise associated with an asset. While shown as a separate field for illustration purposes, one of ordinary skill in the art may readily appreciate that the sensor-asset correlator may be part of any additional stored sensor data or omitted from the sensor altogether.

Sensors such as sensor 203 that are structured according to embodiments of the invention may sense or determine one or more environmental conditions (e.g. temperature, pressure, pulse, heartbeat, rotation, velocity, acceleration, radiation, position, chemical concentration, voltage) and store or transmit "environmental measurements" that are indicative of such conditions. To clarify, the term "environmental measurements" includes measurements concerning the environment proximate the sensor including, without limitation, ambient information (e.g., temperature, position, humidity, etc.) and information concerning an asset's health, fitness, operation, and/or performance. Environmental measurements may be stored or transmitted in either analog or digital form and may be transmitted as asset measurements, as a set of asset measurements, and/or as summary statistics. For example, temperature in degrees Celsius may be transmitted as {31}, or as {33, 32, 27, 22, 20, 23, 27, 30, 34, 31}, or as {27.9}. In some embodiments, the sensor-asset correlator could be determined at least in part from the environmental measurements.

In the depicted embodiment, RF location tag 202 transmits a tag signal to receiver 106 and sensor 203 transmits a sensor signal to sensor receiver 166. The sensor signal may comprise one or more sensor information packets. Such sensor information packets may include any data or information from the sensor 203 that is intended for transmission such as, for example in the depicted embodiment, sensor UID, additional stored sensor data, sensor-asset correlator, and environmental measurements. A receiver signal from receiver 106 and a sensor receiver signal from sensor receiver 166 may be transmitted via wired or wireless communication to receiver hub/locate engine 108 as shown.

FIG. 3C depicts a sensor 203 communicating through a RF location tag 202 in accordance with various embodiments. In one embodiment, the sensor 203 may be part of (i.e., reside in the same housing or assembly structure) the RF location tag 202. In another embodiment, the sensor 203 may be distinct from (i.e., not resident in the same housing or assembly structure) the RF location tag 202 but configured to communicate wirelessly or via wired communication with the RF location tag 202.

In one embodiment, the RF location tag 202, the sensor 203, or both, may generate and/or store a tag-sensor correlator that indicates an association between a RF location tag 202 and a sensor 203 (e.g., tag UID/sensor UID, distance from tag to sensor in a particular stance, set of sensors associated with a set of tags, sensor types associated with a tag, etc.). In the depicted embodiment, both the RF location tag 202 and the sensor 203 store the tag-sensor correlator.

In the depicted embodiment, sensor 203 transmits a sensor signal to RF location tag 202. The sensor signal may comprise one or more sensor information packets as discussed above. The sensor information packets may comprise the sensor UID, a sensor-asset correlator, additional stored sensor data, the tag-sensor correlator, and/or the environmental measurements. The RF location tag 202 may store some portion of, or all of, the sensor information packets locally and may package the sensor information packets into one or more tag data packets for transmission to receiver 106 as part of a tag signal or simply pass them along as part of its tag signal.

FIG. 3D illustrates an example communication structure for a reference tag 104 (e.g., reference tag 104 of FIG. 1), an RF location tag 202, a sensor 203, and two receivers 106 in accordance with one embodiment. The depicted reference tag 104 is a RF location tag and thus may include tag data, a tag UID, and is capable of transmitting tag data packets. In some embodiments, the reference tag 104 may form part of a sensor and may thus be capable of transmitting sensor information packets.

The depicted sensor 203 transmits a sensor signal to RF reference tag 104. The RF reference tag 104 may store some portion or some or all of the sensor information packets locally and may package the sensor information packets into one or more tag data packets for transmission to receiver 106 as part of a tag signal, or simply pass them along as part of its tag signal.

As was described above in connection with FIG. 1, the receivers 106 of FIG. 3D are configured to receive tag signals from the RF location tag 202 and the reference tag 104. Each of these tag signals may include blink data, which may comprise tag UIDs, tag data packets, and/or sensor information packets. The receivers 106 each transmit receiver signals via wired or wireless communication to the receiver hub/locate engine 108 as shown.

FIG. 3E illustrates an example communication structure between a location tag 202, a plurality of receivers 106, and a variety of sensor types including, without limitation, a sensor 203, a diagnostic device 233, a triangulation positioner 243, a proximity positioner 253, and a proximity label 263 in accordance with various embodiments. In the depicted embodiment, none of the sensors 203, 233, 243, 253 form part of a location tag 202 or reference tag 104. However, each may comprise a sensor UID and additional stored sensor data. Each of the depicted sensors 203, 233, 243, 253 transmits sensor signals comprising sensor information packets.

In the depicted embodiment, receiver 106 is configured to receive a tag signal from location tag 202 and a sensor signal directly from sensor 203. In such embodiments, sensor 203 may be configured to communicate in a communication protocol that is common to location tag 202 as will be apparent to one of ordinary skill in the art in view of this disclosure.

Figure 3F:
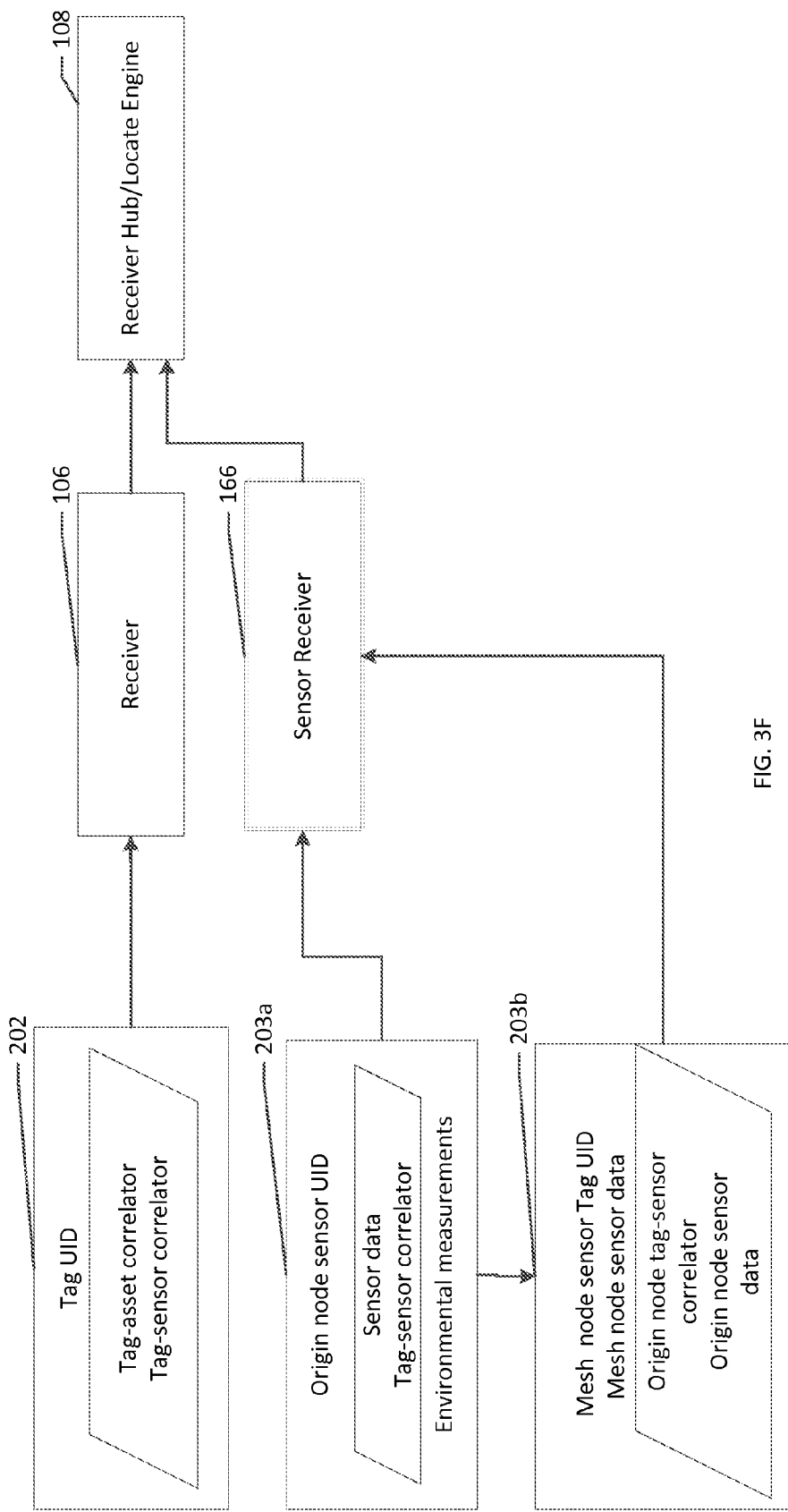

FIG. 3F illustrates an example communication structure between location tags 202, origin nodes sensor 203a, mesh node sensor 203b, receivers 106, transceivers 107 and the receiver hub 108. The a location tag 202, such as that shown in FIG. 1, which may be configured to transmit a tag signal to one or more receivers 106. The one or more receivers 106 may transmit a receiver signal to the receiver hub 108. The sensors 203 may be housed separately from the tag 202 or may be housed in a single housing unit. The sensors 203 may be in wired or wireless communication with the tags 202 for tag signal control, such as commencing, terminating, or altering tag signal blink rate. The sensors 203 may transmit sensor data, sensor UID, tag-sensor correlator, or the like directly to the sensor receiver 166. In an example embodiment, the sensor receiver 166 may be a long range directional transceiver antenna configured to backhaul sensor data directly from a mesh node without using a mesh network.

In an embodiment in which the sensor data is transmitted through a mesh network the sensors may be designated as origin node sensors 203a and mesh node sensors 203b. A sensor 203a that originates the sensor data transmission may be referred to as an origin node 203a. One or more sensors 203b that receive and transmit the sensor data from the origin node to the sensor receiver 166 may be referred to as a mesh node 202b. The origin node 202a and mesh node 202b may use Wi-Fi, BLE, or NFC to transmit the sensor data to the next mesh node or sensor receiver 166 through a mesh network.

FIGS. 3E/F depicts one type of sensor referred to herein as a "proximity interrogator". The proximity interrogator 223 can include circuitry operative to generate a magnetic, electromagnetic, or other field that is detectable by a location tag 202. While not shown in FIGS. 3E/F, a proximity interrogator 223 may include a sensor UID and other tag and sensor derived data or information as discussed above.

In some embodiments, the proximity interrogator 223 is operative as a proximity communication device that can trigger a location tag 202 (e.g., when the location tag 202 detects the field produced by the proximity interrogator 223) to transmit blink data under an alternate blink pattern or blink rate. The location tag can initiate a preprogrammed (and typically faster) blink rate to allow more location points for tracking an asset. In some embodiments, the location tag may not transmit a tag signal until triggered by the proximity interrogator 223. In some embodiments the location tag 202 may be triggered when the location tag 202 moves near (e.g., within communication proximity to) a proximity interrogator 223. In some embodiments, the location tag may be triggered when the proximity interrogator 223 moves near to the location tag 202.

In other embodiments, the location tag 202 may be triggered when a button is pressed or a switch is activated on the proximity interrogator 223 or on the location tag itself. For example, a proximity interrogator 223 could be placed at the start line of a racetrack. Every time a car passes the start line, a car-mounted location tag 202 senses the signal from the proximity interrogator and is triggered to transmit a tag signal indicating that a lap has been completed. As another example, a proximity interrogator 223 could be placed at a Gatorade cooler. Each time a player or other asset fills a cup from the cooler an asset-mounted location tag 202 senses the signal from the proximity interrogator and is triggered to transmit a tag signal indicating that Gatorade has been consumed. As another example, a proximity interrogator 223 could be placed on a medical cart. When paramedics use the medical cart to pick up an asset (e.g., a player) and move him/her to the locker room, an asset-mounted location tag 202 senses the signal from the proximity interrogator and is triggered to transmit a tag signal indicating that they have been removed from the game. As explained, any of these post-triggered tag signals may differ from pre-triggered tag signals in terms of any aspect of the analog and/or digital attributes of the transmitted tag signal.

FIG. 3E depicts another type of sensor that is generally not worn by an asset but is referred to herein as a "diagnostic device". However, like other sensors, diagnostic devices may measure one or more environmental conditions and store corresponding environmental measurements in analog or digital form.

While the depicted diagnostic device 233 is not worn by an asset, it may generate and store a sensor-asset correlator for association with environmental measurements taken in connection with a specific asset. For example, in one embodiment, the diagnostic device 233 may be a blood pressure meter that is configured to store as environmental measurements blood pressure data for various assets. Each set of environmental measurements (e.g., blood pressure data) may be stored and associated with a sensor-asset correlator.

The depicted diagnostic device 233 is configured to transmit a sensor signal comprising sensor information packets to a sensor receiver 166. The sensor information packets may comprise one or more of the sensor UID, the additional stored data, the environmental measurements, and/or the sensor-asset correlator as discussed above. The sensor receiver 166 may associate some or all of the data from the sensor information packets with other stored data in the sensor receiver 166 or with data stored or received from other sensors, diagnostic devices, location tags 102, or reference tags. The sensor receiver 166 transmits a sensor receiver signal to a receiver hub 108.

Another type of sensor shown in FIG. 3E/F is a triangulation positioner 243. A "triangulation positioner" is a type of sensor that senses position. The depicted triangulation positioner 243 includes a sensor UID, additional stored sensor data, and environmental measurements as discussed above.

In some embodiments, a triangulation positioner, such as a global positioning system (GPS) receiver receives position data, such as clock data transmitted by one or more geostationary satellites (a satellite in a known or knowable position) and/or one or more ground based transmitters (also in known or knowable positions), compares the received clock data, and computes a "position calculation". The position calculation may be included in one or more sensor information packets as environmental measurements and transmitted to the receiver hub 108, which may determine the position calculation based on the position data. In an example embodiment the triangulation positioner 243 may compare the position data clock data and compute a position calculation, which may be may be included in one or more sensor information packets as environmental measurements and transmitted to the receiver hub 108. Other triangulations positioners may include common timing time difference of arrival systems, angle of arrival systems, received signal strength systems, or the like.

In another embodiment, a triangulation positioner comprises one or more cameras or image-analyzers that receive position data, such as emitted or reflected light or heat. The position data may be transmitted to the receiver hub 108, which may analyze the received position data (e.g., images) to determine the position of an asset or sensor. Although a triangulation positioner may transmit data wirelessly, it is not a location tag because it does not transmit blink data or a tag signal that can be used by a receiver hub 108 to calculate location. In contrast, a triangulation positioner senses position data and/or computes a position calculation that may then be used as environmental measurements by the receiver hub 108 to determine a position of the sensor.

In an example embodiment the triangulation positioner comprises a RFID over ISO-2 system or WhereNet™. The ISO-2 system may have active RFID chips that may be read by a sensor when in proximity to a chip or forced to transmit at the receipt of a predetermined signal or sensor position data. The receiver hub 108 may determine the sensor position calculation based on the time difference of arrival of the RFID forced transmission.

In one embodiment, a triangulation positioner could be combined with a location tag or reference tag (not shown). In such embodiments, the triangulation positioner could compute and transmit its position calculation via the location tag to one or more receivers. However, the receiver hub would calculate tag location based on the blink data received as part of the tag signal and not based solely on the position calculation. The position calculation would be considered as environmental measurements and may be included in associated sensor information packets.

As will be apparent to one of ordinary skill in the art, position calculations (e.g., GPS receiver position calculations) are not as accurate as the location calculations (e.g., UWB waveform based location calculations) performed by receiver hub/locate engines structured in accordance with various embodiments of the invention. That is not to say that position calculations may not be improved using known techniques. For example, a number of influences, including atmospheric conditions, can cause GPS accuracy to vary over time. One way to control this is to use a differential global positioning system (DGPS) comprising one or a network of stationary triangulation positioners that are placed in a known position, and the coordinates of the known position are stored in memory as additional stored sensor data. These triangulation positioners receive clock data from geostationary satellites, determine a position calculation, and broadcast a difference between the position calculation and the stored coordinates. This DGPS correction signal can be used to correct for these influences and significantly reduce location estimate error.

Another type of sensor shown in FIG. 3E/F is a proximity detector 253. A "proximity detector" is a type of sensor that senses identity within an area (e.g., a local area) that is small with respect to a monitored area. Many different ways of sensing identity (e.g., a unique ID or other identifier for a sensed object or asset) would be apparent to one of ordinary skill in the art in view of this disclosure including, without limitation, reading a linear bar code, reading a two-dimensional bar code, reading a near field communication (NFC) tag, reading a RFID tag such as a passive UHF tag, a passive HF tag, or low frequency tag, an optical character recognition device, a biometric scanner, or a facial recognition system. The identity sensed by the proximity detector 253 and the range or radius associated with the identity may be referred to as proximity data.

In an example embodiment the proximity detector 253 may be a radio frequency identification (RFID) chip. The RFID chip may be sensed by an RFID sensor when the RFID sensor is within a predetermined range.

Figure 5B:
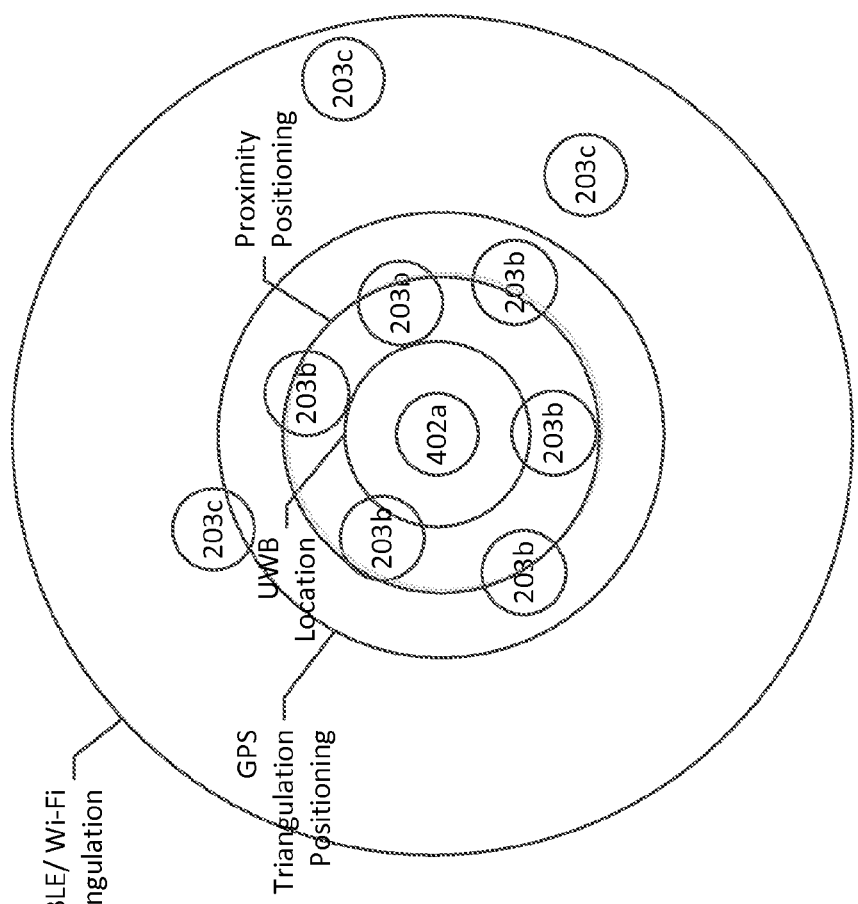
FIGS. 5A and 5B illustrate exemplary location technology accuracy and proximity transmission radii in accordance with some of the example embodiments of the present invention.
Figure 5A:
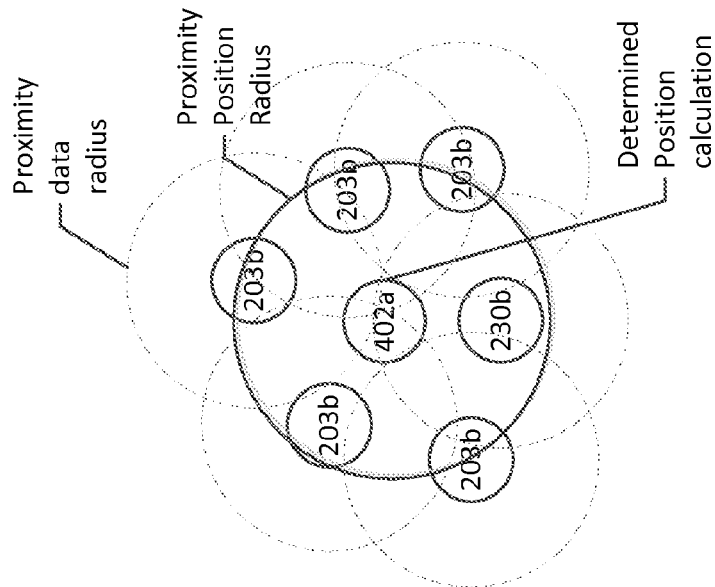

In an example embodiment, the proximity detector 253 may sense a Bluetooth Low Energy (BLE) signals identifying sensors. The BLE transmissions may have a predetermined radius and the transmissions may comprise the sensor or associated tag UIDs for the proximate sensors. The receiver hub 108 may determine the location of each identified proximate sensor based on an associated tag and the predetermined transmission radii. The BLE proximity position calculation may be determined as the position or area in which the proximity radii intersect, as depicted in FIG. 5a.

In an example embodiment, the proximity detector 253 may be a Wi-Fi transceiver. The Wi-Fi transceiver may send and receive Wi-Fi proximity or identity signals to and from sensors within the transmission range. The Wi-Fi transceiver may have a predetermined range or use the RSSI to determine proximity. In an instance in which the Wi-Fi transceiver has a predetermined broadcast or receiver range, the tag proximity position is calculated in a manner substantially similar to the BLE transmitter discussed above. In an instance in which the Wi-Fi transceiver does not have a predetermined range, the Wi-Fi RSSI is used to determine the identified sensors that are closest and furthest from the sensor based on signal strength. Additionally, an approximation of transmission radius may be derived from the RSSI and a proximity position calculated in a manner substantially similar to BLE transmitter above.

In some example embodiments, proximity may be determined based on predetermined relationships between tags or sensors. In an instance in which the tags or sensors move toward or away from each other, the receiver hub may determine a change of proximity status associated with the relationship. For example, if a referee has a tag 102 or sensor 203 associated with a portion of his body, such as his shoulder and there is a tag or sensor associated with a flag kept in a pocket of his uniform, there may be a predetermined relationship between the flag and the shoulder of the referee. In an instance in which the flag is thrown the proximate relationship would change and the receiver hub 108 may update the status of the proximate relationship.

In some embodiments, a proximity detector senses an attribute of an asset (or an asset's wristband, tag, label, card, badge, clothing, uniform, costume, phone, ticket, etc.). The proximity data e.g., identity sensed by a proximity detector may be stored locally at the proximity detector 253 as shown and transmitted as proximity data via one or more sensor information packets to a sensor receiver 166.

In some embodiments, a proximity detector 253 may have a defined position, which is often stationary, and may be associated with a location in a monitored area. For example, a proximity detector 253 could be located at a finish line of a race track, an entrance gate of a stadium, with a diagnostic device, at a goal line or goal post of a football field, at a base or home plate of a baseball diamond, or a similar fixed location. In such embodiments where the proximity detector is stationary, the position coordinates of the proximity detector and a sensor UID could be stored to a monitored area database (not shown) that is accessible by one or more of the receivers 106, 166, the receiver hub 108. In embodiments where the proximity detector is movable, a position calculation could be determined with a triangulation positioner, or the proximity detector could be combined with a location tag and located by the receiver hub 108. While shown as separate fields for illustration purposes in FIG. 3E/F, identity information and position data could comprise part of the additional stored sensor data, the environmental measurements, or both.

In one embodiment, the proximity detector could be associated with a reference tag (e.g., tag 104 of FIG. 1) whose position is recorded in the monitored area database. In other embodiments, the proximity detector is movable, such that it may be transported to where it is needed. For example, a proximity detector 253 could be located on a medical cart, first down marker, a diagnostic device, goal post, or carried by a paramedic or security guard. In an embodiment where the proximity detector 253 is movable, it would typically be associated with a location tag or triangulation positioner so that location (for a location tag) or position (for a triangulation positioner) can be determined at the time identity is sensed.

In the embodiment where the proximity detector includes a location tag, the receiver hub 108 would locate the associated location tag, and the tag data/sensor data filter would associate the tag location data for the associated location tag as the position of the proximity detector, while determining the identity of an associated asset from any received sensor information packets. In the alternate embodiment where the proximity detector includes a triangulation positioner, the triangulation positioner would compute a position calculation that could be stored as additional stored sensor data and/or environmental measurements, and transmitted as one or more sensor information packets. In one embodiment, sensor information packets for a proximity detector may include both sensed identity information and a position calculation.

Another type of sensor shown in FIG. 3E is a proximity label 263. A proximity label has a fixed position and an identification code (e.g., a sensor UID). The proximity label 263 may further comprise additional stored sensor data as shown. The depicted proximity label 263 is configured to be read by proximity detector 253. In some embodiments, proximity detector 253 may be further configured to write information to proximity label 263.

A proximity label 263 may be a sticker, card, tag, passive RFID tag, active RFID tag, NFC tag, ticket, metal plate, electronic display, electronic paper, inked surface, sundial, or otherwise visible or machine readable identification device as is known in the art. The coordinates of the position of the proximity label 263 are stored such that they are accessible to the receive hub/locate engine 108. For example, in one embodiment, the position coordinates of a proximity label 263 could be stored in a field database or monitored area database accessible via a network, or stored locally as additional stored data in the proximity detector 253.

In some embodiments, a position of the proximity label 263 is encoded into the proximity label 263 itself. For example, coordinates of a position of the proximity label 263 could be encoded into a passive RFID tag that is placed in that position. As another example, the coordinates of a position of the proximity label 263 could be encoded into a printed barcode that is placed in that position. As another example, a proximity label 263 comprising a NFC tag could be encoded with the location "end zone", and the NFC tag could be placed at or near an end zone at Bank of America stadium. In some embodiments, the stored coordinates of the proximity label 263 may be offset from the actual coordinates of the proximity label 263 by a known or determinable amount.

In one embodiment, a proximity label 263 such as an NFC tag may be encoded with a position. When a sensor such as a proximity detector approaches the NFC tag it may read the position, then transmit the position in a sensor information packet to the sensor receiver 166' and eventually to the receiver hub 108. In another embodiment, a proximity label 263 such as a barcode label may be encoded with an identification code. When a smartphone with a proximity detector (such as a barcode imager) and a triangulation positioner (such as a GPS chip, GPS application, or similar device) approaches the barcode label it may read the identification code from the barcode, determine a position calculation from received clock data, then transmit the identity and the position calculation to sensor receiver 166' and eventually to the receiver hub 106 as part of one or more sensor information packets.

In the depicted embodiment, triangulation positioner 243 and proximity detector 253 are each configured to transmit sensor signals carrying sensor information packets to sensor receiver 166'. The depicted sensors 243, 253, like any sensor discussed herein, may transmit sensor signals via wired or wireless communication protocols. For example, any proprietary or standard wireless protocol (e.g., 802.11, Zigbee, ISO/IEC 802.15.4, ISO/IEC 18000, IrDA, Bluetooth, CDMA, or any other protocol) could be used for the sensor signals. Alternatively or additionally, any standard or proprietary wired communication protocol (e.g., Ethernet, Parallel, Serial, RS-232, RS-422, USB, Firewire, I$^2$C, etc.) may be used. Similarly, sensor receiver 166', and any receiver discussed herein, may use similar wired and wireless protocols to transmit receiver signals to the receiver hub/locate engine.

In one embodiment, upon receiving sensor signals from the triangulation positioner 243 and the proximity detector 253, the sensor receiver 166' may associate some or all of the data from the received sensor information packets with other data stored to the sensor receiver 166', or with data stored or received from other sensors (e.g., sensor 203, audio sensor 105), diagnostic devices 233, location tags 102, or RF reference tags 104. Such associated data is referred to herein as "associated sensor data". In the depicted embodiment, the sensor receiver 166' is configured to transmit some or all of the received sensor information packets and any associated sensor data to the receiver hub 108 at part of a sensor receiver signal.

In one embodiment, a smartphone comprising a proximity detector (such as a barcode imager) and a triangulation positioner (such as a GPS chip) may associate an identification code determined from a barcode with a position calculation from received clock data as associated sensor data and transmit a sensor information packet that includes such associated sensor data to the receiver hub 108. In another embodiment, the smartphone could transmit a first sensor information packet including the identification code and the smartphone's unique identifier to another sensor receiver, the smartphone could transmit a second sensor information packet including the position calculation and the smartphone's unique identifier to the sensor receiver, and the sensor receiver could associate the position calculation with the identification code based on the common smartphone unique identifier and transmit such associated sensor data to the receiver hub 108. In another embodiment, the sensor receiver could determine a first time measurement associated with the first sensor information packet and a second time measurement associated with the second sensor information packet that, in conjunction with the sensor UID, could be used, by the receiver hub 108, to associate the first sensor information packet with the second sensor information packet.

In one embodiment, the receiver hub 108 receives receiver signals from the receiver 106 and sensor receiver signals from the sensor receivers 166, 166'. In the depicted embodiment, receiver 106 may receive blink data from the location tag 102 and transmits to the receiver hub 108 some or all of the blink data, perhaps with additional time measurements or signal measurements. In some embodiments, time measurements or signal measurements may be based on a tag signal received from a RF reference tag (e.g., reference tag 104 of FIG. 1). The receiver hub 108 collects the blink data, time measurements (e.g., time of arrival, time difference of arrival, phase), and/or signal measurements (e.g., signal strength, signal direction, signal polarization, signal phase) from the receivers 106 and computes tag location data for the tags 102 as discussed above in connection with FIG. 1. In some embodiments, the receivers 106 may be configured with appropriate RF filters, such as to filter out potentially interfering signals or reflections proximate the field of play or other area to be monitored.

The receiver hub 108 may also access stored data or clock data from local storage and from a network location. The receiver hub 108 uses this information to determine tag location data for each location tag. It may also associate data derived or extracted from tag signals transmitted from one or more location tags with information or data derived or extracted from sensor signals transmitted from one or more sensors.

In addition to the TOA or TDOA systems previously described, other real-time location systems (RTLS) such as received signal strength indication based systems could potentially be implemented by a receiver hub 108. Any RTLS system using location tags, including those described herein, could require considerable processing by the receiver hub 108 to determine the tag location data from the blink data received from the tags. These may require time measurement and/or signal measurement in addition to blink data, which preferably includes a tag UID. In contrast, in other systems, such as global position systems (GPS) systems, location data is determined based upon the position calculation transmitted from a GPS transmitter (also referred to as a GPS receiver or GPS tag) which includes calculated information about the location where the tag was positioned (i.e., coordinates determined at the tag via satellite signal triangulation, etc.) when the position calculation was determined or stored. Thus, GPS information typically refers to additional information that is transmitted along with a GPS transmitter ID before the transmission is received by a sensor receiver.

A GPS host device or back-end server may receive the GPS information and simply parse the position calculation (as opposed to calculating the position information at the host device) and the GPS transmitter ID into a data record. This data record may be used as a GPS position calculation, or it could be converted to a different coordinate system to be used as a GPS position calculation, or it could be processed further with DGPS information to be used as a GPS position calculation.

Returning to FIG. 3C, the depicted location tag 202 is used to convey (sometimes called backhaul) sensor information packets to a receiver 106. In some embodiments, while not shown, multiple sensors 203 may transmit sensor signals carrying sensor information packets to location tag 202. Such received sensor information packets may be associated with blink data that is transmitted to receiver 106.

In one embodiment, the receiver hub 108 may parse sensor information packets from received tag data packets and associate such sensor information packets with the location tag 202 that transmitted the sensor information packet. Thus, the receiver hub 108 may be able to determine tag location data, which may comprise a location and other data (e.g., tag data, tag UID, tag-asset correlator, sensor-asset correlator, additional stored sensor data, environmental measurements (e.g., audio data), tag-sensor correlator, identity information, position calculation, etc.) from one or more tags or sensors.

In some embodiments, once the receiver hub 108 determines a location estimate of a location tag 102 at the time epoch of the tag signal, the receiver hub 108 can also associate a location estimate with the tag data packet included in the blink data of such tag signal. In some embodiments, the location estimate of the tag signal may be used as tag location data for the tag data packet. In some embodiments a Geographical Information System (GIS) may be used by the receive hub/locate engine 108 to refine a location estimate, or to map a location estimate in one coordinate system to a location estimate in a different coordinate system, to provide a location estimate for the tag data packet.

In one embodiment, the location estimated for the tag data packet may be associated with any data in the tag data packet, including a tag UID, other tag data, and, if included, one or more sensor information packets, including sensor UID, additional stored sensor data, and environmental measurements. Since environmental measurements may include a position calculation from a triangulation positioner (e.g., a GPS device), the receiver hub 108 could parse the position calculation and use it to refine a location estimate for the tag data packet.

Preferably, the receiver hub 108 may access an asset database to determine tag-asset correlators or sensor-asset correlators. Asset data (e.g., an asset profile) may be stored in a server, in tag memory, in sensor memory, or in other storage accessible via a network or communication system, including tag data or additional stored sensor data as explained previously.

In some embodiments, by comparing data accessed using a sensor-asset correlator, the receiver hub 108 may associate and asset with a sensor information packet received from a sensor, and/or may associate an asset with such sensor. Because the receiver hub 108 may associate a sensor position estimate with a sensor information packet, the receiver hub 108 may also estimate an asset position for the associated asset.

In another embodiment, by comparing data accessed using a tag-sensor correlator, the receiver hub 108 may associate a sensor with a tag data packet received from a location tag 102. Because the receiver hub 108 may associate a location estimate with a tag data packet, the receiver hub 108 may also create a sensor location estimate for the associated sensor. By comparing a location estimate for a location tag with a sensor location estimate or a sensor position estimate, the receiver hub 108 may associate a location tag with a sensor, or may associate a tag data packet with a sensor information packet. The receiver hub 108 could also determine a new or refined tag-sensor correlator based on this association.

In still another embodiment, by comparing a location estimate for a location tag with an asset location estimate or an asset position estimate, the receiver hub 108 may associate a location tag with an asset, or may associate a tag data packet with an asset. The receiver hub 108 could also determine a new or refined tag-asset correlator based on this association.

In one embodiment, by comparing a location estimate for a sensor with an asset location estimate or an asset position estimate, the receiver hub 108 may associate a sensor with an asset, or may associate a sensor information packet with an asset. The receiver hub 108 could also determine a new or refined sensor-asset correlator based on this association.

Data derived or extracted from tag signals transmitted from one or more RF location tags is referred to herein as "tag derived data" and shall include, without limitation, tag data, tag UID, tag-asset correlator, tag-sensor correlator, tag data packets, blink data, time measurements (e.g. time of arrival, time difference of arrival, phase), signal measurements (e.g., signal strength, signal direction, signal polarization, signal phase) and tag location data (e.g., including tag location estimates). Tag derived data is not derived by the RF location tag, but rather, is derived from information transmitted by the RF location tag. Information or data derived or extracted from sensor signals transmitted from one or more sensors is referred to herein as "sensor derived data" and shall include, without limitation, sensor UID, additional stored sensor data, sensor-asset correlator, environmental measurements, sensor information packets, position calculations (including sensor position estimates), position information, identity information, tag-sensor correlator, and associated sensor data. Data derived or extracted from stored asset data is referred to herein as "asset profile information", "asset profile information", or simply "profile information" and shall include, without limitation tag-asset correlator, sensor-asset correlator, identity information, name, uniform number and team, biometric data, tag position on asset. In various embodiments, the receiver hub/locate engine 108 may transmit tag derived data, sensor derived data, asset profile information, various combinations thereof, and/or any information from the GIS, the field database, the monitored area database, and the asset database to the central processor/hub 108.

Exemplary Over-Determined Location System with Multiple Location Technologies

Figure 4:
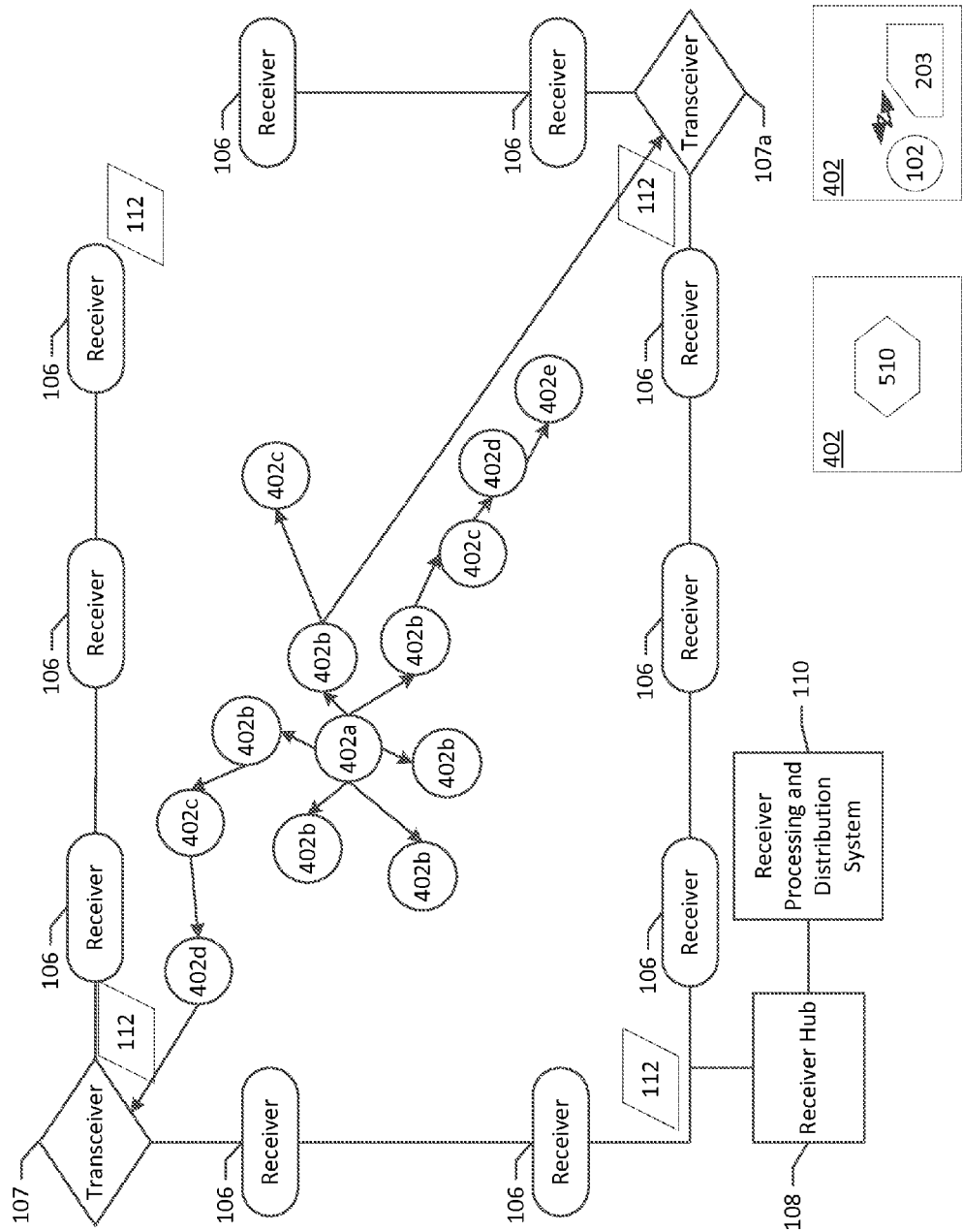
FIG. 4 illustrates an exemplary over-determined locating system that may utilize multiple location technologies in accordance with some example embodiments of the present invention.

FIG. 4 illustrates a diagram of an over determined location system with multiple location technologies. The location system may include assets 402*a-e*, tags 102, sensors 203, monitoring units 510, receivers 106, transceivers 107 and 107a, a receiver hub 108, a receiver processing and distribution system 110, and exciters 112. Assets 402a-e may carry a tag 102 and a sensor 203 or a monitoring unit 510, as depicted in the asset 402 breakouts. The following descriptions of tags 102 and sensors 203 may include the tags and sensors 203 housed within the monitoring unit 510, or separately mounted. Tags 102 and sensors 203 may be referred to by their associated asset designator. For example asset 402a may carry tag 102a and sensor 102a. Each tag 102a-e may transmit blink data as described above in FIG. 1. Sensors 203a-e may transmit proximity and/or position data or receive and transmit proximity and/or position data from other sensors as described in FIG. 3. The transceiver 107 may function as a sensor receiver, such as sensor receiver 166 of FIG. 3E/F.

Proximity data may include BLE, NFC, Wi-Fi or other communication transmissions comprising the tag UID or sensor UID for each sensor that is within range. The proximity data may be a proximity detector identification of proximate sensors, such as sensor or tag UIDs having a predetermined range, or proximity radii, such as Wi-Fi RSSI. Position data may include without limitation triangulation position data, such as GPS or ISO-2, telemetry data, or other data that may be used to determine the sensor position. The sensors 203a-e may transmit the proximity data or position data by NFC, Wi-Fi, BLE, or the like.

In an instance in which a sensor is the origin point for transmission of proximity or position data, the sensor may be referred to as an origin node. In an instance in which the sensor receives and/or transmits the proximity or position data of an origin node, the sensor may be referred to as a mesh node. A sensor may dynamically shift between origin node, mesh node or both based on transmitting the sensor data from another sensor, its own sensor data or both as described below.

An origin node 203a may transmit proximity data or position data to mesh nodes 203b, 203c, or 203d. Mesh nodes 203b, 203c, 203d may be configured to relay the proximity data or position data to a transceiver 107 using a mesh network protocol. In an example embodiment sensor 203b may be an origin node and a mesh node when transmitting proximity or position data from sensor 203a and transmitting its own proximity or position data. Similarly, sensor 203b may be an origin node when transmitting proximity or position data to mesh nodes 203c.

In an example embodiment, a directional long range transceiver antenna 107a may pull the proximity or position data from the origin node 203a or mesh node 203b directly without using a mesh network. In an example embodiment, the mesh network may be utilized to transmit position or proximity data out of an area of interference such as physical interference of a player pile up, and backhauled through the directional long range transceiver antenna 107a.

In an example embodiment, the origin node 203a and subsequent mesh nodes 203b-e append their associated tag UID or sensor UID to the transmission of sensor proximity or position data. The tag/sensor UIDs may be used by the mesh nodes 203b-e to determine a transmission count as described below. Additionally, the receiver hub 108 or receiver processing and distribution system 110 may use the tag/sensor UIDs for system analytics or diagnostics. For example the receiver hub 108 or receiver processing and distribution system 110 may determine the route a proximity or position data message took through the mesh network.

In an example embodiment, the duration of relay transmissions of the proximity data or position data message through a mesh network may be limited by a message count. The limitation of the message transmission duration prevents a message from cycling throughout the mesh network indefinitely, or continuing transmission after the message has been received by transceiver 107. A message count may be a number of transmissions from sensor to sensor (e.g., transmission count) such three transmissions, four transmissions, five transmissions, or any other number of transmissions. The message count may be a time count such as 3 seconds, 2 seconds, 1 second, ½ second, or any other time value.

In an instance in which the message count does not satisfy a predetermined threshold (e.g. 4 transmissions or 3 seconds), the mesh node 203 b-e may transmit the received origin node 203a proximity or position data. In an instance in which the message count satisfies a predetermined threshold (e.g., 4 transmissions or 3 seconds), the mesh node 203b-e may not transmit the received origin node 203a proximity or position data.

For example, the origin node 203a may transmit proximity or position data to a mesh node 203b, and mesh nodes 203b may transmit to mesh nodes 203c-d. In an instance in which the message count threshold is four transmissions, mesh node 203d is the last transmission of the message. The message may be received by a transceiver 107 which sends the message to the receiver hub 108 for processing, or be received by another mesh node 203e. The message count threshold is satisfied in an instance in which the mesh node 203e receives the message and the mesh node disregards the message, terminating the message route.

In another example, the origin node 203a may transmit proximity or position data to a mesh node 203b with a time notation, and mesh nodes 203b may transmit to mesh nodes 203c-d. In an instance in which the message count threshold is 3 seconds, mesh nodes 203b-d each verify the time notation is less than 3 seconds. Where the transmission to mesh node 203d occurs prior to 3 seconds and subsequent transmission would exceed 3 seconds, the transmission from 203d is the last transmission of the message. The message may be received by a transceiver 107 which sends the message to the receiver hub 108 for processing, or be received by another mesh node 203e. The message count threshold of 3 seconds is satisfied in an instance in which the mesh node 203e receives the message and the mesh node disregards the message, terminating the message route.

In an example embodiment, the receiver hub 108 or receiver processing and distribution system 110 may determine the best route for a proximity or position data message. The receiver hub 108 or receiver processing and distribution system 110 may determine that the blink data has not been received for a specified tag. The receiver hub 108 or receiver processing and distribution system 110 may use the last known location of the tag 102a and/or the assets' 402a position calculations and the locations or position calculations for other assets 402b-e in the monitored area to determine the best route for the message to reach a transceiver 107 (e.g., smallest number of transmissions). The receiver hub 108 or the receiver processing and distribution system 110 may cause the transceiver 107 to transmit the message route to the monitored area. The sensors 203 may be configured with a transceiver to receive message route or other control signals from the receiver hub 108 or processing and distribution system 110. In an instance in which a mesh node 203b-d receives a proximity or position data message, the mesh node may determine if the mesh node is designated in the message route. If the sensor is designated the mesh node 203b-e may transmit the proximity and position data message along with its own data. In an instance in which the mesh node 203b-e is not designate the mesh node dismisses the received proximity or position data.

In an example embodiment, the monitored area may have transmitters, such as exciters 112, placed at the boundary of the monitored area. The exciters 112 may transmit a short range LF signal or a transmission reliability signal. The exciters 112 may transmit the transmission reliability signal repeatedly, such as continuously or near continuously. The tags 102a-e and/or sensors may include a short range LF receiver for setting a tag blink rate. The exciters 112 may be a series of ground mounted exciters, the tags or sensors may receive the transmission reliability signal as the asset passed over the exciter. In an example embodiment, the exciters 112 may be mounted in a ring in which the asset must pass through to enter or exit a monitored area.

The transmission reliability signal from the exciters 112 may be received by the tag receiver and change the state of blink data transmission. Additionally or alternatively, the transmission reliability signal may be received by a sensor 203, the sensor may in turn transmit a signal configured to cause the tag 102 to change blink data transmission state. The transmission reliability signal may be used to transition the tag blink data transmissions based on being within or outside of the monitored area. For example, tags 102a-e may transmit blink data when they are within the monitored area or to cease transmitted blink data when they leave the monitored area as indicated by crossing through the transmission reliability signal of the exciters 112. Additionally, exciters 112 may be used to signal to sensors 203 to transmit proximity data or position data when within the monitored area or cease transmitting proximity or position data when not within the monitored area in a manner similar to tags as described.

In an example embodiment, tags alter their blink rate based on the receipt of the transmission reliability signal. For example the tag may blink at 56 Hz when within the monitored area and 1 Hz when outside of the monitored area. In other embodiments, the tag 102 and associated sensor 203 may transmit via one or multiple location methods within a monitored area and transmit on a different or single location method when outside of the monitored area. For example, transmitting blink data from the tag 102 and proximity data from the sensor 203 within the monitored area and transmitting only position data outside of the monitored area. Tags 102 terminating transmission or high blink rate transmission when outside of the monitored area may increase battery life of the tag 102 and reduce processor load on the receiver hub 108.

In an example embodiment, a transmitter 107 may transmit a transmission reliability signal to the monitored area. The transmission reliability signal may be received by a sensor 203a. In an instance when the 203a receives the transmission reliability signal it may transmit proximity data and position data or not transmit if configured to transmit only when the tag 102 location may not be calculated. If the sensor 203a fails to receive the transmission reliability signal the sensor may assume that the tag blink data is obstructed, for example, by a pile up of players in football. An illustration of an example obstruction is depicted in FIG. 6, the tag 102a and associated sensor 203 (not shown) does not have a direct line of sight to the receiver 106 due to assets 402b blocking the tag signal or any other physical obstruction to the tag signal. In an instance in which the sensor 203a does not receive the transmission reliability signal, the sensor may transmit proximity data and/or position data to mesh nodes 203b. Mesh node 203b may transmit its own blink data, proximity data, and/or position data and origin node 203a position data and/or proximity data. Additionally, sensor 203, may transmit a signal to the tag 102 configured to cause the termination of blink data transmissions or lower blink rate. When the transmission reliability signal is received at the sensor 203a, the sensor may transmit a signal configured to cause the tag 102a to recommence blink data transmissions or increase blink rate.

In an example embodiment, if sensor 203a fails to receive the transmission reliability signal, it may also transmit a distress signal. The distress signal may be indicative of a tag or sensor signal blockage. The distress signal may be received by a mesh node sensor 203b. In an instance in which a mesh node 203b receives the distress signal and proximity or position data, mesh node may transmit its own proximity data, and/or position data and origin node 203a position data and/or proximity data. In an instance in which mesh node 203b does not receive a distress signal, it may transmit only its own proximity data and/or position data and not transmit origin node 203a's position data or proximity data, having determined that the origin node is not obstructed.

The receiver hub 108 may generate a location hierarchy by assigning a priority value to each of the location and position methods for which the location system is equipped. For example, UWB location may be assigned a priority value of 1; proximity position calculation based on a UWB location may have a priority value of 2; GPS position calculation backhauled over Wi-Fi or ISO-2 may have a priority value of 3; ISO-2, Wi-Fi RSSI, and proximity position calculation based on GPS position may have a priority value of 4; where 1 represents the highest priority value and 4 the lowest priority value.

The blink data, proximity data, and position data may be received at the receiver hub 108 or receiver processing and distribution system 110 from the receivers 106 and/or transceivers 107. The receiver hub 108 or the receiver processing and distribution system 110 may calculate tag locations based on the blink data as discussed in FIG. 1. The receiver hub may determine sensor proximity data and/or sensor position data. The receiver hub 108 or receiver processing and distribution system 110 may use the location data, proximity data, and/or position data to determine a origin node position calculation based on available location and position calculation data from mesh nodes.

In an embodiment, the receiver hub 108 or the receiver processing and distribution system 110 may receive proximity data for a sensor 203a. The proximity data may include data, such as tag or sensor UIDs, identifying one or more mesh nodes 203b in proximity to the specified origin node 203a. The origin node 203a may have a predetermined range for transmission of the proximity data, limiting the receipt of the proximity data to a specified radius. For example, the range may be 10 ft, 4 ft, 2 ft, or any other radial distance value. The receiver hub 108 or receiver processing and distribution system 110 may calculate mesh node 102b location based on blink data and a proximity radius for each mesh node to determine a position calculation for the origin node 102a as illustrated in FIG. 5a.

In an example embodiment, the receiver hub 108 or receiver processing and distribution system 110 may receive position data for an origin node 203a. The position data may include telemetry data, such as Wi-Fi, or a triangulated position, such as GPS. The receiver hub 108 or the receiver processing and distribution system 110 may determine a position calculation based on the available telemetry data or triangulation position data as discussed in FIG. 3E/F.

The receiver hub 108 or the receiver processing and distribution system 110 may validate calculated tag locations using the determined position data and/or previous location/position data. The validation may reduce the occurrences of bounced blink data causing inaccurate locates or other anomalies in the tag location determination. The receiver hub 108 or the receiver processing and distribution system 110 may compare the current tag location data to the previous tag location data. Previous tag location data may include the last 2, 5, 10, 20 or another number of tag location data that were calculated before tag location data that is being validated. In an instance in which the change in location data satisfies a predetermined threshold such as 2 ft, 5 ft, 20 ft, 30 ft, 100 ft, or any other distance value, the receiver hub 108 or the receiver processing and distribution system 110 may determine that the tag 102 could not travel the determined distance between blinks and dismiss the location data. For example, in an instance in which the tag location data changes by 35 ft and the predetermined threshold is 20 ft, the receiver hub 108 or receiver processing and distribution system 110 may dismiss the location data.

In an example embodiment, the receiver hub 108 may compare the location data of an asset 402a to the location data of assets 402b that have received the origin node 203a proximity data. The receiver hub 108 or the receiver processing and distribution system 110 may determine that the tag 102a location data is within the mesh nodes 203b proximity radius and is therefore valid, as shown in FIG. 5a. The receiver hub 108 or receiver processing and distribution system may determine that the tag 102a location data is outside of the mesh node 102b proximity radius and therefore the location data is invalid and dismiss the location data as unavailable.

In an example embodiment, the receiver hub 108 or receiver processing and distribution system 110 may compare the tag 102 location data to the determined positions based on the position data received from the sensor 203a. The receiver hub 108 or receiver processing and distribution system 110 may determine that the location data is within the position calculation accuracy radius or radii, as shown in FIG. 5b, and therefore the tag location data is valid. The receiver hub 108 or receiver processing and distribution system 110 may determine that the tag location data is outside of the determined sensor position calculation accuracy and dismiss the location data as unavailable.

The receiver hub 108 or the receiver processing and distribution system 110 may determine a message route based on the last location data of the asset 402 and the location data and position calculations of other assets. The receiver hub 108 or the receiver processing and distribution system 110 may determine the shortest route, e.g. the smallest number of transmissions through a mesh network to the transceiver 107 and designate mesh nodes 203b-e. The receiver hub 108 or receiver processing and distribution system 110 may cause the transceiver 107 to transmit the message route to the monitored area for receipt by sensors 203a-e.

The receiver hub 108 or the receiver processing and distribution system 110 may determine the highest priority location or position data available, or over-determined location. The receiver hub 108 or receiver processing and distribution system 110 may determine which location methods are available (e.g. providing an accurate or valid location or position). The receiver hub 108 or receiver processing and distribution system 110 may select the available location or position calculation data which has the highest assigned priority value, in a location hierarchy. For example, if UWB location-priority 1 and GPS position calculation-priority 2 are available the receiver hub 108 or receiver processing and distribution system 110 may select the UWB location. In an instance in which the receiver hub 108 or receiver processing and distribution system 110 determines that UWB proximity position calculation-priority 2 and Wi-Fi-priority 3 are available, UWB proximity position calculation may be selected. In an instance in which two or more location methods are available and have the same priority value the determined position may be an average of the selected locations or positions.

The receiver hub 108 or receiver processing and distribution system may cause the display of the selected location or position calculation data on a graphic user interface (GUI). In an example embodiment the selected location or position calculation data is displayed on the GUI overlaid with the other available location or position data. Additionally, the receiver hub 108 or receiver processing and distribution system may cause all or at least the selected location and position calculation data to be stored in a memory for later analysis or display.

Example Over-Determined Location System with Distinct Monitoring Areas

Figure 7:
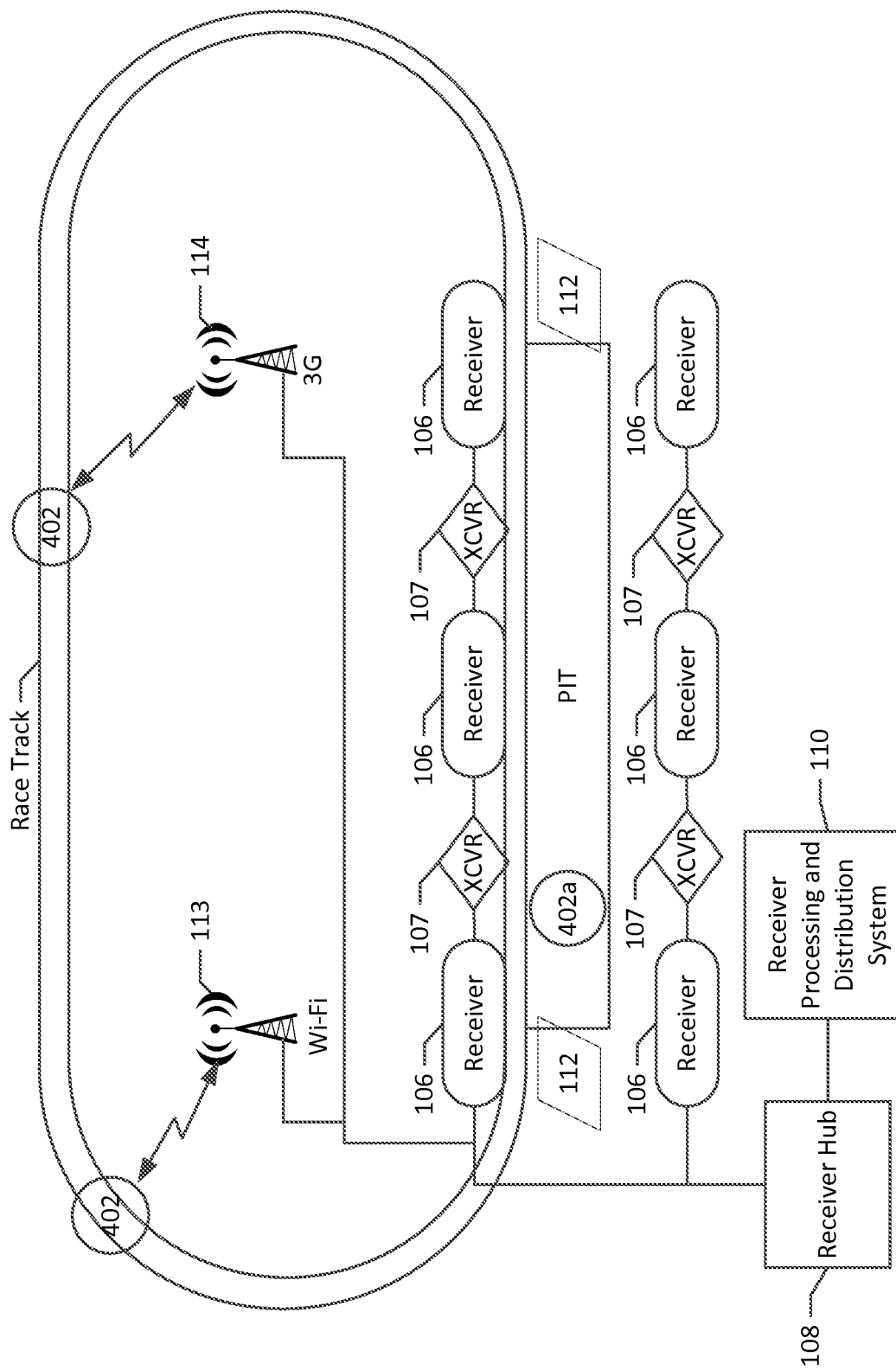
FIG. 7 illustrates an exemplary over-determined location system with distinct monitoring areas in accordance with some example embodiments of the present invention.

FIG. 7 illustrates a diagram of an over-determined location system utilizing multiple location technologies. The location system including tagged assets 402/402a, receivers 106, transceivers 107, a receiver hub 108, a receiver processing and distribution system 110, exciters 112, a Wi-Fi receiver 113, and a cellular (3G) receiver 114. In an event location such as a race track, a cross county field or a bicycle course, a single location technology may not be suitable to deliver accurate location over the range of the event terrain or area. A location system may utilize multiple location technologies to deliver the type of information required at different areas of the event. For example, on a race track a location may be desired, but a subfoot location may be unnecessary. However within the same event in the pit area high accuracy location of tools, personnel, cars, or the like may be desired for safety and analytics. In another example, UWB locations may be highly desirable at the finish line of events as a method of determining a winner of a race, but subfoot accuracy may not be necessary for the remainder of the event.

The receiver hub 108 or receiver processing and distribution system 110 may generate a location hierarchy for each monitored areas of the event. For example, in the first monitored area, such as the pit, transition point or pit the receiver hub 108 or receiver processing and distribution system 110 may establish a location hierarchy by assigning a priority of 1 to UWB location and a priority of 2 to position calculations, such as GPS. In a second monitored area, such as the race track, race course, or the like, the receiver hub 108 or receiver processing and distribution system 110 may establish a location hierarchy by assigning a priority of 1 to position calculations, such as GPS, and a priority of 2 to UWB location data, which may or may not be available. The receiver hub 108 or receiver processing and distribution system 110 may determine an over-determined location based on the location data, position calculation data and the location hierarchy of the first or second monitored area.

Continuing the example, assets 402/402a may carry tags 102, sensors 203 or a monitoring unit 510 as discussed in FIGS. 2 and 4. In an instance in which asset 402 is outside of the UWB monitored area of the event, here the pit, the tag may utilize DGPS or other triangulation positioning and transmit the position data to the receiver hub through a Wi-Fi 113 or 3G receiver 114. When an asset 402a enters the monitored area, such as the pit of a race track, UWB blink data may be received by receivers 106 and a location data calculated as discussed above in FIG. 1. The pit crew can use the high accuracy location data in the pit area to for analytics such as, determining optimum pit crew deployment to decease pit stop time and determining crew member locations to prevent injury.

The tag 102a may receive a transmission reliability signal from an exciter 112. The tag 102a may commence transmitting when it receives the transmission reliability signal and may cease transmission when it exits the transmission reliability signal area as discussed in FIG. 4. In an example embodiment, the sensor 203a may receive a transmission reliability signal from transmitter 107 or exciters 112. The sensor 203a may transmit proximity data or position data, based on receiving or not receiving the transmission reliability signal as discussed above in FIG. 4. Further, the sensor may transmit a signal configured to cause the tag 102a to transition the tag blink rate based on the receipt of the transmission reliability signal as discussed above in FIG. 4. In some example embodiments, the pit may be a first zone of a monitored area and the event area outside of the first zone of the monitored area, e.g. the race track, may be a second zone of the monitored area.

Example Receiver Hub

Figure 8:
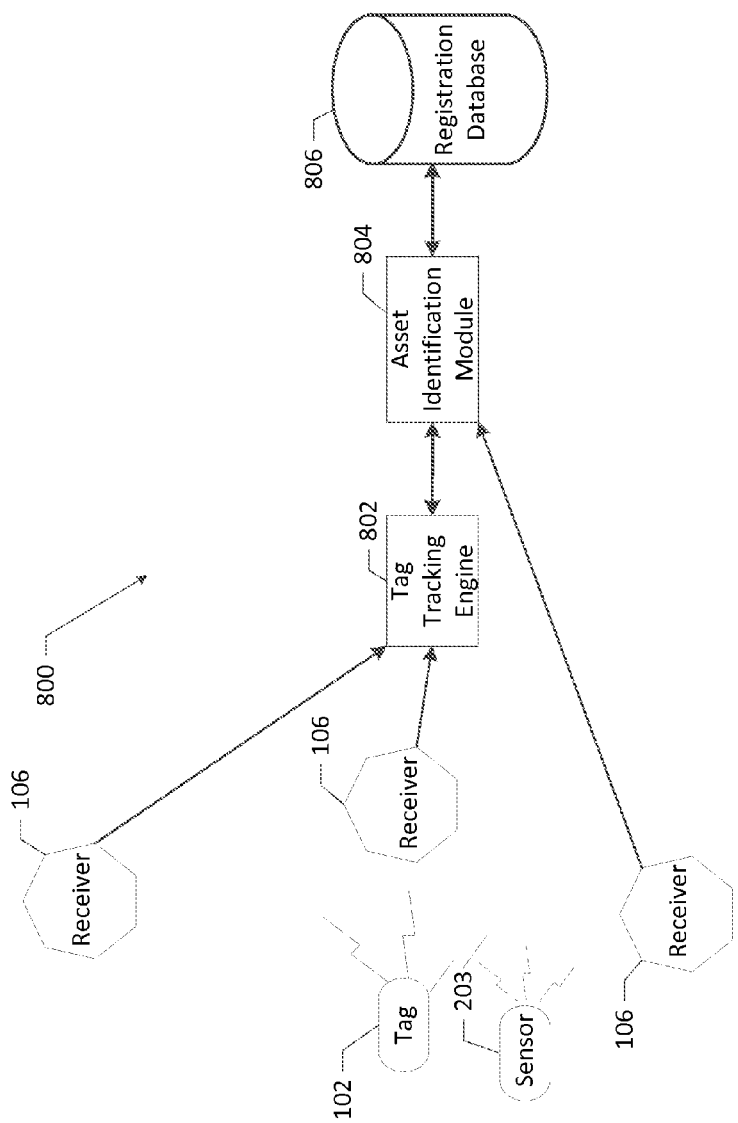
FIG. 8 illustrates an exemplary system for associating tags with assets in accordance with some embodiments of the present invention.

FIG. 8 illustrates an exemplary system 800 for associating a tag and/or sensor 203 with an asset and/or spatial association model in accordance with some embodiments of the present invention. The depicted system 800 may be distributed across a receiver hub 108 of the type depicted in FIG. 1. In alternative embodiments, the system 800 may be housed or located in a single housing or unit. In still further embodiments, the system 800 may be distributed among multiple additional housings or units depending upon the application and other design parameters that will be apparent to one of ordinary skill in the art in view of this disclosure.

The system 800 of FIG. 4 may include a plurality of tags 102, and sensors 203, associated with assets (e.g., players, officials, balls, field markers, etc.), a plurality of receivers 106 and/or sensor receivers 166 within a monitored environment, a tag tracking engine 802, an asset identification module 404, and a database of tag registrations 806.

In an exemplary system 800, such as illustrated in FIG. 8, the plurality of tags 102 (and sensors 203) may be attached to an asset as discussed in connection with FIGS. 3A-E. In some embodiments, the plurality of tags 102 may be activated and deactivated as needed, such as before and after a game or when damaged or to replace batteries, power supplies, local memory, etc. Each of the tags 102 may transmit data, including a unique ID and other tag derived data, which is received by one or more of the receivers 106. In some embodiments, the receivers 106 may be configured with appropriate RF filters, such as to filter out potentially interfering signals or reflections proximate the field of play or other environment to be monitored.

Each of the receivers 106 may receive tag signals transmitted from the tags 102 and transmit tag derived data to the tag tracking engine 402. In the depicted embodiment, a sensor receiver 166 receives sensor signals transmitted from the sensors 203 and transmits sensor derived data to an asset identification module 804. The tag tracking engine 402 may collect the tag derived data from the receivers 106 and compute tag location data for the tags 102 as discussed above in connection with FIG. 1. The tag location data may then be provided to the asset identification module 804 that may use the tag location data and, optionally, received sensor derived data, to associate a particular tag and/or sensor with a particular asset.

Associations between the tags 102, sensors 203 and particular assets may be stored within a registration database 806. The registration database 806 may include a list of unique identifiers for the particular tags and/or sensors and information indicating which tags/sensors are associated with which assets. For example, the registration database 806 may include data linking a particular set of tags with a particular player (e.g., tag-asset correlators), a particular piece of player equipment (e.g., tag-equipment correlators), a particular game ball (e.g., tag-ball correlators), a particular sensor (e.g., tag-sensor correlators) or the like. The registration database 806 may further include data linking a particular set of sensors with a particular player (e.g., sensor-asset correlators), a particular piece of player equipment (e.g., sensor-equipment correlators), a particular game ball (e.g., sensor-ball correlators), a particular tag (e.g., tag-sensor correlators) or the like. The registration database 806 may further include asset data, profile data, and/or role data for assets that are registered with each tag or tags, and vice-versa.

The registration database 806 may be populated with the association for each tag and/or sensor at the time the tag/sensor is registered and/or activated for the particular asset. Tags/sensors may also be re-associated or reallocated as needed. For example, a malfunctioning tag may be replaced during a game with a replacement tag. Embodiments may function to associate the replacement tag with the same asset from which the malfunctioning tag was removed. Embodiments may further function to associate the replacement tag with one or more sensors that were previously associated with the replaced or original tag.

The registration database 806 may further include descriptors for each tag. For example, a given tag associated with the left side of a player's shoulder pads may be associated with a "shoulder-left" descriptor, and a tag associated with the right side of the player's shoulder pads may be associated with a "shoulder-right" descriptor. These descriptors may be utilized to identify each tag with a particular spatial or physical location on the asset. In one embodiment, the descriptor may include a set of coordinates relative to the asset while in a particular stance, such that a tag on the right foot might be 0 cm, 3 cm, 0 cm; a tag on the right shoulder might be 0 cm, 150 cm, 2 cm; a tag on the right wrist might be −65 cm, 150 cm, 0 cm. In some embodiments, one of the tags may be at position 0,0,0 and other tags associated with the asset would be at positions relative to the first tag. One skilled in the art would see that non-Cartesian coordinate systems could be used. In some embodiments, two tags on the same asset may be in fixed positions relative to each other, such as the left and right shoulder, or back and front. In some embodiments two tags on the same asset may be in variable positions relative to each other, such as a hand and foot, which may vary relative to each other based on stance or body movement. The registration database may include information related to whether the position of the tag is fixed or variable relative to the coordinate system, a physical feature of the asset, or a particular tag associated with the asset.

In some embodiments, the registration database 806 may further include a spatial association model for each asset type. The spatial association model may include a list of expected tags and/or sensors for association with each asset type. For example, a player may be associated with four tags, one located in each side of their shoulder pads and one in each knee pad, while a ball or penalty flag might be associated with a single tag. The spatial association model for each asset may define how many tags are expected to be associated with that asset. In some embodiments, the model may further include spatial information about the location or orientation of the tags for each asset with respect to one another. For example, a "player" spatial association model might include four tags representing tags located on each shoulder and each knee. These spatial association models may include information specifying an expected distance range between each of the tags, such as "18-36 inches" for the shoulder tags and "6-48 inches" for each of the knee tags. Similarly, the spatial association model may indicate expected locations in a three dimensional plane for each set of tags, such as by indicating that shoulder tags are generally expected to be located physically above knee tags. It should be appreciated that various additional or alternative spatial association models may be defined for various assets. For example, a spatial association model may correspond to an asset that is a pallet of goods, and define a two or three dimensional area associated with the pallet, such that RF tags associated with goods on the pallet are located within or expected to be located within the two or three dimensional area. In some embodiments, spatial association models are associated not only with particular asset types, but also with particular assets of the same type. For example, known biometric information (e.g., height, shoulder width) for particular players may be employed to generate spatial association models for each asset player.

Such models may be employed to assist with the registration of unknown tags. For example, if a model indicates that each player should be registered with 4 tags, but a given player is only associated with 3 tags and the system identifies one unregistered tag, then the system may determine to register the unregistered tag with the player who is missing a tag. The location of the unregistered tag in relation to the location of the other three tags associated with the player may be utilized to determine whether the unregistered tag is likely to be a correct association for the player. For example, if the unregistered tag is located more than 10 yards from the player missing a tag, then the system may choose not to register the unregistered tag with the player missing the tag. Similarly, if the system determines that an unregistered tag does not conform with the spatial association model for a given player (e.g., the unregistered tag's location would be physically impossible on a human being given the relative locations of the registered tags), the system may also not register the tag with the player or may instead flag an error condition for a technician to investigate. It should be appreciated that the registration process itself may include registration with a spatial association model corresponding to a particular asset.

In some embodiments, spatial association models may be employed to perform error checking of data received from location tags. In some scenarios, a signal reflection or interference may result in one or more tags reading inaccurate locations. A spatial association model may be employed to compare data received from other tags associated with the asset to identify outliers or possible erroneous data. For example, if one tag of four tags associated with a given asset registers a location much farther away than the other three tags associated with the asset, then the location information from the first tag may be flagged as possibly erroneous and possibly filtered out. In response to multiple such location readings, the tag may be flagged as malfunctioning and deactivated, and/or a technician may be notified automatically to investigate and replace the tag.

Additionally or alternatively, the spatial association models may be employed to detect malfunctioning, damaged, or missing tags by identifying when a particular tag or tags does not correspond to the expected position within the model. Examples of processes for using such models to analyze data are described below with respect to FIGS. 12 and 13.

In some embodiments, data from one or more of the sensors (e.g., a proximity detector, proximity label, etc.) is used to determine the association between a particular tag and a particular asset. The asset identification module 804 may receive the sensor derived data and data from the tag tracking engine to determine correlations between the identity of the asset and an identifier associated with the tag. Upon determining this correlation, an entry for the particular tag-asset association (e.g., a tag-asset correlator) may be created within the tag registration database 806.

The foregoing description describes various example techniques for determining asset associations for one or more unassociated or unallocated RF location tags. While not discussed in detail below to avoid duplication, it will be readily apparent to one of ordinary skill in the art that the inventive concepts described below may also be applied to determining asset or tag associations for one or more unassociated or unallocated sensors.

Example proximity detectors and proximity labels that may be used for determining these tag associations may include camera sensors, biometric sensors, bar code readers, RFID readers, other RFID tags, or the like. As an example, embodiments may include the ability to determine a location of an unallocated tag. For example, the tag tracking engine 802 may detect the presence of a tag not associated with any particular asset (e.g., in the case of an unassociated replacement tag). The tag tracking engine 802 may be operable to identify the location of the unassociated tag, and to direct a camera sensor (e.g., a proximity detector) to view the location of the unassociated tag. The camera sensor may be employed to detect the presence of one or more assets at the location of the unassociated tag, and the asset identification module may be operable to determine the asset to be associated with the unassociated tag based on which assets are present (e.g., if it can be determined that all of the visible assets at the location but one have all of their associated tags accounted for, then the asset identification module 804 may associate the unassociated tag with the one asset with an unaccounted-for tag).

As another example embodiment, the proximity detectors may include biometric sensors. For example, upon replacing a tag an asset may provide biometric data via a fingerprint reader, retinal scanner, facial recognition scanner, or the like. The biometric data may be provided to the asset identification module 804 to determine the identity of the asset. For example, the asset identification module 804 may access a biometric database (not pictured) containing biometric data for a particular set of assets. The biometric data may be matched to a particular asset. The biometric scanner may further send an identifier for the particular tag to be associated with the particular asset to the asset identification module 804, such as via a wireless network connection, and the particular tag identifier may be associated with the particular asset within the registration database 806.

As yet another example embodiment, the locations of two or more proximity detectors, receivers 106, or sensor receivers 166 may be used to correlate a tag or sensor to an asset. For example, assets may enter a field or zone in a particular order (e.g., players leaving the locker room in a single file manner via a tunnel), and the order may be known to the system. A receiver 106 (or optionally a proximity detector or sensor receiver 166) may be strategically placed to read tags (or sensors) affixed to each asset as they pass by the receiver in the particular order, such that the asset identification module 804 associates the tags or sensor with the particular assets in the order in which the tags or sensors are read.

In yet further embodiments, a sensor 204 or, more specifically, a proximity detector may be a device used to configure tags for use by assets. For example, the sensor 204 may be a handheld or mobile device employed by a user to provide data to the asset identification module 804 indicating that a particular tag should be registered with a particular asset. The mobile device may provide the ability to transmit identification data (e.g., sensor derived data, identify information, time of sensing, etc.) to the asset identification module when a tag is replaced. The mobile device may provide the capability to indicate which tag for which user is being replaced (e.g., left shoulder pad tag for player A, or right knee tag for player B), and an identifier (e.g., tag UID) associated with the tag that is being replaced. The identifier associated with a tag may be transmitted via an RF signal by the tag, or displayed on the tag, possibly as text or a bar code; one skilled in the art would appreciate that the UID transmitted by the tag could be the same or different as that displayed on the tag, providing that there was sufficient information to correlate the identification data (tag UID or environmental measurements) captured by the mobile device with the UID transmitted by the tag in blink data. In some embodiments, the mobile device may be functional to receive environmental measurements, such as biometric data as described above, and transmit the environmental measurements to the asset identification module 804 for use in associating the tag with the particular asset.

In some examples, the mobile device make take the form of a DartWand™ that is operable to configure one or more tags at distances up to 60 cm and detect tag emissions up to 150 m. An exemplary DartWand™ manufactured by Zebra Technologies is the Zebra DartWand™ Module, a small table top device used to configure and inventory DartTags™ that turns tags on and off and sets their blink rate to one of a wide range of rates.

In yet further embodiments, the asset identification module 804 may associate a particular tag with a particular asset by monitoring the tag location received from the tag tracking engine 802, and deriving the identity of the asset based on the locations of the other tags in relation to the particular tag. For example, the asset identification module 804 may determine that a particular unassociated tag is consistently present in proximity to a set of assigned tags corresponding to a particular asset, and thus it may be appropriate to associate the unassociated tag with the particular asset. In this way, for example, a replacement tag located on equipment worn by an asset could be automatically associated with the asset based on the replacement tags consistent proximity to other tags worn by the asset. Embodiments may further utilize the techniques described above with respect to determining which players are "missing" tags to assist with determining the appropriate asset for assignment.

In yet further embodiments, the asset identification module 804 may associate a particular tag with a particular asset based on a unique signal received from the asset or equipment associated with an asset. In a first example, a proximity label, e.g., a passive RFID label, may be stitched or otherwise attached to a jersey or other identifying piece of equipment associated with an asset, the passive RFID label being configured to identify the identifying piece of equipment, such as the jersey number, when read by a proximity detector or other sensor, such as a RFID reader.

In yet further embodiments, the asset identification module 804 may associate a particular tag with a particular asset based on an identifying number included as part of tag derived data (e.g., a tag UID, tag-asset correlator, or a variable field) in some or all transmitted tag signals. In some embodiments, such an identifying number transmission may be transmitted in a first transmitted tag signal from a particular tag.

Example Apparatus

Figure 9:
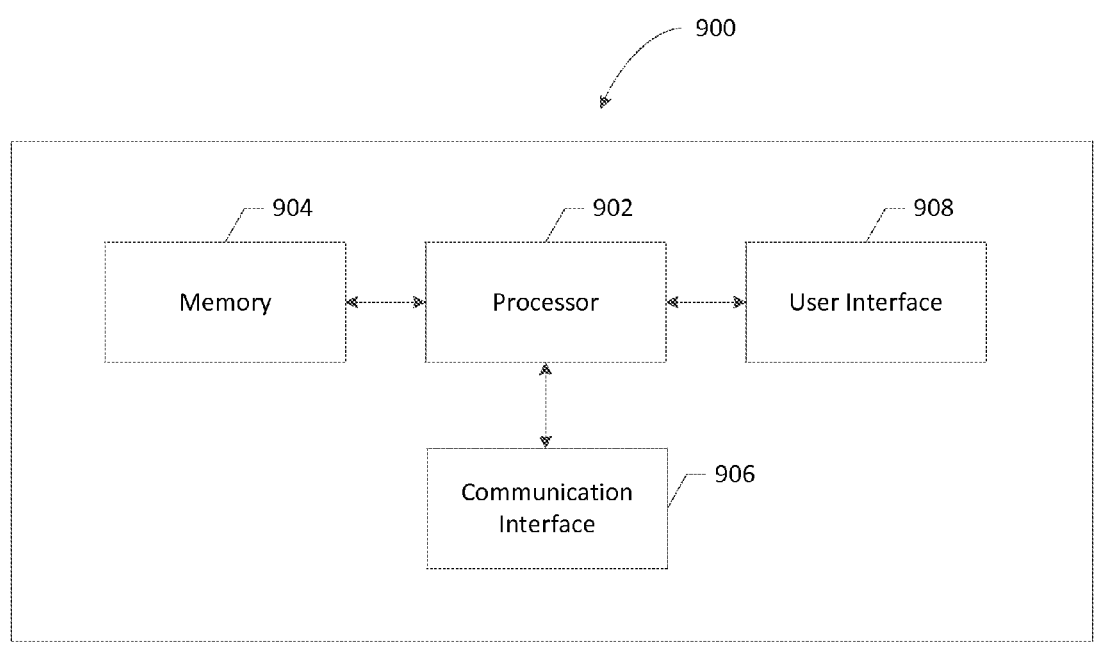
FIG. 9 illustrates an exemplary block diagram of processing components of a location system in accordance with some example embodiments of the present invention.

FIG. 9 shows a block diagram of components that may be included in an apparatus 900 that may facilitate the use of spatial association models in accordance with embodiments described herein. The apparatus 900 may comprise one or more processors, such as a processor 902, one or more memories, such as a memory 904, communication circuitry 906, and a user interface 908. The processor 902 can be, for example, a microprocessor that is configured to execute software instructions and/or other types of code portions for carrying out defined steps, some of which are discussed herein. The processor 902 may communicate internally using data bus, for example, which may be used to convey data, including program instructions, between the processor 902 and the memory 904.

The memory 904 may include one or more non-transitory storage media such as, for example, volatile and/or non-volatile memory that may be either fixed or removable. The memory 904 may be configured to store information, data, applications, instructions or the like for enabling the apparatus 900 to carry out various functions in accordance with example embodiments of the present invention. For example, the memory could be configured to buffer input data for processing by the processor 902. Additionally or alternatively, the memory could be configured to store instructions for execution by the processor 902. The memory 904 can be considered primary memory and be included in, for example, RAM or other forms of volatile storage which retain its contents only during operation, and/or the memory 904 may be included in non-volatile storage, such as ROM, EPROM, EEPROM, FLASH, or other types of storage that retain the memory contents independent of the power state of the apparatus 900. The memory 904 could also be included in a secondary storage device, such as external disk storage, that stores large amounts of data. In some embodiments, the disk storage may communicate with the processor 902 using an input/output component via a data bus or other routing component. The secondary memory may include a hard disk, compact disk, DVD, memory card, or any other type of mass storage type known to those skilled in the art.

In some embodiments, the processor 902 may be configured to communicate with external communication networks and devices using the communications circuitry 906, and may use a variety of interfaces such as data communication oriented protocols, including X.25, ISDN, DSL, among others. The communications circuitry 906 may also incorporate a modem for interfacing and communicating with a standard telephone line, an Ethernet interface, cable system, and/or any other type of communications system. Additionally, the processor 902 may communicate via a wireless interface that is operatively connected to the communications circuitry 906 for communicating wirelessly with other devices, using for example, one of the IEEE 802.11 protocols, 802.15 protocol (including Bluetooth, ZigBee, and others), a cellular protocol (Advanced Mobile Phone Service or "AMPS"), Personal Communication Services (PCS), or a standard 3G wireless telecommunications protocol, such as CDMA2000 1xEV-DO, GPRS, W-CDMA, LTE, and/or any other protocol.

The apparatus 900 may include a user interface 908 that may, in turn, be in communication with the processor 902 to provide output to the user and to receive input. For example, the user interface may include a display and, in some embodiments, may also include a keyboard, a mouse, a joystick, a touch screen, touch areas, soft keys, a microphone, a speaker, or other input/output mechanisms. The processor 902 may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., the memory 904, and/or the like).

Examples of Spatial Association Models

Figure 10:
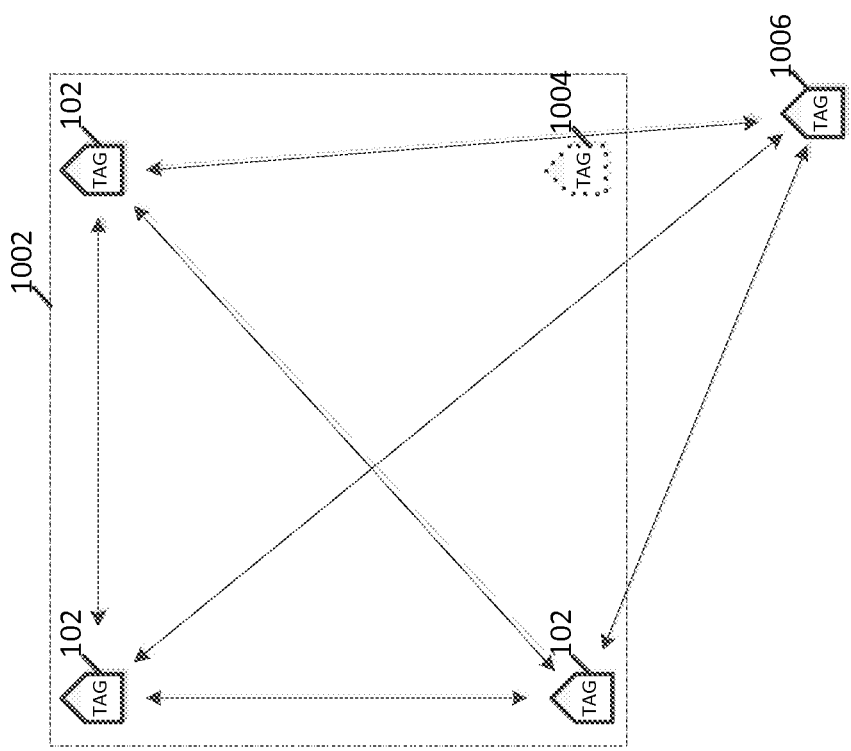
FIG. 10 illustrates an example of a spatial association model for detecting erroneous data in accordance with embodiments of the present invention.

FIG. 10 illustrates an example of a spatial association model for detecting erroneous data in accordance with embodiments of the present invention. As described above, a spatial association model 1002 may define one or more features of an asset that are relevant to determining the location or position of the asset or elements thereof. For example, the spatial association model 1002 may include dimensions of the asset (e.g., a length, a width, and a height), locations relevant to various location or positioning technologies (e.g., a location of locator tags, GPS transponders, infrared emitters, or other elements) relative to the dimensions of the asset, or the like. In the present example, the spatial association model 1002 indicates that the asset is a roughly square shape, with expected RF locator tags positioned at each of the four corners of the square. However, in the present example, one of the four tags 1006 is measured by a locator system as being located in a position other than the expected position 1004. Since the position 1006 falls outside of the parameters of the spatial association model 1002, the location of the tag 1006 may be marked as erroneous. It should be appreciated that the spatial association model 1002 may be defined in various forms. For example, the spatial association model 1002 may be defined as an expected length and width of the asset. In such an example, data that corresponds to locations outside of the area defined by the length and width may be marked as erroneous or otherwise flagged as suspect. Alternately or additionally, the spatial association model 1002 may be defined based on a spatial distance between locator tags. If one or more of the locator tags (e.g., the tag 1006) is detected at a greater distance from the other locator tags 102, then the information associated with the tag 1006 may be marked as erroneous. Additionally or alternatively, tag information may be identified as erroneous based on a distance between an expected tag location (e.g., the expected position 1004) and the measured position of the tag.

The expected tag location may be determined based on a relative position to the other tags 102 associated with the model, assuming the relative position of those tags is consistent with the spatial association model. To that end, embodiments may verify that at least a threshold amount of location and/or position information is available that is consistent with the spatial association model before identifying any location or position information associated with the asset as erroneous. For example, in a spatial association model that includes four locator tags may require that at least three tags are measured at locations that have a spaced relationship consistent with a spatial relationship defined within the spatial association model before marking a fourth tag as erroneous. In some embodiments, this may require that a simple majority (e.g., greater than 50%) of tags associated with the spatial association model are identified at locations consistent with the model. In other embodiments, various other methods for determining a minimum degree of confidence that the location or position of the asset matches the model. For example, some embodiments may only require two or more tags to be measured in a location or position consistent with the model, while other embodiments may not rely on a number of tags at all. For example, some embodiments may incorporate sensor data received from alternative location or position sensing technologies, such as by determining a position of the asset using a GPS system and identifying tags closest to the GPS position as associated with the spatial association model. Tags associated with the asset that do not conform to the spatial association model defined by the tags selected based on the GPS coordinates may then be identified as erroneous.

Figure 11:
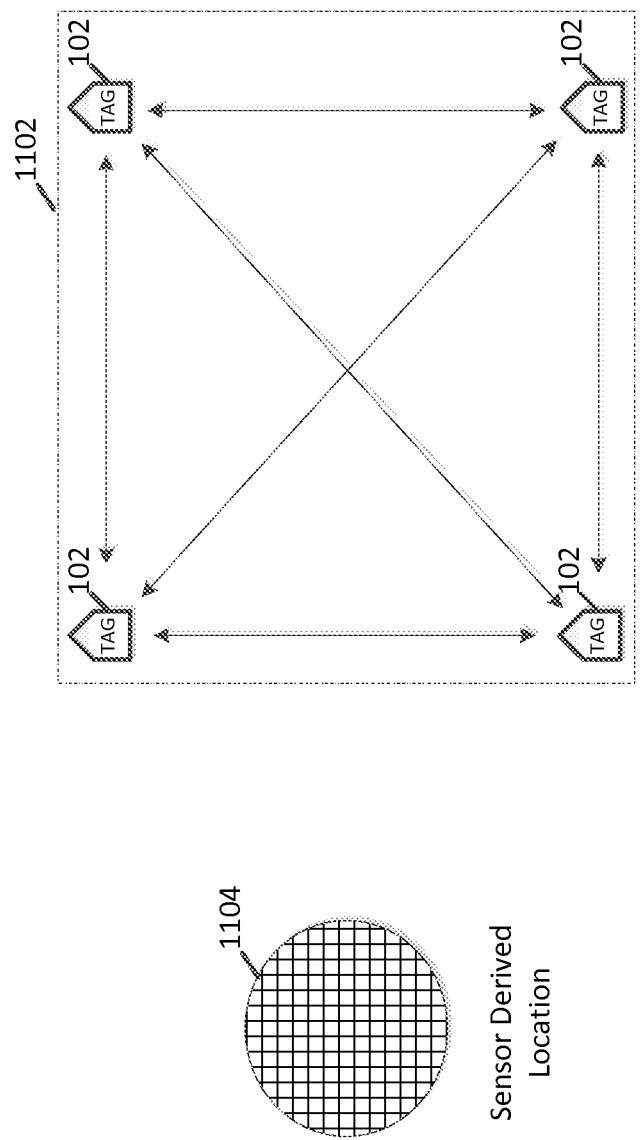
FIG. 11 illustrates an example of the use of a spatial association model in conjunction with an over-determined location system to detect erroneous data in accordance with embodiments of the present invention.

FIG. 11 illustrates an example of the use of a spatial association model in conjunction with an over-determined location system to detect erroneous data in accordance with embodiments of the present invention. As noted above with respect to FIG. 10, a spatial association model may be employed to detect erroneous tag information, such as to determine whether one or more of a plurality of tags are providing erroneous data. However, spatial association models may also be employed to measure, calibrate, and detect errors across different location and position detection technologies as well.

The spatial association model 1102 depicted in FIG. 11 illustrates four locator tags 102 at positions consistent with the spatial association model 1102. However, a sensor derived location 1104 (e.g., GPS coordinates or some other set of coordinates derived by a system other than an RTLS system) is inconsistent with the spatial association model 1102. In this example, the sensor derived location 1104 may be marked as erroneous. As such, it should be readily apparent that embodiments may function to not only detect error within a particular location technology (e.g., one faulty tag among many), but also detect erroneous results provided by different technologies. In some embodiments, the spatial association model 1102 may further define different ranges for different technologies, in acknowledgement of the different resolutions of different technologies. As such, a spatial association model 1102 may include a larger tolerance for deviation for a GPS system, for example, than for a UWB system. Embodiments may further be employed in conjunction with an over-determined location system to identify erroneous data across different location and positioning systems. An example of an over-determined location system in which embodiments may be employed is provided with respect to U.S. patent application Ser. No. 14/298,012, which is herein incorporated by reference in its entirety.

Example Filtering Using Spatial Association Models

Figure 12:
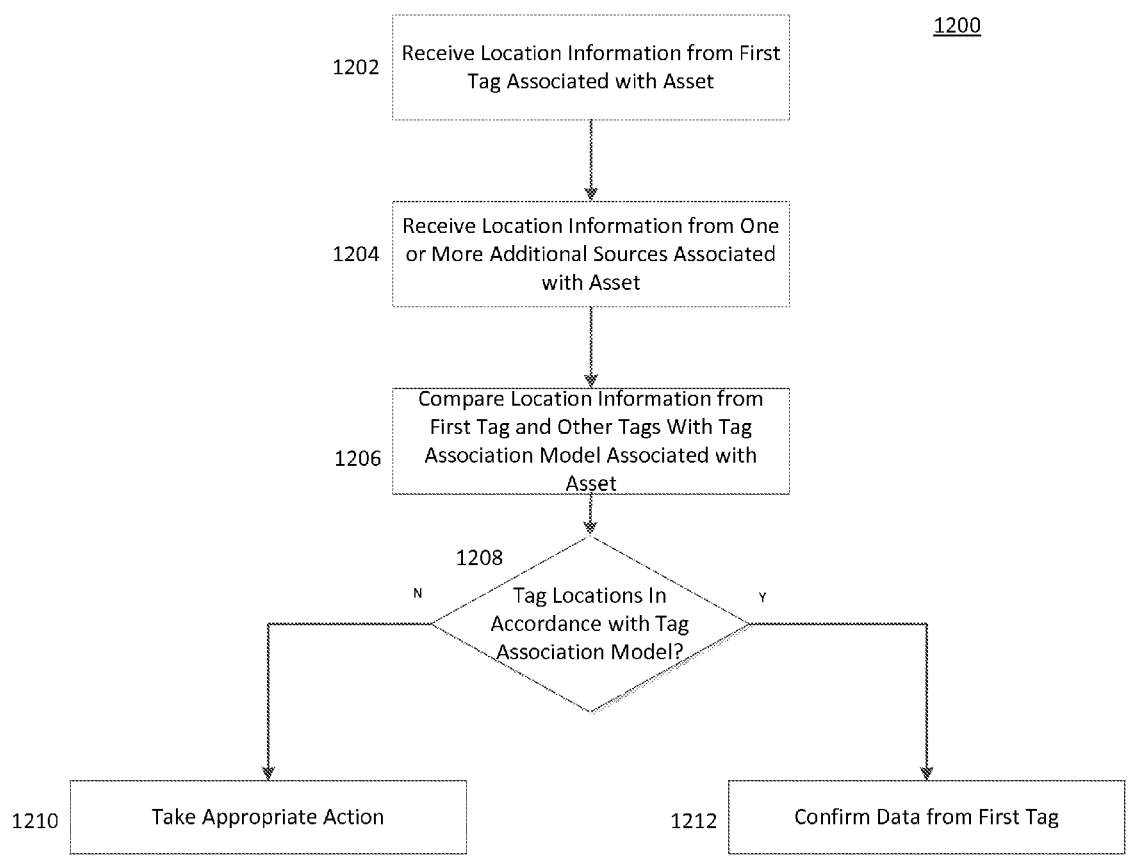
FIG. 12 illustrates a flowchart of an exemplary process for using a spatial association model to detect erroneous data in accordance with example embodiments of the present invention.

FIG. 12 illustrates an example flowchart of the operations performed by an apparatus, such as apparatus 1200 of FIG. 12, in accordance with example embodiments of the present invention. The process 1200 describes how spatial association models may be employed to verify and validate information received from a particular source, such as a particular location tag. It should be appreciated that although embodiments may be described with respect to a single tag, such techniques are equally applicable for detecting errors from multiple tags, in positions or locations derived from multiple different readings, or the like. As described above, spatial association models may indicate the number and location of tags associated with a particular asset. This location information may include the relative location of tags with respect to one another. When tags are registered with a particular asset, data received for those tags may be validated against a spatial association model for the asset according to the process 1200 described herein. In this manner, spatial association models may be used to detect errors caused by signal reflections, interference, and the like and to detect malfunctioning tags. Other example embodiments for detecting erroneous location readings that may be used in addition to or in conjunction with the methods described herein are described in U.S. Patent Application 61/895,548 which is herein incorporated by reference in its entirety. The process 1200 may be performed, for instance, by the apparatus 900 as described above.

At action 1202, location information is received for a first tag associated with an asset. As noted above, although the instant embodiment is described with reference to a single tag, it should be readily appreciated that the location information could be derived from multiple tag readings, or even from an entirely different technology. At action 1204 location or position information may be received for other sources associated with the asset. For example, location or position information may be received from other tags associated with the asset or various methods of using sensor derived data to generate location or position information. At action 1206, the location associated with the first tag may be compared against the location information received for the other tags by examining a spatial association model associated with the particular asset with whom the tags are associated. For example, a player model may indicate four tags disposed in the areas corresponding to the player's shoulder pads and knee pads, while a ball model may indicate two tags disposed at opposite ends of a football. The spatial association model may also include an expected relative location between tags, such as an expected physical distance or range of physical distances between the tags, an expected coordinate difference (e.g., ranges in X, Y, and Z directions), a distance or set of locations determined by an expected range of motion of movable parts of the asset (e.g., for tags associated with a player's limbs) or the like.

The comparison process performed at action 1206 may further include a determination of which, if any, location or position measurements correspond to the spatial association model for the asset. For example, as described above, certain measurements may be deemed more likely to correspond to the "true" position of the asset by determining which measurements, if any, best fit the spatial association model defined for the asset.

At action 1208, a determination is made as to whether the location information for the first tag is in accordance with the location of the other tags by using the spatial association model. For example, if three tags of a given player are located in proximity to one another and a fourth tag is located far away and the spatial association model for the player indicates the four tags should all be in close proximity, then the data from the fourth tag may be identified as suspect. Similarly, if all four tags are in locations consistent with a spatial association model for the asset, but a GPS location is not, then the GPS location may be identified as suspect. If the tag locations are not in accordance with the spatial association model, the method proceeds to action 1210 and takes appropriate action.

The appropriate action may be determined by various factors, including but not limited to the context in which the spatial association model is employed. For example, the spatial association model may be employed as a filter to eliminate incoming location or position data that is likely to be erroneous. In such a scenario, tag location information that does not conform to the spatial association model may be disregarded or discarded as likely a result of a transient signal or reflection. Alternately, if the spatial association model is employed to identify malfunctioning or damaged tags, tags that report location information that does not conform to the spatial association model may be flagged or otherwise noted for repair or replacement. Further data received from such malfunctioning tags may also be disregarded by the system until the tag is replaced and a new tag associated with the spatial association model for the particular asset. As yet another example, if the spatial association model is employed for anti-theft or security purposes (e.g., to track goods stored on a particular pallet to ensure the goods do not leave the pallet location), then an alarm may be generated to notify security that a possible security breach has occurred.

If the location of the first tag is in accordance with the spatial association model and the relative locations of the other tags, then the data may be confirmed or validated at action 1212.

Example Generation of a Spatial Association Model

Figure 13:
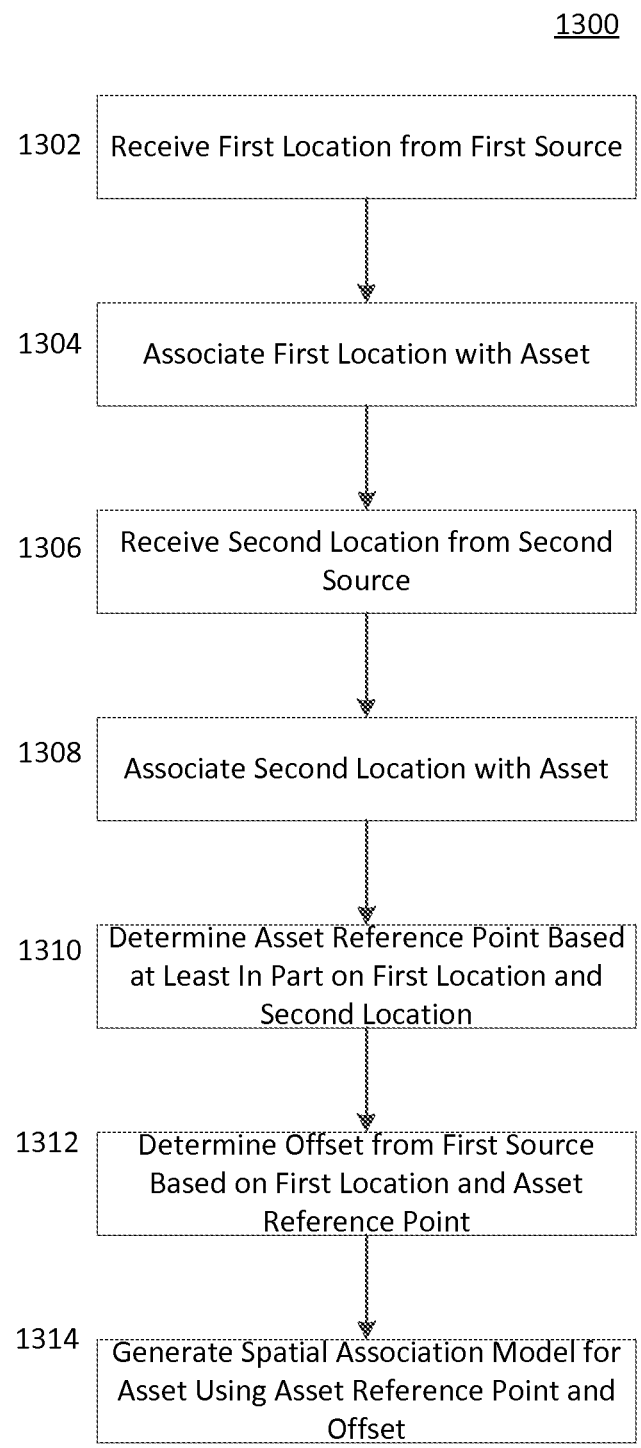
FIG. 13 illustrates a flowchart of an exemplary process for generating a spatial association model in accordance with example embodiments of the present invention.

FIG. 13 illustrates an example flowchart of a method for dynamically generating a spatial association model. As noted above with respect to FIG. 2, a spatial association model may include one or more measurements between known reference points (e.g., tag locations or attachment points) associated with an asset. In some circumstances, it may be desirable to generate spatial association models before performing real-time location operations. For example, assets may be measured beforehand to determine reference measurements, and spatial association models for those assets and derived from those reference measurements may be stored for later use. However, it should also be appreciated that spatial association models may be dynamically generated based on measurements received when performing real-time location operations. By detecting the location of particular tags and their associations to assets, embodiments may dynamically perform these measurements and generate spatial association models on the fly. Example embodiments may further leverage methods and processes for dynamic tag activation, registration, and association, some examples of which are described in U.S. patent application Ser. No. 14/297,361 and U.S. patent application Ser. No. 14/298,396, each of which are herein incorporated by reference in their entirety. For example, during automatic registration and/or activation, a spatial association model may be generated for the asset to which the tags are registered. The process 1300 may be performed, for instance, by the apparatus 900 as described above.

At action 1302, a first location is received from a first source. It should be appreciated that although a distinction is generally contemplated between location information and position information, embodiments of the method 1300 may utilize both or either type of information when generating the spatial association model. As such, the first location may be received from a first locator tag, or from any other source capable of providing location or position information.

At action 1304, the first location is associated with an asset. For example, the first location may be associated with a spatial association model for an asset. Association of the first location with the asset may include association of the first location with a particular attachment point, locator tag, or the like for the spatial association model.

At action 1306, a second location may be received from a second source. The second location may be received via the same location technology as the first location or via a different technology. For example, in an over-determined system as described above, the first location may be received from a first location system (e.g., an ultra-wideband location system) and the second location may be received from a second source (e.g., a GPS system).

At action 1308, the second location may be associated with the asset. For example, as described above with respect to the first location, the second location may be associated with a spatial association model for the asset, including association with a particular attachment point, locator tag, or the like.

At action 1310, an asset reference point is determined using one or more of the first location and the second location. For example, a distance between the two locations may be determined and used to identify the asset reference point. In some embodiments, a line is drawn between the two locations to identify the shortest distance path between the locations. It should be appreciated that, as described above with respect to FIG. 2, various other techniques, reference points (e.g., a third or fourth location), or the like may be used to determine the asset reference point. In yet further embodiments, only the first location may be used to determine the asset reference point. For example, the asset reference point may be determined to be the first reference point in some embodiments until additional location measurements are available.

In other embodiments, the asset reference point may be determined based on a fixed offset from the first measurement point, such as by moving in a fixed direction in a fixed distance from the first measurement point (e.g., 6 inches down from the first measurement). The offset may be defined based on the particular tag within the spatial assistance model from which the location is received. For example, an offset for a first location measured from a right shoulder pad locator tag may locate the asset reference point one foot down and 18 inches to the left of the first location. This position may, for example, approximate the rough center of mass of a player. Alternatively, an offset for a first location measured from a left cleat locator tag may locate the asset reference point 3 feet above the first location and 6 inches to the right.

In some embodiments the asset reference point may be determined by applying a weighting to each of the first location and the second location and using the two locations and their respective weights to determine the asset reference point. For example, the coordinates of the two locations may be averaged. As another example, other factors may be taken into account to determine a weight for each location. For example, locations that have been measured more recently may be accorded a greater weight when selecting an asset reference point than older locations. As yet another example, locations received from sources with a greater resolution may be accorded greater weight than less precise measurement techniques.

At action 1312, an offset between the asset reference point and one or more of the first or second locations may be dynamically determined based on the measured locations. The offset may be stored with or as part of the spatial association model to provide for calibration between given locator tags or attachment locations and the asset reference point. This offset may then be utilized when receiving information from each locator tag to calculate the location of the asset reference point based on location measurements received from each tag. In this manner, location information received from different tags may be calibrated to identify a single location of an asset, even if the locator tags associated with the asset are not in the exact same location.

At action 1314, the spatial association model may be generated for the asset. For example, when a threshold number of data sets associated with the asset (e.g., number of tags, number of attachment points, spatial offsets between each attachment point, or the like) are present, the spatial association model may be stored for use in location determination processes. As such, in embodiments where more data is known about the asset (e.g., expected number of tags, expected relative locations of those tags), less information may need to be determined to use the spatial association model, while in embodiments where less data is known about the asset, more information may need to be available to use the spatial association model to improve location detection techniques. The spatial association model may further include identifiers for particular tags that are known to be associated with particular attachment points. For example, a spatial association model associated with a football player may include identifiers for the tags in the player's shoulder pads, cleats, and kneepads, along with an indication as to which tag is associated with which attachment point.

Example Use of a Spatial Association Model to Detect a Location

Figure 14:
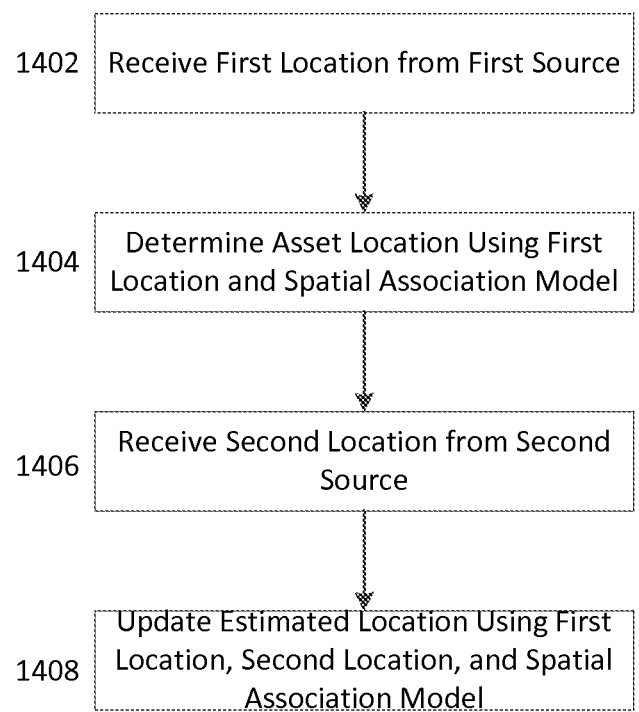
FIG. 14 illustrates a flowchart of an exemplary process for determining a location of an asset using a spatial association model in accordance with example embodiments of the present invention.

FIG. 14 illustrates an example flowchart of a process 1400 for using a spatial association model to assist with a location determination process in accordance with embodiments of the present invention. As described above with respect to FIGS. 2, 10, and 13, embodiments may leverage a known spatial association model for an asset to improve location determination processes for that asset. The process 1400 enables the use of a spatial association model to analyze and weight incoming location measurements to improve the accuracy of the location determined for the asset. The process 1400 may be performed, for instance, by the apparatus 900 as described above.

Embodiments of the process 1400 may be used to determine locations using a spatial association model in conjunction with multiple sources of location and/or position information. For example, locator tags with different blink rates may be employed. When a first location tag blinks, the blink data may be received by the RTLS system which locates the tag at a first location. The tag identifier may be associated with an asset, and the asset may be located at the location of a first attachment point or at some stored offset from that point corresponding to the distance between a first attachment point (e.g., the first attachment point 221 described with respect to FIG. 2) and an asset reference point (e.g., the asset reference point 223). When a second location tag blinks, the second blink data may be received by the RTLS system which locates the second tag at a second location. The second tag identifier may be associated with the same asset as the first tag. An estimate of the position of the asset may then be created which corresponds to a stored distance, either the distance to the asset reference point, or a distance to the first tag, such as the asset reference distance described with respect to FIG. 2. The asset location may then be calculated, such as by employing as a weighted average of the first location and the second location. This weighted average may be calculated, for example, by multiplying the values of each location by a weight (e.g., a numerical value), adding the location values together, and dividing by the sum of the weights. When the first tag blinks again, the RTLS system may locate it again, apply any required offset to determine the asset reference point, and weight the new location together with any or all of the prior locations to determine a new asset location.

Numerical scoring weights may be based on a number of factors, including, but not limited to, the number of assets being tracked, the blink rate, the zone in which the asset is (sideline or field), the speed, velocity, or acceleration of the asset or tag, the relative position to other assets, any known RF blind spots in the monitored area, any physical constraints, or other business related rules that might apply.

At action 1402, a first location is received from a first source. As described above, the first location may be received from a variety of sources including various sources of location information and position information. At action 1404, the first location may be used in concert with a spatial association model to determine a location of the asset. For example, as described above with respect to FIGS. 2, 10, and 13, the first location may be modified by an offset defined within or by the spatial association model.

The first location may be mapped to the asset location based on the source of the first location by using known associations between sources and an asset reference point defined within the spatial association model. For example, the spatial association model may include identifiers for locators associated with each attachment point, and offsets between the particular attachment points and the asset reference point. To determine the asset reference point, embodiments may examine incoming information from a locator tag to determine the identity of the locator tag. The identity of the locator tag may be mapped to a particular attachment point by looking up the identity of the locator tag stored within the spatial association model, and determining to which attachment point the tag is attached. The attachment point may be associated with a particular offset from the asset reference point (e.g., left shoulder pad tag 12 inches above and 18 inches to the right of the asset reference point, right shoulder pad tag 12 inches above and 18 inches to the left of the asset reference point, and the like). The offset between the attachment point and the asset reference point may be applied to the first location to map the first location to the estimated location of the asset.

At action 1406, a second location is received from a second source. For example, the second location may be received from a second tag attached to the player at the same or a different attachment point. In some embodiments, the blink rate of such a second tag may vary from the blink rate of a tag employed to derive the first location, in order to distinguish the information provided by the two tags from one another. At action 1408, the second location may be used to determine the location of the asset in concert with the first location and the spatial association model. For example, each of the first location and the second location may be assigned a particular weight and the location of the asset may be determined based on the weighted analysis of those locations. The weight of each location may be determined based on various factors, including how recently the information was received (e.g., more recent information is accorded a higher weight), whether the location conforms to the spatial association model (e.g., locations that clearly fail to conform to constraints of the spatial association model may be reduced in weight due to the greater likelihood of the location being erroneous), motion vectors of the asset at the time of the location measurement (e.g., location measurements associated with larger movement vectors may be more likely to be erroneous), and the like. The spatial association model may be employed to determine offsets for each of the measured locations and the location measured for the asset, in a similar manner as described above with respect to the first location.

Figure 15:
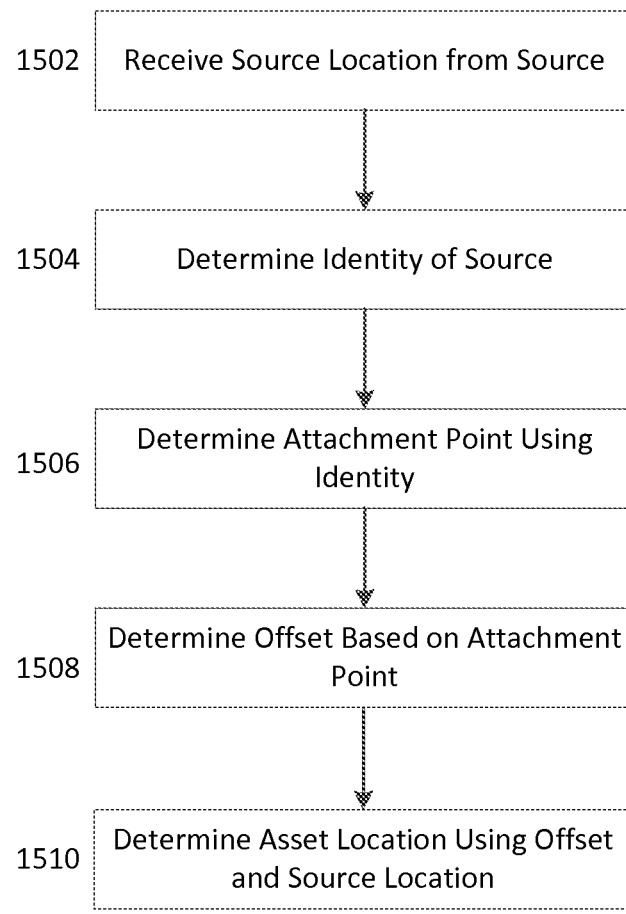
FIG. 15 illustrates a flowchart of an exemplary process for using a spatial association model to map a source location received from a source to an asset location.

Example Determination of a Location Based on Source Mapping Using a Spatial Association Model FIG. 15 illustrates a flowchart of a process 1500 for using a spatial association model to map a source location received from a source to an asset location. As noted above with respect to FIGS. 2, 10, and 13-14, position or location information received from a first source may not directly correspond to the actual location of the asset. For example, in the case of a player, location information provided by tags associated with the player's shoulder pads may be offset from the player's actual center of mass. The process 1500 illustrates an example of a method by which embodiments of the present invention may leverage the knowledge of the relative positioning of location sources (e.g., locator tags) to an asset reference point associated in order to provide more accurate location estimations for a given asset. The process 1500 may be performed, for instance, by the apparatus 900 as described above.

At action 1502, a source location is received from a source. The source in the present example is generally described as a locator tag, though it should be appreciated that any source that may be associated with a particular offset location relative to an asset reference point could be employed with embodiments of the process 1500. At action 1504, an identity of the source is determined. For example, the identity may be a unique identifier associated with a locator tag.

At action 1506, the identity of the source is mapped to a spatial association model for the asset to determine the attachment point of the source. The spatial association model may include an index for each tag identifier and to which attachment point the tag identifier is associated. For example, a given tag may be associated with a left shoulder pad of the asset.

At action 1508, an offset is determined between the attachment point and an asset reference point based on the spatial association model. For example, the spatial association model may store information indicating the offset for each attachment point. In some embodiments, the offset may be determined dynamically as described above with respect to FIG. 13. At action 1510, the offset may be applied to the source location to determine an asset location. This mapping may, for example, represent the expected distance between a player's center of mass and a locator tag included in the player's left shoulder pad. In this manner, location information for an asset received from different sources may be used in conjunction with a spatial association model associated with the asset to improve location detection of the asset.

Example of Use of a Spatial Association Model to Determine Movement of an Asset

Figure 16:
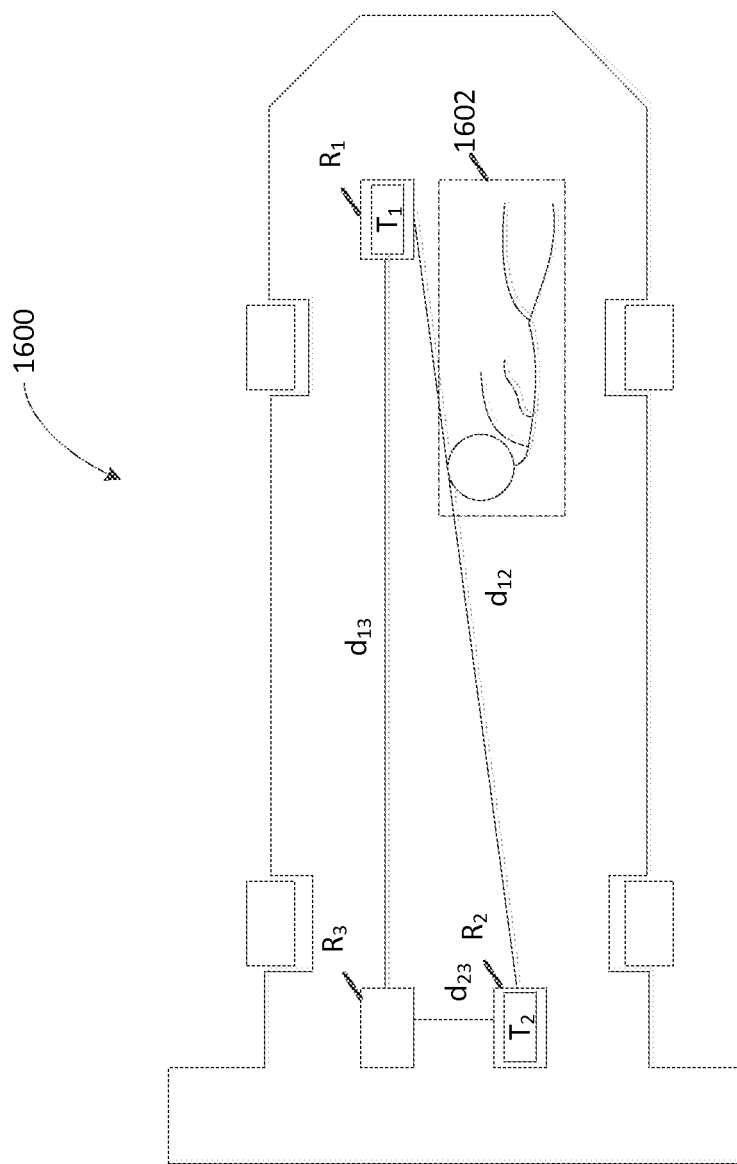
FIG. 16 illustrates an example of the use of a spatial association model with a vehicle asset in accordance with example embodiments of the present invention.

FIG. 16 illustrates an example asset 1600 employing a spatial association model, where the spatial association model is used to establish a reference distance which may be used to determine motion of the asset. In particular, FIG. 16 illustrates a spatial association model 1600 as applied to a vehicle, such as a race car containing a driver 1602. The race car includes three reference points $R_1$, $R_2$, and $R_3$. The reference points $R_1$, $R_2$, and $R_3$ are located at known locations on the race car. Two of the reference points, $R_1$, and $R_2$, are associated with two tags $T_1$ and $T_2$, respectively. The tags $T_1$ and $T_2$ may be used to determine the location of their associated reference points, $R_1$ and $R_2$. The third location of the third reference point, $R_3$, may be determined based on the detected positions of $R_1$ and $R_2$ and the fact that an offset position between $R_1$ and $R_3$ and between $R_1$ and $R_2$ are known. It should be appreciated that while the specific example described in FIG. 16 is that of a race car (e.g., a Formula 1 or stock car vehicle), the same techniques and principles could be applied to any other vehicle (e.g., automobile, truck, plane, boat, helicopter) or non-vehicle (e.g., ball, flag, clothing, player, helmet, pallet, crate, item of manufacture) assets. For instance, in a pallet shipping application, $T_1$ may be applied to a pallet, and $T_2$ may be applied to a carton loaded on the pallet.

The distances between each of the reference points may be known or measured to create the spatial association model for the race car. For example, a spatial association model may be defined by manually measuring directions and distances between the reference points and generating vectors having a magnitude and a direction between each point. Such measurements may be performed, for example, through the use of a tape measure, a laser rangefinder, an optical rangefinder, an RTLS system, or the like. Each of the reference points may be defined by coordinates in a three dimensional space, and the magnitude and the direction of the vector may be determined by the relationship between the coordinate locations.

The vectors between each pair of tags may be used as known reference distances, which are represented in FIG. 16 as the distances $d_{12}$, $d_{13}$, and $d_{23}$. These distances may be stored in the spatial association model for the asset at the time the spatial association model is defined. These known reference distances may be compared with measured distances between the measured location of the reference points at particular time intervals to perform error checking functions and to assist with determination of the movement of the asset.

For example, an asset such as a race car may have multiple different movement states, such as stationary, spinning out, traveling in a straight line, turning, or the like. In a stationary state, the locations of each reference point should not change over time. In a spinning out state, the location of one reference point may remain stationary, while the other reference points move (e.g., where the car is spinning about an axis defined at one of the reference points). If the race car is traveling straight, then the reference points should be changing at a constant rate with respect to one another, and if the car is turning, then the rate at which one reference point changes may be different than the rate at which the other reference points change during the turn. It should be appreciated that, while the instant example describes these states in a broad manner, embodiments may detect a variety of general and specific movement states (e.g., turning at a particular number of degrees per second, traveling at a particular rate of speed, spinning about a particular axis, or the like). It should also be appreciated that various other types of movement and/or movement scenarios may be detected for other asset types, such as "pass" or "run" where the asset is a football, a "stance" type of movement where the asset is a player, or the like.

However, detection of a movement state by the relative positions of reference points alone may result in errors. For example, reflections, signal attenuations, blocked signals, and the like may result in erroneous location data from one or more tags. Such erroneous data may indicate, for example, that a reference point is moving when in fact it is stationary, that the reference point is stationary when in fact it is moving, or no location may be measured for the reference point at all. In such scenarios, attempting to use erroneous data may result in an incorrect type of movement being identified for the asset. To detect such errors and to address problems caused by such errors, the known reference distances between the reference points may be employed.

The location of the tags $T_1$ and $T_2$ may be measured over time, resulting in a plurality of location readings for each tag. In some embodiments, only a single tag may be measured at any given time, so the location measurements of the tags $T_1$ and $T_2$ may be offset by some time interval. At each given time stamp (or across adjacent time stamps, in scenarios where only one tag location is measured at a time), the magnitude of a distance between the tags $T_1$ and $T_2$ may be calculated. This calculated magnitude may be compared with the known reference distance between the tags (e.g., $d_{12}$). If the calculated magnitude is within a certain threshold distance of the known reference distance (e.g., within 1%, 5%, 10%, or 25%), then the measurements of one or both of the tags at the corresponding timestamp may be identified as likely not erroneous. If the calculated magnitude deviates from the known reference distance by more than the threshold distance, then it can be assumed that one or both tag measurements are in an error state (e.g., the signal from the tag was reflected, attenuated, blocked, or the like, or the tag became separated from the asset).

For example, in some embodiments an error score may be calculated by the following formula:

$$\epsilon = \left[1 - \frac{M - d_{ref}}{d_{ref}}\right]^2 \quad (8)$$

Where $\epsilon$ is the error for the measured magnitude, M is the measured magnitude of the vector between the two tags, and $d_{ref}$ is the magnitude of the reference distance. Alternatively, in some embodiments the error for each measured magnitude may be computed by the following formula:

$$\text{If } \frac{M - d_{ref}}{d_{ref}} < J, \ \epsilon = 0, \text{ else, } \epsilon = W \quad (9)$$

Where J is an error threshold (e.g., 1 cm, 2 cm, 1 m, or the like), and W is a weight value (e.g., 0<W<1).

The calculated error may be employed to determine whether to discard a particular location measurement. For example, if the error is greater than a threshold value, then the location measurement for one or both location measurements used to calculate the magnitude may be discarded from a process for identifying whether the asset is moving. Some embodiments may also check for consistency in the error rate over multiple measurement periods. For example, some errors may be expected due to signal interference, noise, or the like. Accordingly, location measurements that have a consistent measured error may still be used for the purpose of determining movement of the asset, even in the presence of such errors.

As such, the calculated error measurement may be employed in conjunction with systems for categorizing movement patterns of an asset to determine whether a given movement pattern is likely or the result of an error on one or more tags. For example, a movement pattern that shows one tag as moving and one tag as stationary may, as noted above, be identified as the asset spinning about the stationary tag. However, if the measured locations of the tags of the asset indicate a large error from the known reference distance(s), then one or both tags may be marked as in error rather than marking the asset as spinning. In some embodiments, various rules and criteria may be employed for establishing a confidence value for particular movement patterns in view of calculated errors. Specific examples of methods, systems, devices, and computer readable media for detecting movement patterns are described further in U.S. Pat. No. 8,842,002, which is herein incorporated by reference in its entirety.

Figure 17:
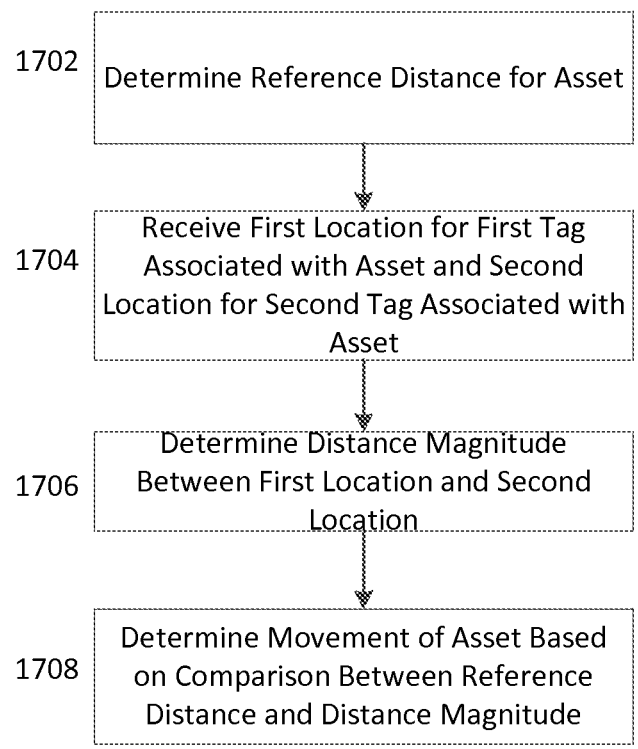
FIG. 17 illustrates a flowchart of an exemplary process for determining movement of an asset using a reference distance in accordance with example embodiments of the present invention.

FIG. 17 illustrates a flowchart of an exemplary process 1700 for determining movement of an asset using a reference distance in accordance with example embodiments of the present invention. As noted above, embodiments may utilize a known reference distance between two or more reference points to assist with detection of erroneous location measurements. This known reference distance may be employed to assist with detection of particular movement scenarios for the asset with which the reference distance is associated. In some embodiments, the reference distance may be included as or as a component of the spatial association model as described above. The process 1700 may be performed, for instance, by the apparatus 900 as described above.

At action 1702, the process begins by determining a reference distance for a particular asset. The reference distance may be calculated according to a variety of methods as indicated above, including but not limited to manual measurements using a tape measure or laser rangefinder, automated measurements using an RTLS system, or the like. In other embodiments, the process 1700 may perform a table lookup to retrieve a spatial association model for the asset from a database, such that the reference distance is identified based on the contents of the database (e.g., a tag database indicating which tags are registered with which spatial association models and the attendant reference distances for each spatial association model). In some embodiments, the reference distance for the asset, once determined, is stored in a memory At action 1704 locations for a first tag associated with the asset and a second tag associated with the asset are determined. For example, the locations of the first tag and second tag may be determined using an RTLS system as described herein. In some embodiments, the process 1700 knows which tags for which to determine the location based on a lookup of data (e.g., a spatial association model) associated with the asset. For example, a spatial association model may be accessed at action 1702 to obtain the reference distance, and that same spatial association model may identify the tags associated with the asset. These tags may subsequently be queried by the process to selectively control which tags are used in the process, or data for those selected tags may be obtained from various datastores (e.g., a receiver processing and distribution system) to ensure that only relevant tag locations are analyzed by the process 1700.

At action 1706, a distance magnitude may be determined between the first tag and the second tag. At action 1708, the distance magnitude may be compared with the reference distance to assist in detecting the movement of the asset, such as by determining a movement scenario (e.g., type or direction of movement) a rate of movement, or performing error checking on the location measurements.

Figure 18:
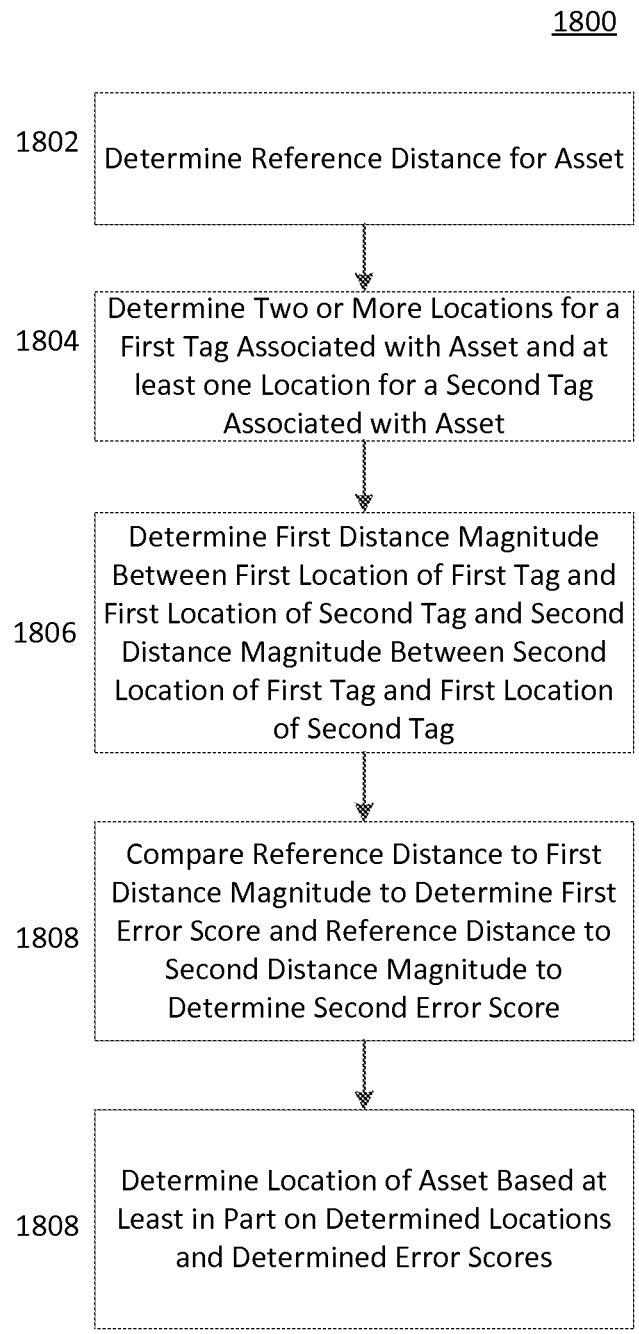
FIG. 18 illustrates a flowchart of an exemplary process for calculating an error score and using the error score to determine movement of an asset in accordance with example embodiments of the present invention.

FIG. 18 illustrates a flowchart of an exemplary process 1800 for calculating an error score and using the error score to determine movement of an asset in accordance with example embodiments of the present invention. As described above, embodiments may leverage the use of multiple location measurements for a tag or tags over time. The process 1800 illustrates a mechanism for using a spatial association model in conjunction with an error score to evaluate a series of location measurements and detect errors. By using a plurality of measured magnitudes, individually erroneous location measurements may be detected and discarded. The process 1800 may be performed, for instance, by the apparatus 900 as described above.

At action 1802, a reference distance for an asset is determined. As noted above, the reference distance may be determined by a lookup operation in a database storing one or more spatial association models for assets, or the reference distance may be measured at the time the process is performed. The reference distance for the asset, once determined, may be stored in a memory. At action 1804, two or more locations are determined for a first tag at two or more different times, and one or more locations are determined for a second tag. In some embodiments, each of the locations may be determined at a different time, such that the first location for the first tag is determined at a time $t_0$, followed by the location for the second tag being determined at a time $t_1$, and subsequently the second location for the first tag is determined at a time $t_2$.

At action 1806, a first magnitude representing a distance between the first location of the first tag and the location of the second tag and a second magnitude representing a distance between the location of the second tag and the second location of the first tag are determined.

At action 1808, the first magnitude and the second magnitude are compared with the reference distance to determine an error for each magnitude. The error may be determined, for instance, via the processes described above with respect to FIG. 16. At action 1808, the determined errors may be used in conjunction with the determined locations to determine a location of the asset and/or a type of movement of the asset. For example, if both of the determined magnitudes have an error that is below a threshold value, then embodiments may determine that all of the measured locations are accurate. However, if the first magnitude has an error above a threshold value but the second magnitude has an error below the threshold value, then it is likely that the first location of the first tag is in error, since if the location of the second tag was in error, both magnitudes would likely be in error. Similarly, if only the second magnitude is in error, then it is likely that the second location of the first tag is in error. If both magnitudes are in error, then it is likely that only the location of the second tag is in error. It should be appreciated however, that such error calculations are only estimates. For example, if both the first location of the first tag and the location of the second tag are in error, then the first magnitude may appear to be below the error threshold even if both tags are in error if the tags are in error by the same value (e.g., equally attenuated such that the magnitude corresponds to the reference distance).

As described above, the calculated error for each magnitude may be reported to a system, such as a movement candidate classification system, to assist with selection of an appropriate movement scenario for assisting with estimating and/or tracking the location of the asset. For example, the calculated error values for each magnitude may be employed to determine whether to discard or evaluate location measurements for a plurality of tags disposed about the asset to assist with determining whether the asset is stationary, spinning, traveling in a straight direction, turning, in a particular stance, or the like.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method of registering an asset, comprising:
    registering, to the asset, a first RF location tag attached to the asset at a first attachment point and configured to provide a first tag identifier;
    registering, to the asset, a second RF location tag attached to the asset at a second attachment point and configured to provide a second tag identifier;
    defining an asset reference distance between the first attachment point and the second attachment point;
    storing, in a memory, an identity of the asset, the asset reference distance, the first tag identifier, and the second tag identifier; and
    identifying a posture of the asset by identifying a difference between the asset reference distance and a distance magnitude defined between the first RF location tag and the second RF location tag.

2. The method of claim 1, wherein the asset is a human being.

3. The method of claim 2, wherein the asset reference distance is determined based on at least one biometric characteristic.

4. The method of claim 1, wherein the asset comprises an object to be worn by a human being.

5. The method of claim 4, wherein the asset reference distance is determined based on at least one physical measurement of the object.

6. The method of claim 4, wherein the object is a race car.

7. An apparatus comprising a processor and a memory, wherein the processor is configured by instructions stored in the memory to cause the apparatus to:
    register, to an asset, a first RF location tag configured to provide a first tag identifier, the first RF location tag attached to the asset at a first attachment point;
    register, to the asset, a second RF location tag configured to provide a second tag identifier, the second RF location tag attached to the asset at a second attachment point;
    define an asset reference distance between the first attachment point and the second attachment point;
    store, in a memory, an identity of the asset, the asset reference distance, the first tag identifier, and the second tag identifier; and
    identify a posture of the asset by identifying a difference between the asset reference distance and a distance magnitude defined between the first RF location tag and the second RF location tag.

8. The apparatus of claim 7, wherein the asset is a human being.

9. The apparatus of claim 8, wherein of the asset reference distance is determined based on at least one biometric characteristic.

10. The apparatus of claim 7, wherein the asset comprises an object to be worn by a human being.

11. The apparatus of claim 10, wherein the asset reference distance is determined based on at least one physical measurement of the object.

12. The apparatus of claim 10, wherein the object is a race car.

13. A non-transitory computer readable storage medium comprising instructions that, when executed by a processor, configure the processor to at least:
    register, to an asset, a first RF location tag attached to the asset at a first attachment point and configured to provide a first tag identifier;
    register, to the asset, a second RF location tag attached to the asset at a second attachment point and configured to provide a second tag identifier;
    define an asset reference distance between the first attachment point and the second attachment point;
    store, in a memory, an identity of the asset, the asset reference distance, the first tag identifier, and the second tag identifier; and
    identify a posture of the asset by identifying a difference between the asset reference distance and a distance magnitude defined between the first RF location tag and the second RF location tag.

14. The computer readable storage medium of claim 13, wherein the asset is a human being.

15. The computer readable storage medium of claim 14, wherein the asset reference distance is determined based on at least one biometric characteristic.

16. The computer readable storage medium of claim 13, wherein the asset comprises an object to be worn by a human being.

17. The computer readable storage medium of claim 16, wherein the asset reference distance is associated with at least one physical measurement of the object.

* * * * *